(12) United States Patent
Fonte

(10) Patent No.: US 10,667,542 B2
(45) Date of Patent: *Jun. 2, 2020

(54) SYSTEM FOR PROVIDING A SINGLE SERVING OF A FROZEN CONFECTION

(71) Applicant: Sigma Phase, Corp., Lexington, MA (US)

(72) Inventor: Matthew Fonte, Concord, MA (US)

(73) Assignee: Sigma Phase, Corp., Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,086

(22) Filed: Sep. 30, 2019

(65) Prior Publication Data

US 2020/0022382 A1 Jan. 23, 2020

Related U.S. Application Data

(63) Continuation of application No. 16/360,220, filed on Mar. 21, 2019, now Pat. No. 10,426,180, which is a
(Continued)

(51) Int. Cl.
*A23G 9/22* (2006.01)
*A23G 9/28* (2006.01)
(Continued)

(52) U.S. Cl.
CPC .............. *A23G 9/224* (2013.01); *A23G 9/12* (2013.01); *A23G 9/22* (2013.01); *A23G 9/28* (2013.01);
(Continued)

(58) Field of Classification Search
CPC ... A23G 9/24; A23G 9/12; A23G 9/22; A23G 9/28; A23G 9/52; B65D 85/8046; B65D 85/8043; B65D 51/32
See application file for complete search history.

(56) References Cited

U.S. PATENT DOCUMENTS 3,393,900 A 7/1968 Wagner et al.
3,914,673 A 10/1975 Wallin
(Continued)

FOREIGN PATENT DOCUMENTS

EP 0471904 A1 2/1992
EP 1907300 4/2008
(Continued)

OTHER PUBLICATIONS

Linda Xiao-Wim, "This New Kitchen Gadget Makes Fro-Yo in Minutes", by Bloomberg, Aug. 8, 2017, 4 pages, hhtp://fortune.com/2017/08/08/wim-frozenyogurt-minutes/ Oct. 12, 2018.
(Continued)

*Primary Examiner* — Viren A Thakur
*Assistant Examiner* — Chaim A Smith
(74) *Attorney, Agent, or Firm* — Fish & Richardson P.C.

(57) ABSTRACT

A system for providing a single serving of a frozen confection, wherein the system comprises a pod comprising at least one ingredient for providing a single serving of a frozen confection; the system cools the pod; the system introduces water into the pod; the system simultaneously stirs the contents of the pod while scraping at least one wall of the pod to prevent a build-up of the frozen confection on the at least one wall of the pod; and the system ejects the frozen confection out of the pod.

31 Claims, 35 Drawing Sheets

Related U.S. Application Data continuation of application No. 16/104,758, filed on Aug. 17, 2018, now Pat. No. 10,334,868, which is a continuation-in-part of application No. 15/625,690, filed on Jun. 16, 2017, now Pat. No. 10,358,284.

(60) Provisional application No. 62/616,742, filed on Jan. 12, 2018, provisional application No. 62/351,001, filed on Jun. 16, 2016.

(51) Int. Cl.
    *A23G 9/12*     (2006.01)
    *B65D 85/804*     (2006.01)
    *B65D 51/32*     (2006.01)
    *A23G 9/52*     (2006.01)

(52) U.S. Cl.
    CPC ............... *A23G 9/52* (2013.01); *B65D 51/32* (2013.01); *B65D 85/8046* (2013.01)

(56) References Cited

U.S. PATENT DOCUMENTS

| | | |
|---|---|---|
| 3,951,289 A | 4/1976 | Landen |
| 4,110,476 A | 8/1978 | Rhodes |
| 4,408,690 A | 10/1983 | Ferrero |
| 4,632,566 A | 12/1986 | Masel et al. |
| 4,664,529 A | 5/1987 | Cavalli |
| 4,784,886 A | 11/1988 | Wissgott |
| 4,827,732 A | 5/1989 | Suyama et al. |
| 4,913,645 A | 4/1990 | Daouse et al. |
| 5,264,237 A | 11/1993 | Traitler et al. |
| 5,343,710 A | 9/1994 | Cathenaut et al. |
| 5,363,746 A | 11/1994 | Gordon |
| 5,435,143 A | 7/1995 | Heinrich |
| 5,447,036 A | 9/1995 | Heinrich |
| 5,549,042 A | 8/1996 | Bukoschek et al. |
| 5,556,659 A | 9/1996 | De Pedro et al. |
| 5,568,729 A | 10/1996 | Heinrich et al. |
| 5,571,282 A | 11/1996 | Earle |
| 5,603,965 A | 2/1997 | Daouse |
| 5,823,675 A | 10/1998 | Myerly |
| 5,843,512 A | 12/1998 | Daouse et al. |
| 5,879,731 A | 3/1999 | Beckett et al. |
| 5,888,562 A | 3/1999 | Hansen et al. |
| 5,888,567 A | 3/1999 | Daouse |
| 5,932,275 A | 8/1999 | Nalur |
| 5,967,381 A | 10/1999 | Van Zeeland et al. |
| 6,004,606 A | 12/1999 | French et al. |
| 6,012,383 A | 1/2000 | Lande |
| 6,045,836 A | 4/2000 | Saunier et al. |
| 6,060,094 A | 5/2000 | Nalur |
| 6,071,546 A | 6/2000 | Nalur |
| 6,089,747 A | 7/2000 | Huang |
| 6,174,157 B1 | 1/2001 | Daouse et al. |
| 6,194,014 B1 | 2/2001 | Busse et al. |
| 6,210,739 B1 | 4/2001 | Nalur |
| 6,221,409 B1 | 4/2001 | Bueno Ceresuela |
| 6,251,455 B1 | 6/2001 | Thomas |
| 6,251,456 B1 | 6/2001 | Maul et al. |
| 6,267,073 B1 | 7/2001 | Busse et al. |
| 6,272,974 B1 | 8/2001 | Pascotti et al. |
| 6,280,783 B1 | 8/2001 | Blaschke et al. |
| 6,284,294 B1 | 9/2001 | French et al. |
| 6,299,923 B1 | 10/2001 | Meziane |
| 6,338,863 B1 | 1/2002 | Amiel et al. |
| 6,340,488 B1 | 1/2002 | French et al. |
| 6,379,724 B1 | 4/2002 | Best et al. |
| 6,399,134 B1 | 6/2002 | Best et al. |
| 6,413,563 B1 | 7/2002 | Blaschke et al. |
| 6,431,395 B1 | 8/2002 | San Martin et al. |
| 6,479,085 B1 | 11/2002 | Archibald |
| 6,524,634 B2 | 2/2003 | Busse et al. |
| 6,524,635 B1 | 2/2003 | Aebi |
| 6,531,169 B2 | 3/2003 | Best et al. |
| 6,548,097 B1 | 4/2003 | Best et al. |
| 6,565,902 B2 | 5/2003 | Ruano Del Campo et al. |
| 6,579,375 B2 | 6/2003 | Beckett et al. |
| 6,592,928 B2 | 7/2003 | Makela et al. |
| 6,616,963 B1 | 9/2003 | Zerby et al. |
| 6,623,784 B2 | 9/2003 | Zerby et al. |
| 6,627,239 B1 | 9/2003 | Gavie et al. |
| 6,645,538 B2 | 11/2003 | Best et al. |
| 6,689,406 B2 | 2/2004 | Kuehl et al. |
| 6,713,101 B2 | 3/2004 | Lometillo et al. |
| 6,726,944 B2 | 4/2004 | Blaschke et al. |
| 6,739,475 B2 | 5/2004 | San Martin et al. |
| 6,758,056 B1 | 7/2004 | Cathenaut et al. |
| 6,790,467 B2 | 9/2004 | Kostival et al. |
| 6,818,238 B2 | 11/2004 | Napolitano et al. |
| 6,820,765 B2 | 11/2004 | Pahl |
| 6,824,808 B2 | 11/2004 | Best et al. |
| 6,835,406 B1 | 12/2004 | Wurzel et al. |
| 6,861,082 B2 | 3/2005 | Laffont et al. |
| 6,890,577 B2 | 5/2005 | Vaghela et al. |
| 6,936,794 B2 | 8/2005 | Zhang et al. |
| 6,942,885 B2 | 9/2005 | Ross et al. |
| 7,211,283 B2 | 5/2007 | Jones et al. |
| 7,407,681 B2 | 8/2008 | Marchon et al. |
| 7,451,613 B2 | 11/2008 | Barraclough et al. |
| 7,513,213 B2 | 4/2009 | Mange et al. |
| 7,619,188 B2 | 11/2009 | Oghafua et al. |
| 7,650,834 B2 | 1/2010 | Bravo |
| 7,658,960 B2 | 2/2010 | Thomas et al. |
| 7,727,573 B2 | 6/2010 | Vaghela et al. |
| 7,730,831 B2 | 6/2010 | Mange et al. |
| 7,736,681 B2 | 6/2010 | Belzowski et al. |
| 7,754,260 B2 | 7/2010 | Kruik et al. |
| 7,918,334 B2 | 4/2011 | Gaetano et al. |
| 8,182,853 B2 | 5/2012 | Puaud et al. |
| 8,273,392 B2 | 9/2012 | Ho et al. |
| 8,347,808 B2 | 1/2013 | Belzowski et al. |
| 8,425,967 B2 | 4/2013 | Vaghela et al. |
| 8,628,811 B2 | 1/2014 | Panyam et al. |
| 8,720,493 B2 | 5/2014 | Dose et al. |
| 8,777,057 B2 | 7/2014 | Fiedler |
| 8,784,091 B2 | 7/2014 | Henriet et al. |
| 8,840,943 B2 | 9/2014 | Amend |
| 8,844,426 B2 | 9/2014 | Ochoa et al. |
| 8,877,179 B2 | 11/2014 | Mercenier et al. |
| 8,906,437 B2 | 12/2014 | Green et al. |
| 8,936,821 B2 | 1/2015 | Ummadi et al. |
| 8,940,352 B2 | 1/2015 | Ambrogi et al. |
| 8,960,999 B1 | 2/2015 | Ochoa et al. |
| 8,980,354 B2 | 3/2015 | Harlaux-Pasquier et al. |
| 9,155,322 B2 | 10/2015 | Ricco et al. |
| 9,232,811 B2 | 1/2016 | Panyam et al. |
| 9,242,387 B2 | 1/2016 | Amend et al. |
| 9,253,993 B2 | 2/2016 | Ummadi et al. |
| 9,351,503 B2 | 5/2016 | Amend et al. |
| 9,351,504 B2 | 5/2016 | Ricco et al. |
| 9,572,358 B2 | 2/2017 | Whitehouse |
| 9,573,726 B2 | 2/2017 | Danesin et al. |
| 9,591,865 B2 | 3/2017 | Ravji et al. |
| 9,826,756 B2 | 11/2017 | Ummadi et al. |
| 9,861,114 B2 | 1/2018 | Lallemand et al. |
| 9,888,706 B2 | 2/2018 | Ummadi et al. |
| 9,913,486 B2 | 3/2018 | Nalur |
| 10,039,298 B2 | 8/2018 | Noth et al. |
| 10,111,447 B2 | 10/2018 | Noth et al. |
| 10,117,445 B2 | 11/2018 | Imer |
| 2001/0052294 A1 | 12/2001 | Schmed |
| 2002/0001644 A1 | 1/2002 | Busse et al. |
| 2002/0034572 A1 | 3/2002 | Blaschke et al. |
| 2002/0166870 A1 | 11/2002 | Martin et al. |
| 2002/0182300 A1 | 12/2002 | Groh et al. |
| 2003/0000240 A1 | 1/2003 | Pahl |
| 2003/0017244 A1 | 1/2003 | Blaschke et al. |
| 2003/0035876 A1 | 2/2003 | Kostival et al. |
| 2003/0084898 A1 | 5/2003 | Beckett et al. |
| 2003/0134025 A1 | 7/2003 | Vaghela et al. |
| 2004/0058037 A1 | 3/2004 | Masuda et al. |
| 2004/0161503 A1 | 8/2004 | Malone et al. |
| 2004/0211201 A1 | 10/2004 | Bischel et al. |

(56) References Cited

U.S. PATENT DOCUMENTS

| | | |
|---|---|---|
| 2004/0219269 A1 | 11/2004 | Cathenaut et al. |
| 2005/0178796 A1 | 8/2005 | Schraiber |
| 2005/0189375 A1 | 9/2005 | McGill |
| 2005/0193896 A1 | 9/2005 | McGill |
| 2005/0279219 A1 | 12/2005 | Turi |
| 2006/0090654 A1 | 5/2006 | Mange et al. |
| 2006/0110507 A1 | 5/2006 | Yoakinn et al. |
| 2006/0110515 A1 | 5/2006 | Waletzko et al. |
| 2006/0255066 A1 | 11/2006 | Damiano et al. |
| 2006/0266751 A1 | 11/2006 | Ali et al. |
| 2006/0280826 A1 | 12/2006 | Mange et al. |
| 2007/0144357 A1 | 6/2007 | Rivera |
| 2007/0160722 A1 | 7/2007 | Best et al. |
| 2007/0172562 A1 | 7/2007 | Medina Quintanilla |
| 2007/0177455 A1 | 8/2007 | Renfro |
| 2007/0181604 A1 | 8/2007 | Rusch |
| 2007/0202231 A1 | 8/2007 | Ambrogi et al. |
| 2007/0275131 A1 | 11/2007 | Bertini et al. |
| 2008/0066483 A1 | 3/2008 | Klier et al. |
| 2008/0102172 A1 | 5/2008 | Capelle et al. |
| 2008/0113069 A1 | 5/2008 | Green et al. |
| 2008/0140437 A1 | 6/2008 | Russo et al. |
| 2008/0206404 A1 | 8/2008 | Green et al. |
| 2008/0206426 A1 | 8/2008 | Rousset et al. |
| 2008/0226771 A1 | 9/2008 | Cathenaut et al. |
| 2008/0282723 A1 | 11/2008 | Perrier et al. |
| 2009/0017149 A1 | 1/2009 | Richman |
| 2009/0090254 A1 | 4/2009 | Rusch |
| 2009/0147618 A1 | 6/2009 | Kovacic et al. |
| 2009/0179042 A1 | 7/2009 | Milan et al. |
| 2009/0191318 A1 | 7/2009 | Cocchi et al. |
| 2009/0269452 A1 | 10/2009 | Dufort |
| 2009/0291170 A1 | 11/2009 | Rousset et al. |
| 2009/0304866 A1 | 12/2009 | Bovetto et al. |
| 2010/0034937 A1 | 2/2010 | Schmitt et al. |
| 2010/0068340 A1 | 3/2010 | Wille et al. |
| 2010/0124599 A1 | 5/2010 | Saikali et al. |
| 2010/0132310 A1 | 6/2010 | Dose et al. |
| 2010/0196551 A1 | 8/2010 | Harlaux-Pasquier et al. |
| 2010/0203202 A1 | 8/2010 | Quessette et al. |
| 2010/0203215 A1 | 8/2010 | Russo |
| 2010/0206220 A1 | 8/2010 | Belzowski et al. |
| 2010/0209562 A1 | 8/2010 | Henriet et al. |
| 2010/0209571 A1 | 8/2010 | Vaghela et al. |
| 2010/0285178 A1 | 11/2010 | Labbe et al. |
| 2011/0000872 A1 | 1/2011 | Aneas |
| 2011/0003041 A1 | 1/2011 | Garbi et al. |
| 2011/0027427 A1 | 2/2011 | Panyam et al. |
| 2011/0088558 A1 | 4/2011 | Farrel et al. |
| 2011/0217425 A1 | 9/2011 | Puaud et al. |
| 2011/0229608 A1 | 9/2011 | Plessier et al. |
| 2011/0262600 A1 | 10/2011 | McGill |
| 2011/0311703 A1 | 12/2011 | Ummadi et al. |
| 2012/0096875 A1 | 4/2012 | Ravji et al. |
| 2012/0096876 A1 | 4/2012 | Ravji et al. |
| 2012/0100271 A1 | 4/2012 | Leas et al. |
| 2012/0201932 A1 | 8/2012 | Kihnke |
| 2012/0320707 A1 | 12/2012 | Planet et al. |
| 2013/0008321 A1 | 1/2013 | Bravo |
| 2013/0045310 A1 | 2/2013 | Ricco et al. |
| 2013/0052308 A1 | 2/2013 | Palzer et al. |
| 2013/0101702 A1 | 4/2013 | Nalur |
| 2013/0122176 A1 | 5/2013 | Ummadi et al. |
| 2013/0129896 A1 | 5/2013 | Ummadi et al. |
| 2013/0129897 A1 | 5/2013 | Lallemand et al. |
| 2013/0136842 A1 | 5/2013 | Ummadi et al. |
| 2013/0149421 A1 | 6/2013 | Vaghela et al. |
| 2013/0206771 A1 | 8/2013 | Arnold et al. |
| 2013/0216660 A1 | 8/2013 | Green et al. |
| 2013/0236581 A1 | 9/2013 | Mercenier et al. |
| 2013/0259975 A1 | 10/2013 | Schaffer-Lequart et al. |
| 2013/0323393 A1 | 12/2013 | Olmos et al. |
| 2013/0340456 A1 | 12/2013 | Hoare et al. |
| 2014/0000302 A1 | 1/2014 | Cocchi et al. |
| 2014/0004230 A1 | 1/2014 | Ricco et al. |
| 2014/0033969 A1 | 2/2014 | Leas et al. |
| 2014/0065270 A1 | 3/2014 | Huynh-Ba et al. |
| 2014/0083879 A1 | 3/2014 | Ulstad |
| 2014/0099422 A1 | 4/2014 | Panyam et al. |
| 2014/0141147 A1 | 5/2014 | Dopfer et al. |
| 2014/0161940 A1 | 6/2014 | Aviles et al. |
| 2014/0178534 A1 | 6/2014 | Amend et al. |
| 2014/0197195 A1 | 7/2014 | Peuker et al. |
| 2014/0242229 A1 | 8/2014 | Whitehouse |
| 2014/0255558 A1 | 9/2014 | Amend et al. |
| 2014/0272016 A1 | 9/2014 | Nowak |
| 2014/0335232 A1 | 11/2014 | Halachmi |
| 2014/0335255 A1 | 11/2014 | Jung et al. |
| 2014/0370173 A1 | 12/2014 | Gunes et al. |
| 2015/0017286 A1 | 1/2015 | Ural et al. |
| 2015/0064330 A1 | 3/2015 | Ummadi et al. |
| 2015/0099050 A1 | 4/2015 | Ummadi et al. |
| 2015/0140193 A1 | 5/2015 | Desai et al. |
| 2015/0157040 A1 | 6/2015 | Althaus et al. |
| 2015/0157042 A1 | 6/2015 | Amend et al. |
| 2015/0164106 A1 | 6/2015 | Ricco et al. |
| 2015/0166222 A1 | 6/2015 | Danesin et al. |
| 2015/0201646 A1 | 7/2015 | Olmos et al. |
| 2015/0245638 A1 | 9/2015 | Ummadi et al. |
| 2015/0282502 A1 | 10/2015 | Ummadi et al. |
| 2015/0289538 A1 | 10/2015 | Ummadi et al. |
| 2015/0289540 A1 | 10/2015 | Imer |
| 2015/0296831 A1 | 10/2015 | Noth et al. |
| 2015/0296833 A1 | 10/2015 | Ummadi et al. |
| 2015/0327571 A1 | 11/2015 | Amend |
| 2015/0351426 A1 | 12/2015 | Ricco et al. |
| 2015/0351430 A1 | 12/2015 | Pipe et al. |
| 2016/0135479 A1 | 5/2016 | Ummadi et al. |
| 2016/0192675 A1 | 7/2016 | Abu-Ali |
| 2016/0213026 A1 | 7/2016 | Lepagnol et al. |
| 2016/0214787 A1 | 7/2016 | Iotti |
| 2016/0235089 A1 | 8/2016 | Ricco et al. |
| 2016/0255858 A1 | 9/2016 | Noth et al. |
| 2016/0270424 A1 | 9/2016 | Noth et al. |
| 2016/0278401 A1 | 9/2016 | Noth et al. |
| 2016/0309739 A1 | 10/2016 | Chandrsekaran |
| 2016/0309740 A1 | 10/2016 | Bunce et al. |
| 2016/0309741 A1 | 10/2016 | Zhou et al. |
| 2016/0309742 A1 | 10/2016 | Ma et al. |
| 2016/0316778 A1 | 11/2016 | Nagy et al. |
| 2016/0316784 A1 | 11/2016 | Chandrasekaran |
| 2016/0338378 A1 | 11/2016 | Ummadi et al. |
| 2016/0347525 A1 | 12/2016 | Butscher et al. |
| 2017/0000162 A1 | 1/2017 | Lallemand et al. |
| 2017/0042182 A1 | 2/2017 | Olmos et al. |
| 2017/0042183 A1 | 2/2017 | Puaud et al. |
| 2017/0042184 A1 | 2/2017 | Olmos et al. |
| 2017/0079305 A1 | 3/2017 | Barniol Gutierrez et al. |
| 2017/0188600 A1 | 7/2017 | Scharfman et al. |
| 2017/0215456 A1 | 8/2017 | Noth et al. |
| 2017/0217648 A1 | 8/2017 | Bouzaid et al. |
| 2017/0225879 A1 | 8/2017 | Stein et al. |
| 2017/0265495 A1 | 9/2017 | Amend |
| 2017/0275086 A1 | 9/2017 | Perentes et al. |
| 2017/0275088 A1 | 9/2017 | Bouzaid et al. |
| 2017/0280745 A1 | 10/2017 | Herbert et al. |
| 2017/0318833 A1 | 11/2017 | Curschellas et al. |
| 2017/0326749 A1 | 11/2017 | Amend |
| 2017/0332656 A1 | 11/2017 | Amend |
| 2017/0339976 A1 | 11/2017 | Amend |
| 2017/0360061 A1 | 12/2017 | Fonte |
| 2017/0367371 A1 | 12/2017 | Lebleu et al. |
| 2018/0042279 A1 | 2/2018 | Kerler et al. |
| 2018/0064127 A1 | 3/2018 | Chisholm et al. |
| 2018/0064131 A1 | 3/2018 | Noth |
| 2018/0064132 A1 | 3/2018 | Noth |
| 2018/0084800 A1 | 3/2018 | Noth |
| 2018/0092378 A1 | 4/2018 | Webering et al. |
| 2018/0146695 A1 | 5/2018 | Amend et al. |
| 2018/0146699 A1 | 5/2018 | Vafeiadi et al. |
| 2018/0177545 A1 | 5/2018 | Noth |
| 2018/0213816 A1 | 8/2018 | Amend |
| 2018/0263274 A1 | 9/2018 | Ray et al. |
| 2018/0271115 A1 | 9/2018 | Ray et al. |

(56) References Cited

U.S. PATENT DOCUMENTS

| | | |
|---|---|---|
| 2019/0254307 A1 | 8/2019 | Noth et al. |
| 2019/0269148 A1 | 9/2019 | Bouzaid et al. |
| 2019/0270555 A1 | 9/2019 | Noth et al. |
| 2019/0291947 A1 | 9/2019 | Kruger |
| 2019/0325182 A1 | 10/2019 | Noth et al. |
| 2019/0329948 A1 | 10/2019 | Ritzenhoff et al. |

FOREIGN PATENT DOCUMENTS

| | | |
|---|---|---|
| EP | 2266418 | 12/2010 |
| EP | 2281464 | 2/2011 |
| EP | 2679100 | 1/2014 |
| EP | 2775855 | 9/2014 |
| EP | 3044125 | 7/2016 |
| EP | 3160870 | 5/2017 |
| FR | 250108 A1 | 9/1982 |
| WO | WO 1996/001224 | 1/1996 |
| WO | WO 2004/054380 A1 | 7/2004 |
| WO | WO 2015/077825 A1 | 11/2006 |
| WO | WO 2010/103483 A2 | 9/2010 |
| WO | WO 2013/121421 | 8/2013 |
| WO | WO 2015/063094 A1 | 5/2015 |
| WO | WO 2016/079641 | 5/2016 |
| WO | WO 2016/081477 A2 | 5/2016 |
| WO | WO 2017/087970 A2 | 5/2017 |
| WO | WO 2017/139395 A1 | 8/2017 |

OTHER PUBLICATIONS

Authorized Officer Gwenaelle Llorca, European Patent Office, International Application No. PCT/US2019/013286, "Invitation to Pay Additional Fees and, Where Applicable, Protest Fee", International Searching Authority, Apr. 4, 2019, 19 pages.

U.S. Appl. No. 10/334,868, filed Jul. 2, 2019, Fonte.

U.S. Appl. No. 10/426,180, filed Oct. 1, 2019, Fonte.

PCT International Search Report and Written Opinion in International Appln. No. PCT/US2019/046954, dated Nov. 21, 2019, 20 pages.

PCT Invitation to Pay Additional Fees in International Appln. No. PCT/US2019/046946, dated Dec. 2, 2019, 19 pages.

EP Extended Search Report in European Appln. No. 17814210.5, dated Jan. 24, 2020, 11 Pages.

U.S. Notice of Allowance in U.S. Appl. No. 16/592,031, dated Jan. 10, 2020, 8 pages.

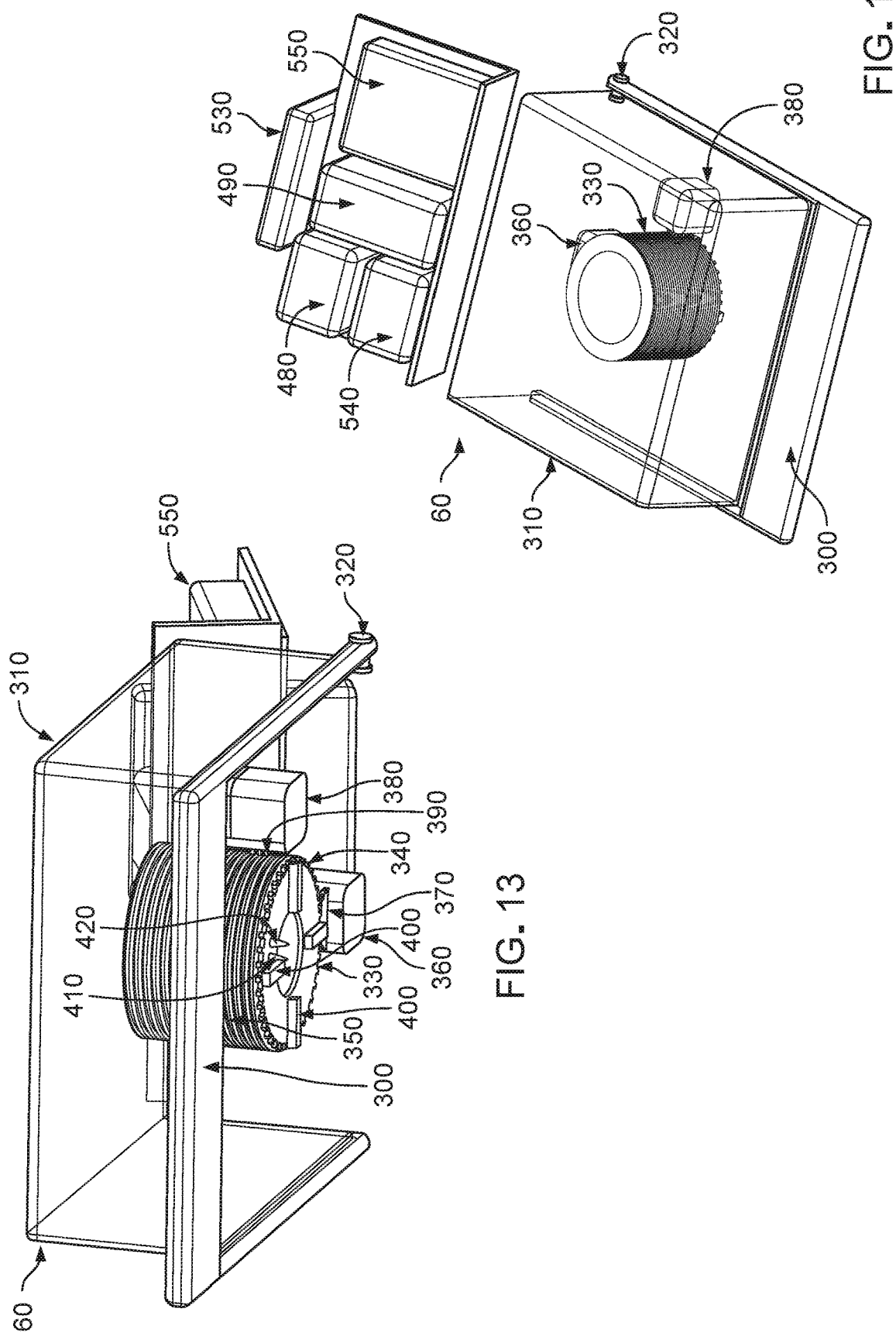

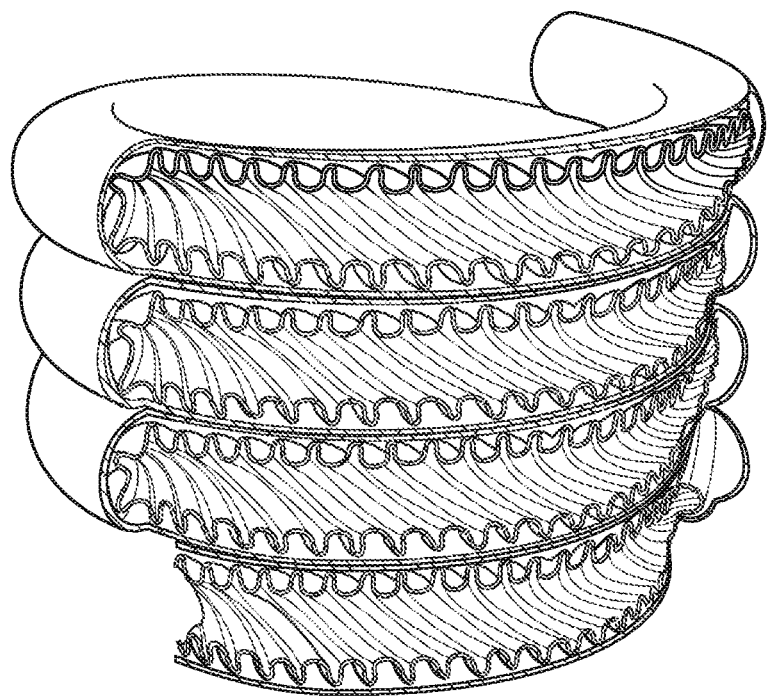
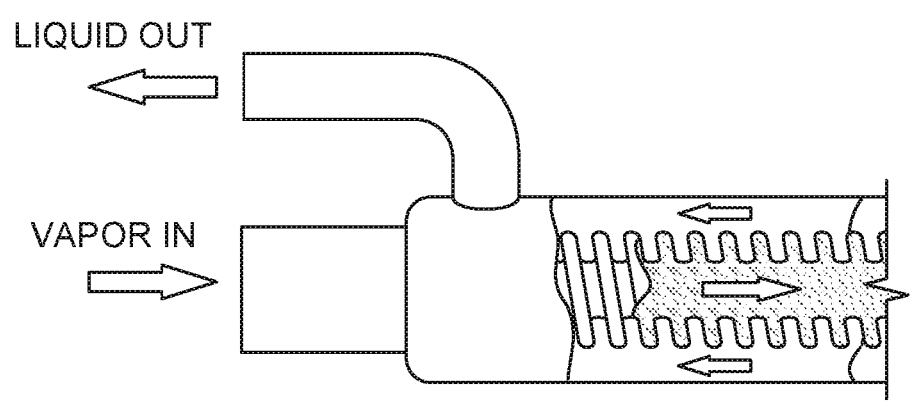
FIG. 37

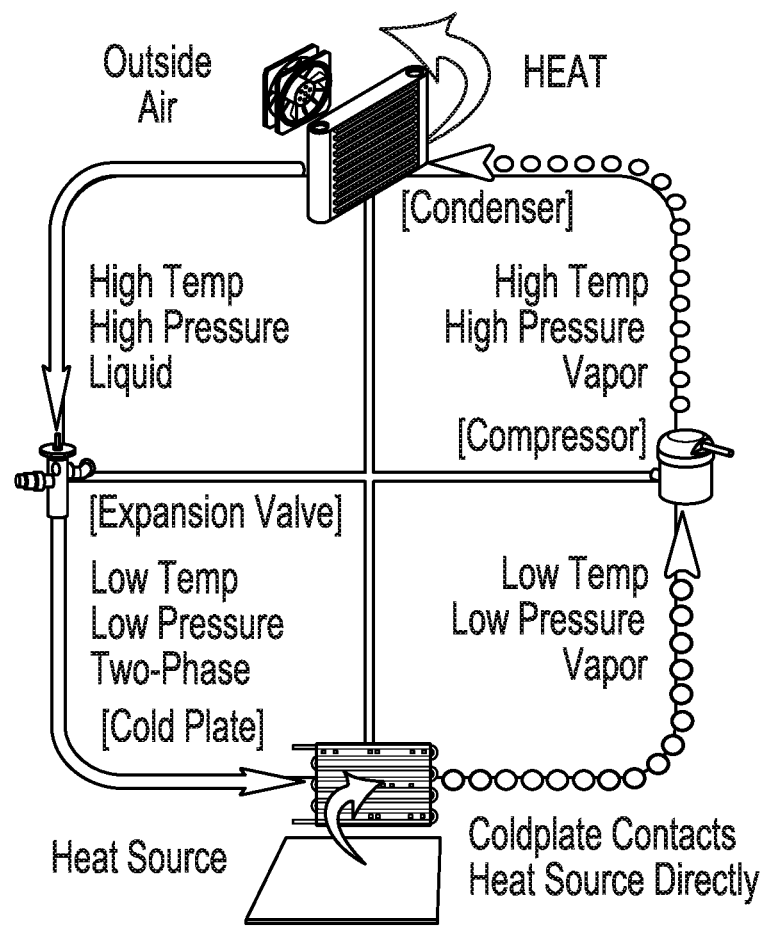
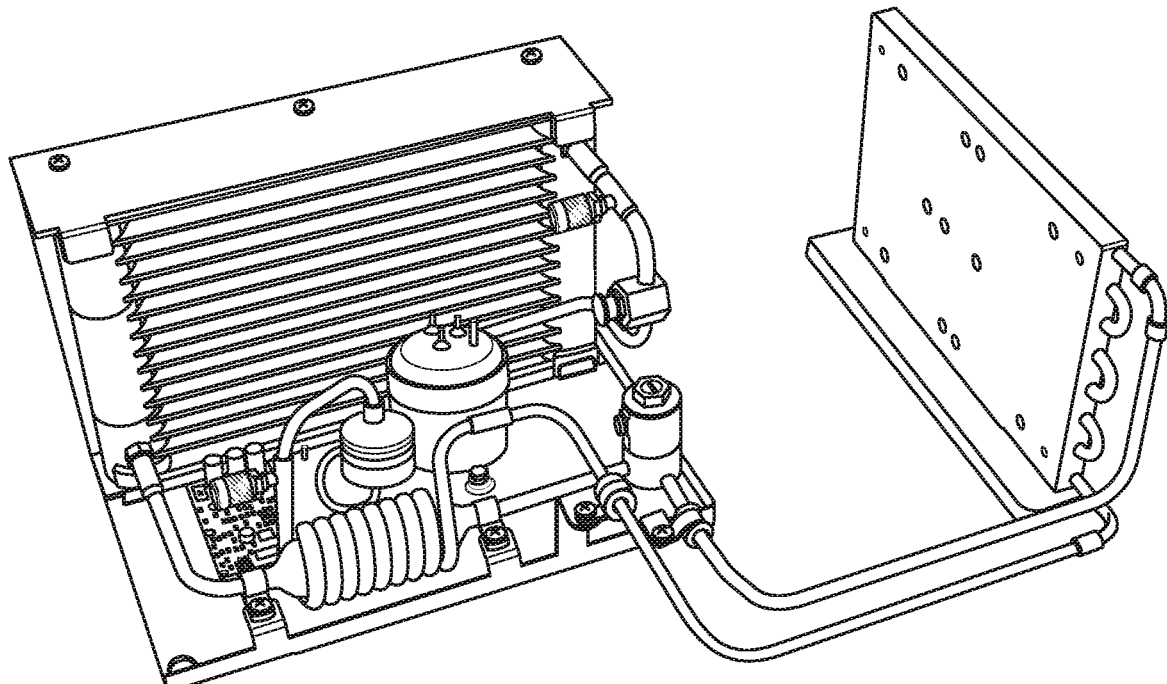
FIG. 38

SYSTEM FOR PROVIDING A SINGLE SERVING OF A FROZEN CONFECTION

REFERENCE TO PENDING PRIOR PATENT APPLICATIONS

This patent application:

(1) is a continuation of pending prior U.S. patent application Ser. No. 16/360,220, filed Mar. 21, 2019 by Sigma Phase, Corp. and Matthew Fonte for SYSTEM FOR PROVIDING A SINGLE SERVING OF A FROZEN CONFECTION, which patent application:

(2) is a continuation of prior U.S. patent application Ser. No. 16/104,758, filed Aug. 17, 2018n now U.S. Pat. No. 10,334,868, issued Jul. 2, 2019, by Sigma Phase, Corp. and Matthew Fonte for SYSTEM FOR PROVIDING A SINGLE SERVING OF A FROZEN CONFECTION, which patent application:

(3) is a continuation-in-part of prior U.S. patent application Ser. No. 15/625,690, filed Jun. 16, 2017, now U.S. Pat. No. 10,358,284, issued Jul. 23, 2019, by Sigma Phase, Corp. and Matthew Fonte for SYSTEM FOR PROVIDING A SINGLE SERVING OF A FROZEN CONFECTION, which patent application:

(a) claims benefit of prior U.S. Provisional Patent Application Ser. No. 62/351,001, filed Jun. 16, 2016 by Xciting Innovations, LLC for SINGLE SERVE ICE CREAM MACHINE: COMPRESSOR, VORTEX TUBE, SPRAY NOZZLE, SINGLE POD OF DRY ICE CREAM MIX; and (4) claims benefit of prior U.S. Provisional Patent Application Ser. No. 62/616,742, filed Jan. 12, 2018 by Sigma Phase, Corp. and Matthew Fonte for SYSTEM FOR PROVIDING A SINGLE SERVING OF A FROZEN CONFECTION.

The five (5) above-identified patent applications are hereby incorporated herein by reference.

FIELD OF THE INVENTION

This invention relates generally to systems for providing a frozen confection (e.g., "soft serve" or regular ("hard") ice cream, frozen yogurt, frozen protein shakes, smoothies, etc.), and more particularly to systems for providing a single serving of a frozen confection.

BACKGROUND OF THE INVENTION

Current domestic ice cream makers are generally designed to produce relatively large batches of ice cream, typically ranging from 1.0 liter to 2.0 liters or more, in a time period of approximately 20-60 minutes. In addition, most current domestic ice cream makers also require that the containers (within which the ice cream will be produced) be "frozen" before making the ice cream, i.e., the container must be placed in a freezer for approximately 4-8 hours before use. Thus, there is a substantial delay between the time that the making of the ice cream commences and the time that the batch of ice cream is completed. Furthermore, even after the batch of ice cream has been completed, it is still necessary to manually remove the ice cream from the ice cream maker, and then it is also necessary to scoop out single servings of the ice cream into a separate container (e.g., a bowl, a cone, etc.) for consumption.

Thus there is a need for a new system for providing a single serving of a frozen confection, in a reduced period of time, and which is dispensed directly into the container (e.g., a bowl, a cone, etc.) from which it will be consumed.

In addition, it would also be desirable for the same system to be capable of providing a single serving of a cold beverage, and/or a single serving of a hot beverage.

SUMMARY OF THE INVENTION

The present invention comprises the provision and use of a novel system for providing a single serving of a frozen confection, in a reduced period of time, and which is dispensed directly into the container (e.g., a bowl, a cone, etc.) from which it will be consumed. The novel system is small enough to fit onto kitchen countertops, fit underneath kitchen cabinets (which are typically 18 inches in height or less), be powered by 120 volt kitchen electric wall sockets with a maximum of 1800 watts, and weigh less than 50 lbs. The novel system is capable of making at least 5 fluid ounces of frozen confection in approximately 5 minutes or less and is capable of producing at least 4 batches of frozen confection sequentially without any lag time between the batches.

In addition, the same system is also capable of providing a single serving of a cold beverage, and/or a single serving of a hot beverage.

In one preferred form of the invention, there is provided apparatus for providing a single serving of an ingestible substance, the apparatus comprising:

a nest for receiving a pod containing at least one ingredient for forming a single serving of the ingestible substance, wherein the nest comprises an annular recess for receiving a pod having an annular configuration;

a cooling unit for cooling the pod; and a water supply for introducing water into the pod.

In another preferred form of the invention, there is provided apparatus for providing and dispensing a single serving of a ingestible substance, the apparatus comprising:

a nest for receiving a pod containing at least one ingredient for forming a single serving of the ingestible substance, wherein the pod comprises at least one internal paddle;

a cooling unit for cooling the pod;

a water supply for introducing water into the pod; and a rotation unit for rotating the at least one internal paddle of the pod.

In another preferred form of the invention, there is provided apparatus for providing a single serving of an ingestible substance, the apparatus comprising:

a nest for receiving a pod containing at least one ingredient for forming a single serving of the ingestible substance;

a heat transfer unit for transferring heat between the pod and the nest, wherein the heat transfer unit is capable of (i) taking heat out of the pod, and (ii) supplying heat to the pod; and a water supply for introducing water into the pod.

In another preferred form of the invention, there is provided a method for providing a single serving of a frozen confection, the method comprising:

providing a pod comprising at least one ingredient for providing a single serving of a frozen confection;

cooling the pod;

introducing water into the pod;

simultaneously stirring the contents of the pod while scraping at least one wall of the pod to prevent a build-up of the frozen confection on the at least one wall of the pod; and ejecting the frozen confection out of the pod.

In another preferred form of the invention, there is provided a pod for providing a single serving of an ingestible substance, the pod comprising:

a sealed container comprising:
at least one ingredient disposed within the sealed container for forming a single serving of the ingestible substance; and
at least one paddle disposed within the sealed container for agitating the at least one ingredient.

In still other forms of the invention, novel systems are disclosed for providing a single serving of a frozen confection.

And in still other forms of the invention, novel pods are disclosed for providing a single serving of a frozen confection.

In another form of the invention, there is provided a method for providing a single serving of ice cream, said method comprising:

providing:
a pod comprising:
a tapered body having a smaller first end, a larger second end and a side wall extending therebetween, said tapered body defining an interior;
a cap permanently mounted to said larger second end of said tapered body;
a scraper mixing paddle movably disposed within said interior of said tapered body, said scraper mixing paddle comprising a blade;
an exit port formed in said first end of said tapered body and communicating with said interior of said tapered body; and
an ingredient for providing a single serving of ice cream when cooled; and
a nest comprising a tapered cavity having a smaller first end, a larger second end and a side wall extending therebetween;
inserting said pod into said second end of said tapered cavity of said nest and causing said side wall of said tapered body of said pod to seat substantially flush against said side wall of said tapered cavity of said nest;
cooling said nest and rotating said scraper mixing paddle so as to stir said ingredient as said ingredient is converted into ice cream, with said blade of said scraper mixing paddle contacting, and riding against and scraping, said side wall of said pod;
opening said exit port; and
dispensing said ice cream from said pod through said exit port.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIGS. 13 and 14 are schematic views showing further details of (i) the lid assembly of the system shown in FIGS. 1-6, (ii) portions of the cold water and air delivery assembly of the system shown in FIGS. 1-6, and (iii) the control electronics of the system shown in FIGS. 1-6;

FIG. 37 is a schematic view showing a coaxial tube for delivering the refrigerant driven by the compressor with enhanced efficiency;

FIG. 38 is a schematic view showing a direct expansion system which may be used to cool the nest assembly;

DETAILED DESCRIPTION OF THE PREFERRED EMBODIMENTS

Figure 1:
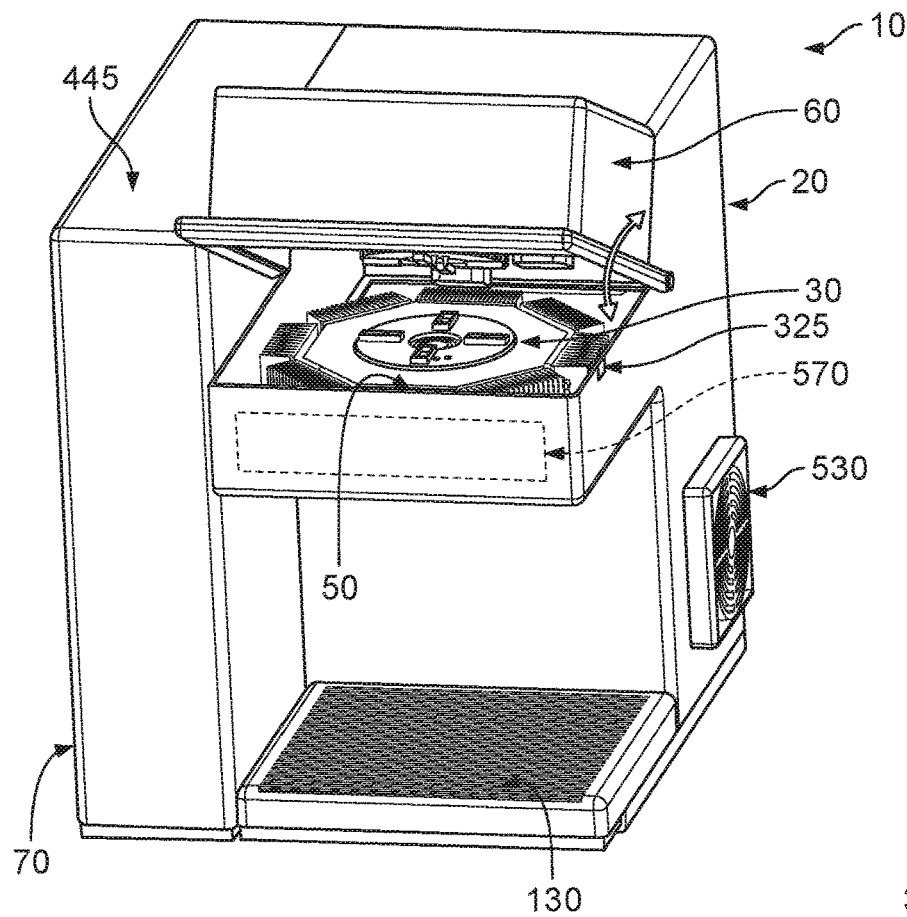
FIGS. 1-6 are schematic views showing a novel system for providing a single serving of a frozen confection, wherein all of the components of the system are shown in FIGS. 1-3 as being opaque and wherein some of the components of the system are shown in FIGS. 4-6 as being transparent.
Figure 2:
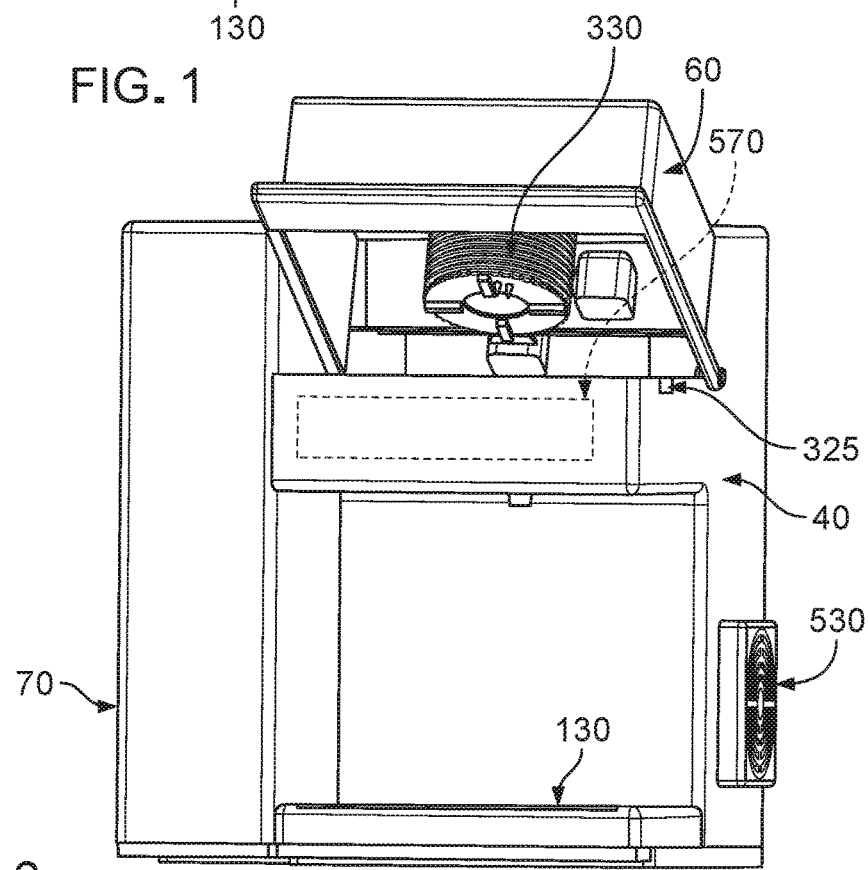
Figure 3:
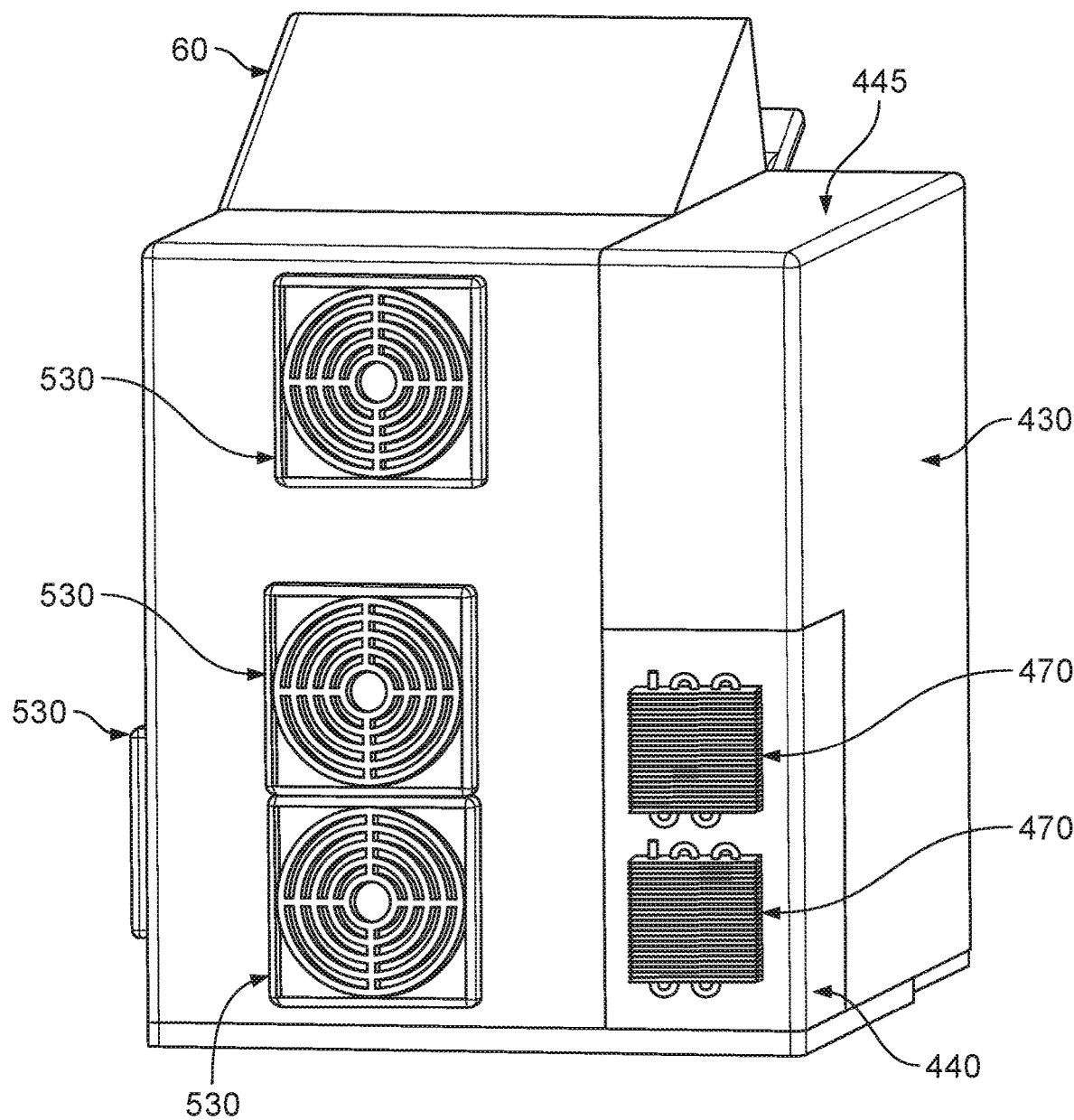
Figure 4:
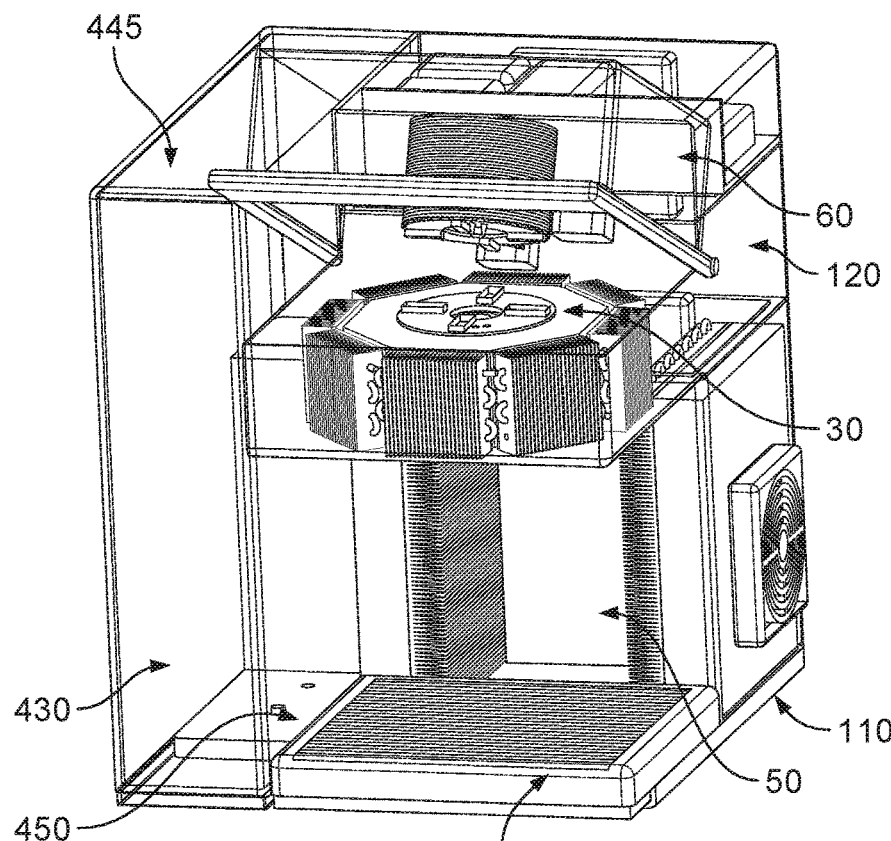
Figure 5:
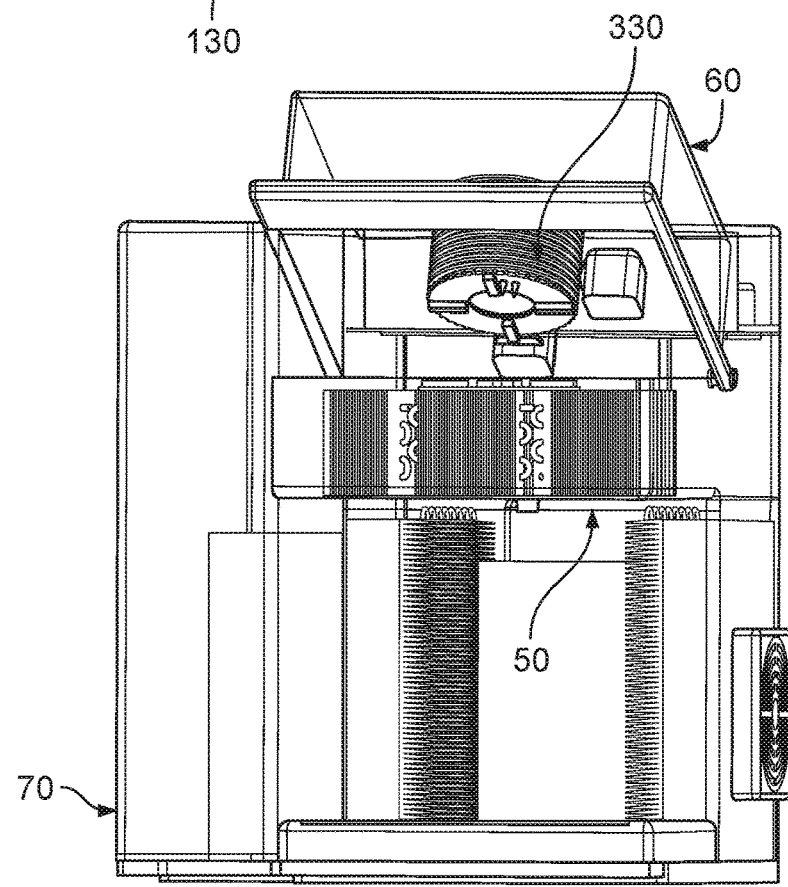

The present invention comprises the provision and use of a novel system for providing a single serving of a frozen confection, in a reduced period of time, and which is dispensed directly into the container (e.g., a bowl, a cone, etc.) from which it will be consumed.

In addition, the same system is also capable of providing a single serving of a cold beverage, and/or a single serving of a hot beverage.

The System in General

In one preferred form of the invention, and looking first at FIGS. 1-6, there is provided a novel system 10 for providing a single serving of a frozen confection (e.g., ice cream, frozen yogurt, a smoothie, etc.). System 10 is also capable of providing a single serving of a cold beverage, and/or a single serving of a hot beverage.

For clarity of explanation, system 10 will first be described in the context of providing a single serving of a frozen confection; then system 10 will be described in the context of providing a single serving of a cold beverage; and then system 10 will be described in the context of providing a single serving of a hot beverage.

System 10 generally comprises a machine 20 and a pod 30, wherein machine 20 is configured to, among other things, receive a pod 30 containing a supply of ingredients for forming a single serving of the frozen confection, cool pod 30 (and its contents), introduce cold water and air into pod 30, agitate the contents of pod 30 so as to form the frozen confection, and then eject the frozen confection from pod 30 directly into the container (e.g., a bowl, a cone, etc.) from which it will be consumed.

The Machine

Machine 20 is configured to, among other things, receive a pod 30 containing a supply of ingredients for forming a single serving of the frozen confection, cool pod 30 (and its contents), introduce cold water and air into pod 30, agitate the contents of pod 30 so as to form the frozen confection, and then eject the frozen confection from pod 30 directly into the container (e.g., a bowl, a cone, etc.) from which it will be consumed.

To this end, machine 20 is a reusable device which generally comprises a housing 40, a nest assembly 50, a lid assembly 60, a water supply 70, a cold water and air delivery assembly 80, a heat dissipation assembly 90 and control electronics 100.

Housing 40 is shown in FIGS. 1-6. Housing 40 generally comprises a base 110, a cover 120 mounted to base 110, and a tray 130 mounted to base 110. Cover 120 serves to enclose interior components of machine 20 and to support other components of machine 20. Tray 130 serves to receive a container (e.g., a bowl) into which the frozen confection is to be ejected and from which the frozen confection is to be consumed (alternatively, where the frozen confection is to be consumed from a cone, the cone is held above tray 130). If desired, a cooling element (e.g., a thermoelectric (TEC) assembly comprising a thermoelectric cooler (TEC) element) may be disposed in the base of tray 130 so that tray 130 can "pre-cool" a container (e.g., a bowl) which is to receive the frozen confection.

Nest assembly 50 is shown in further detail in FIGS. 7-12. Nest assembly 50 serves to receive a pod 30 containing a supply of ingredients for forming a single serving of the frozen confection and, among other things, rapidly cool pod 30 (and its contents) so as to provide a single serving of a frozen confection in a reduced period of time. To this end, and as will hereinafter be discussed, nest assembly 50 and pod 30 are each provided with a unique configuration and a unique construction so as to speed up cooling of pod 30.

More particularly, nest assembly 50 generally comprises a nest 140 having a top surface 150, a bottom surface 160 and a plurality of outer faces 170. In one preferred form of the invention, nest 140 has eight outer faces 170, so that nest 140 has a generally octagonal configuration. Alternatively, nest 140 may have a different number of outer faces 170. Nest 140 is preferably formed out of a high heat-transfer material such as aluminum.

Nest 140 also comprises a bore 180 and a counterbore 190. A hollow cylinder 200 is disposed in bore 180 and extends upward into counterbore 190. As a result of this construction, an annular recess 210 (i.e., a toroidal recess 210) is formed in top surface 150 of nest 140. Annular recess 210 is generally characterized by an outer wall 220 (which is defined by the aforementioned counterbore 190) and an inner wall 230 (which is defined by the aforementioned hollow cylinder 200). Annular recess 210 is sized to receive pod 30 therein as will hereinafter be discussed.

Nest 140 also comprises a bore 232 which opens on bottom surface 160 of nest 140 and communicates with the interior of annular recess 210. An exit nozzle 233 is mounted to bottom surface 160 of nest 140 at bore 232 so that exit port 234 of exit nozzle 233 communicates with the interior of annular recess 210. A pod sensor 235 is provided in nest 140 to detect when a pod 30 is disposed in annular recess 210 of nest 140.

Figure 7:
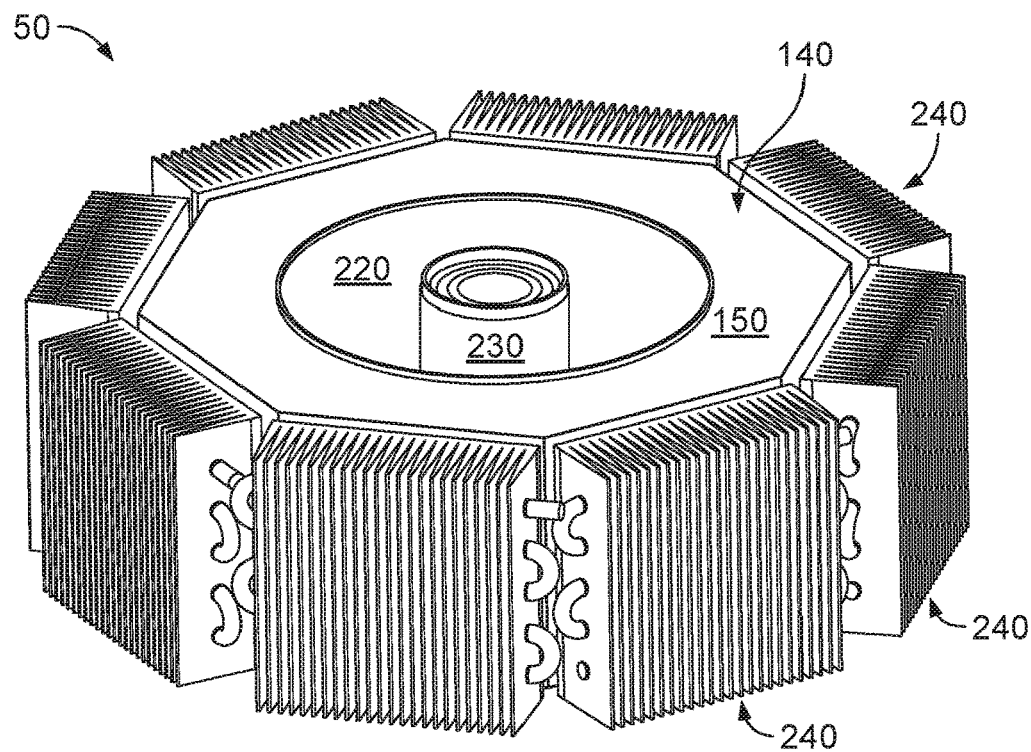
FIGS. 7-12 are schematic views showing further details of the nest assembly of the system shown in FIGS. 1-6.
Figure 8:
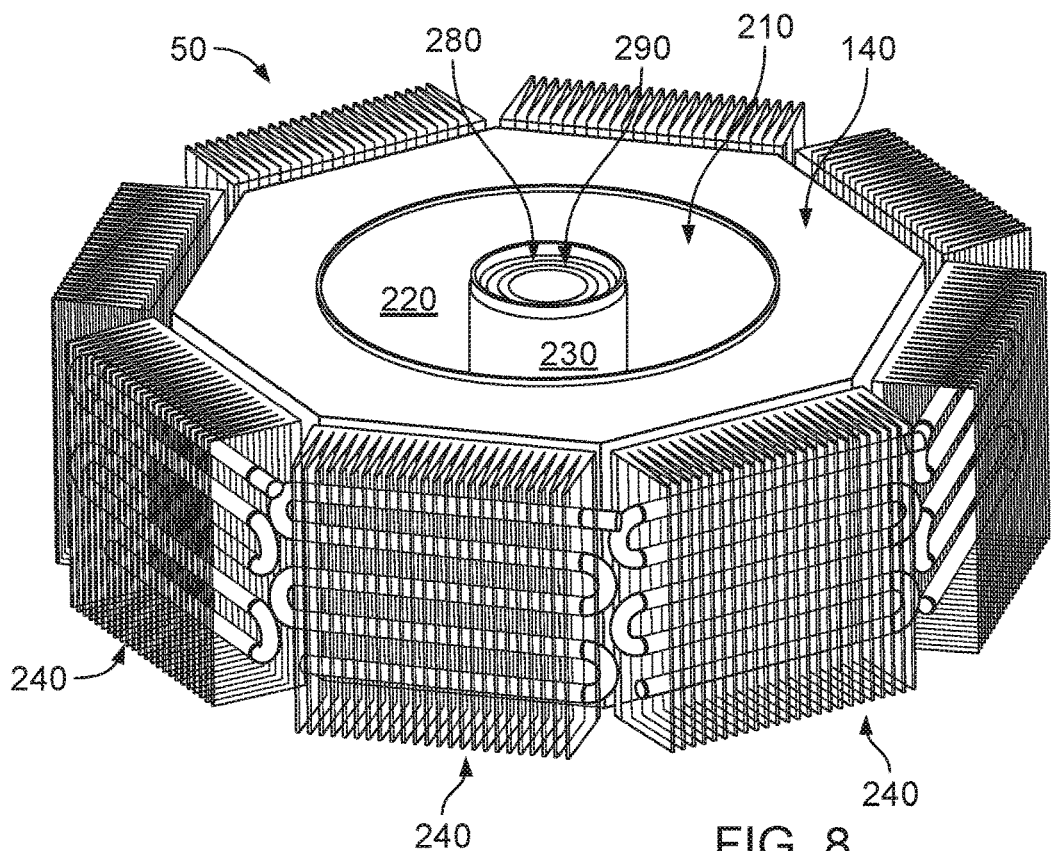
Figure 10:
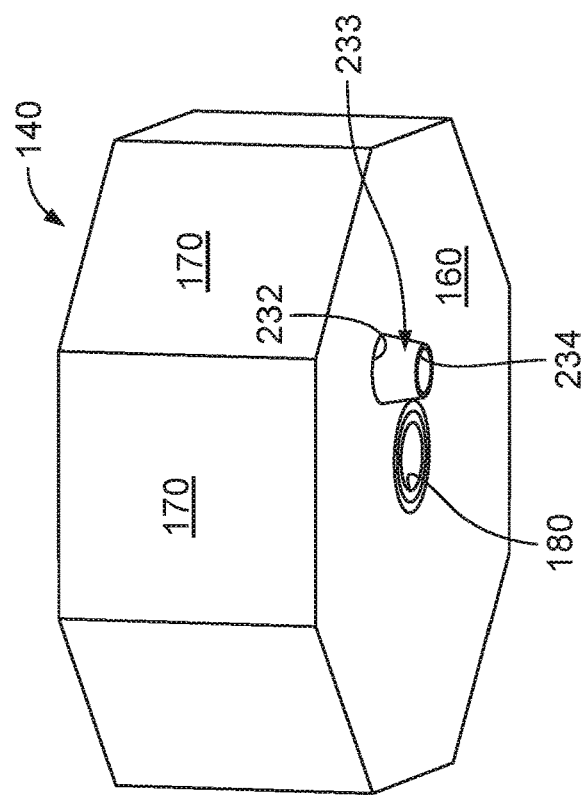
Figure 9:
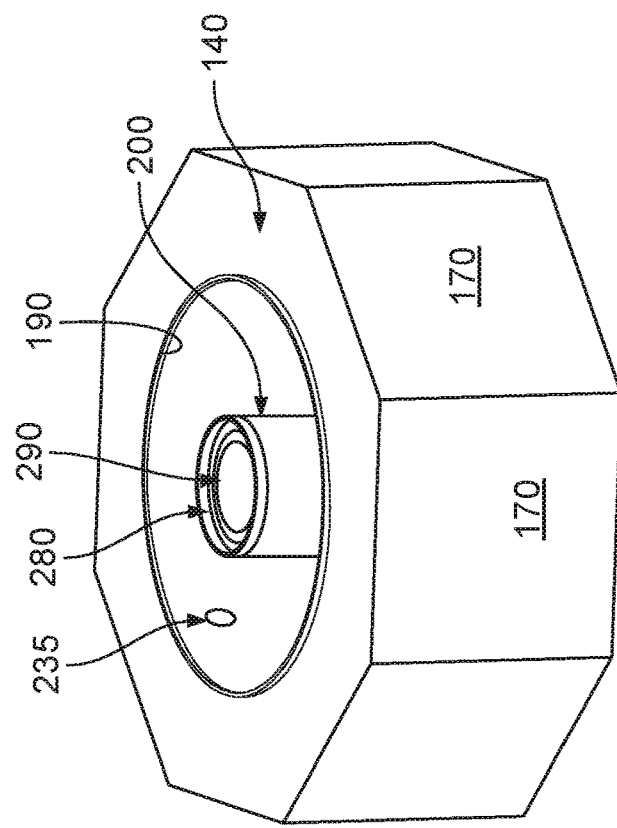
Figure 11:
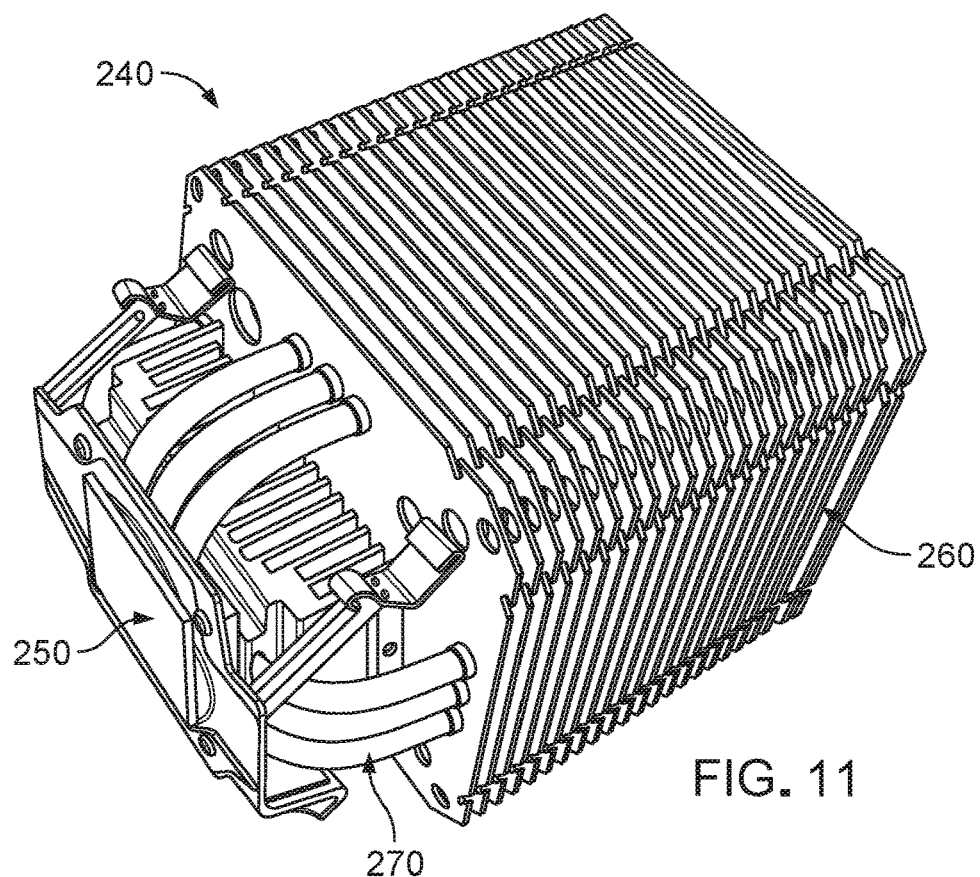

Nest assembly 50 also comprises a plurality of thermoelectric (TEC) assemblies 240. TEC assemblies 240 each comprise a thermoelectric cooler (TEC) element 250, a heat sink 260 and a plurality of heat pipes 270 extending between TEC element 250 and heat sink 260 so as to transfer heat from TEC element 250 to heat sink 260. If desired, multiple TEC elements 250 can be stacked on each heat sink 260 so as to achieve higher temperature differences than can be had with single-stage TEC elements 250. As seen in FIGS. 7, 8 and 11, TEC assemblies 240 are positioned against outer faces 170 of nest 140 so that TEC elements 250 can provide cold or heat to outer faces 170 of nest 140, depending on the direction of the electric current flow supplied to TEC elements 250, whereby to provide cold or heat to outer wall 220 of annular recess 210 of nest 140 (and hence to provide cold or heat to a pod 30 disposed in annular recess 210 of nest 140). It will be appreciated that when machine 20 is to be used to provide a frozen confection, the direction of the electric current flow supplied to TEC elements 250 causes cold to be applied to outer faces 170 of nest 140.

Figure 12:
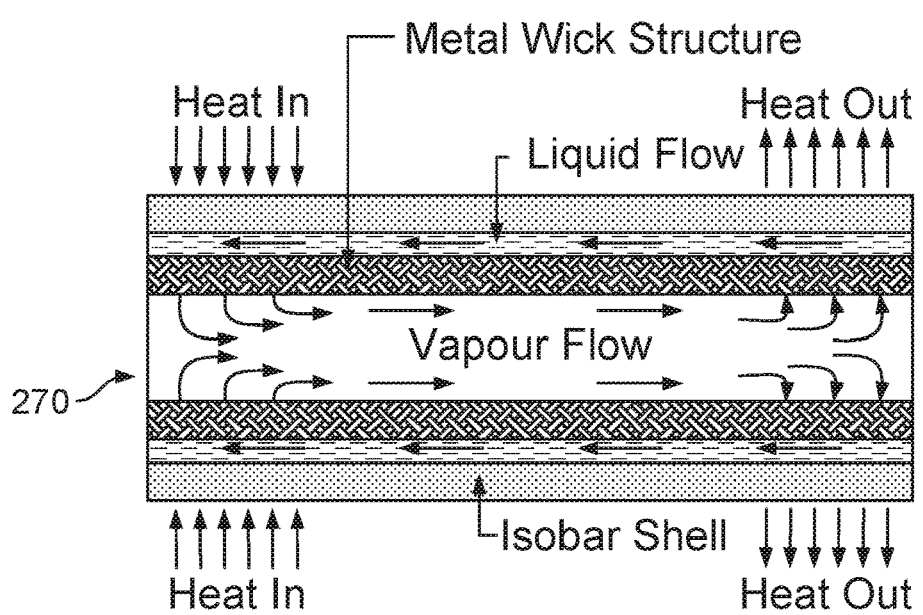

Heat pipes 270 are preferably of the sort shown in FIG. 12, i.e., they provide a high heat-transfer capacity for transferring heat from TEC elements 250 to heat sinks 260. Heat pipes 270 are preferably also connected to heat dissipation assembly 90 so as to carry the heat collected by heat pipes 270 to heat dissipation assembly 90 for further dissipation to the environment.

Nest assembly 50 also comprises a cylindrical TEC 280 for providing cold to inner wall 230 of annular recess 210, and a cylindrical TEC 290 for supplying heat to inner wall 230 of annular recess 210.

Lid assembly 60 is shown in further detail in FIGS. 13 and 14. Lid assembly 60 generally comprises a handle 300 to which is mounted a lid 310, such that lid 310 moves in conjunction with handle 300. Handle 300 is pivotally mounted to cover 120 of housing 40 via a pivot pin 320. As a result of this construction, lid assembly 60 can pivot towards or away from nest assembly 50 (see FIG. 1). A lid sensor 325 (FIGS. 1 and 2) is provided for detecting when lid 310 is in its closed position.

Lid assembly 60 comprises a plunger 330 which is movably mounted to lid 310. More particularly, plunger 330 comprises a circumferential gear 340 and a longitudinal gear 350, and lid assembly 60 comprises a rotation motor 360 for driving a rotation gear 370 and a vertical motor 380 for driving a vertical gear 390, with rotation gear 370 of rotation motor 360 engaging circumferential gear 340 of plunger 330, and with vertical gear 390 of vertical motor 380 engaging longitudinal gear 350 of plunger 330. As a result of this construction, rotation motor 360 can cause plunger 330 to rotate within lid 310, and vertical motor 380 can cause plunger 330 to move vertically within lid 310.

Plunger 330 further comprises a plurality of fingers 400 for engaging counterpart fingers on pod 30 (see below), and a pair of hollow fangs 410, 420 for penetrating the top of pod 30 and delivering additional ingredients into pod 30 (see below).

Looking next at FIGS. 1-6, water supply 70 generally comprises an ambient-temperature water tank 430 and a cold water tank 440. In one preferred form of the invention, ambient-temperature water tank 430 may hold approximately 2.0 liters of water, and cold water tank 440 may hold approximately 0.5 liter of water. Ambient-temperature water tank 430 comprises a removable cover 445 to enable ambient-temperature water tank 430 to be filled with water. A line (not shown) is provided for moving water from ambient-temperature water tank 430 to cold water tank 440. A water sensor 450 (FIG. 4) is provided for monitoring for the presence of water in ambient-temperature water tank 430, and a water temperature sensor 460 (FIG. 6) is provided for monitoring the temperature of the water in cold water tank 440. A plurality of TEC assemblies 470, each preferably similar to the aforementioned TEC assemblies 240, are provided for chilling the water in cold water tank 440, i.e., TEC assemblies 470 comprise TEC elements 473, heat sinks 475 and heat pipes 477. Heat pipes 477 of TEC assemblies 470 are preferably connected to heat dissipation assembly 90 so as to carry the heat produced by TEC assemblies 470 to heat dissipation assembly 90.

Figure 6:
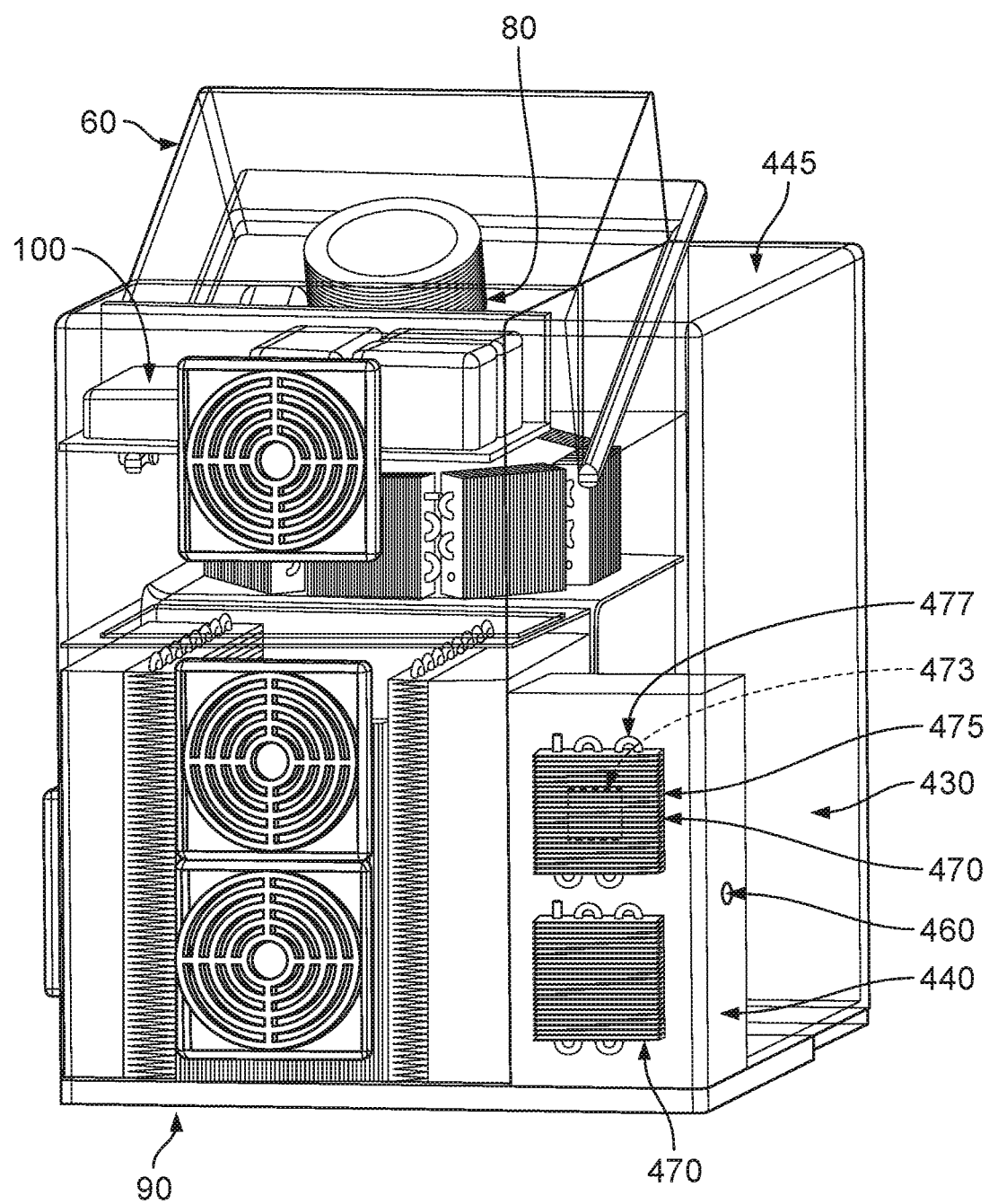

Looking next at FIGS. 6 and 14, cold water and air delivery assembly 80 generally comprises a water pump 480 which pumps cold water from cold water tank 440 into hollow fang 410 of plunger 330, and an air pump 490 which pumps air into hollow fang 420 of plunger 330. In one preferred form of the invention, hollow fang 410 comprises a spray nozzle for injecting droplets of atomized water into pod 30 (see below), whereby to facilitate the formation of the frozen confection (see below). Such spray nozzles are well known in the art of liquid dispersion. Cold water and air delivery assembly 80 also comprises various fluid lines (not shown) for transferring water from cold water tank 440 to hollow fang 410 of plunger 330 and for introducing air into hollow fang 420 of plunger 330.

Figure 15:
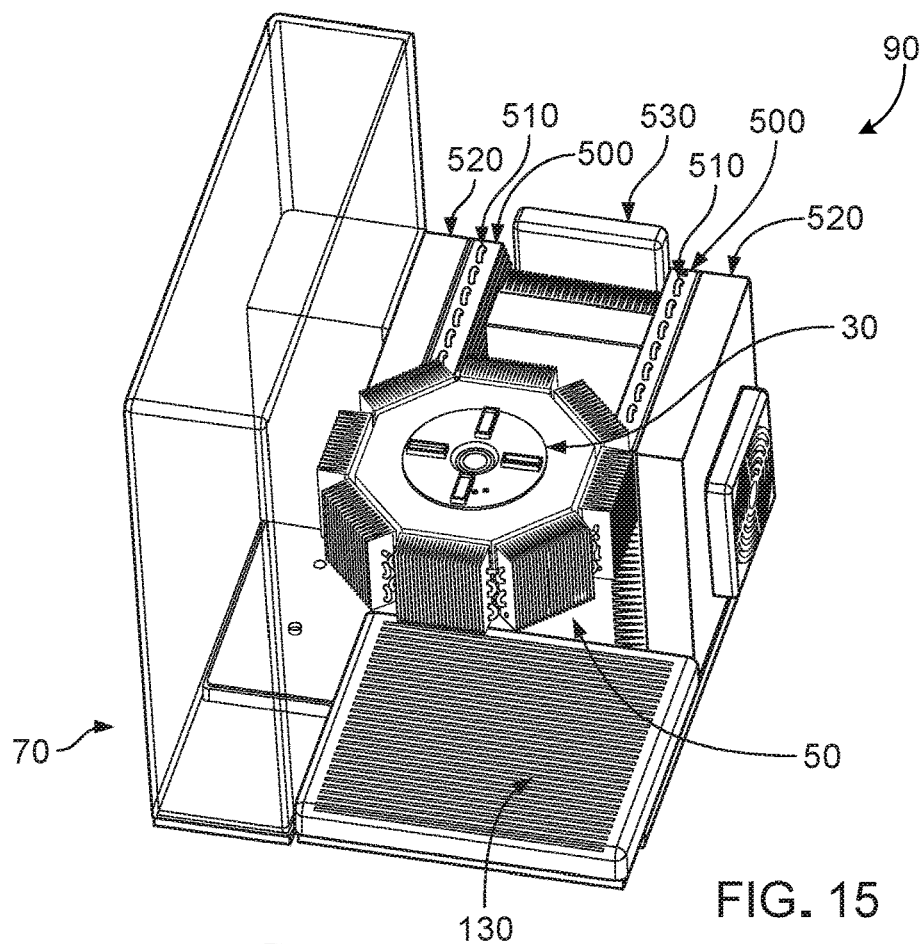
FIGS. 15 and 16 are schematic views showing, among other things, further details of the heat dissipation assembly of the system shown in FIGS. 1-6.
Figure 16:
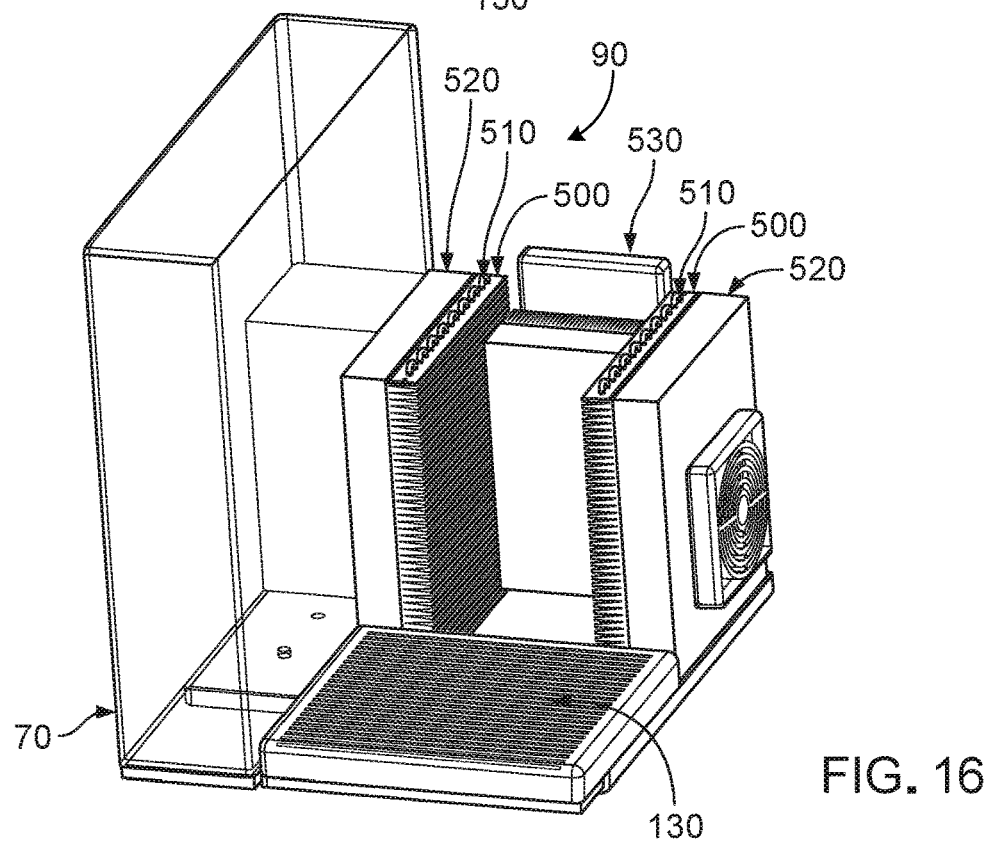

Heat dissipation assembly 90 is shown in further detail in FIGS. 15 and 16. Heat dissipation assembly 90 dissipates heat received from heat pipes 270 of TEC assemblies 240 of nest 140 and dissipates heat received from the heat pipes 477 of TEC assemblies 470 of cold water tank 440. Heat dissipation assembly 90 generally comprises a plurality of heat sinks 500 which draw heat from heat pipes 510 (which are connected to heat pipes 270 of TEC assemblies 240 of nest 140 and heat pipes 477 of TEC assemblies 470 of cold water tank 440), a plurality of condensers 520 for receiving heat from heat sinks 500, and a plurality of fans 530 for cooling condensers 520.

Figure 17:
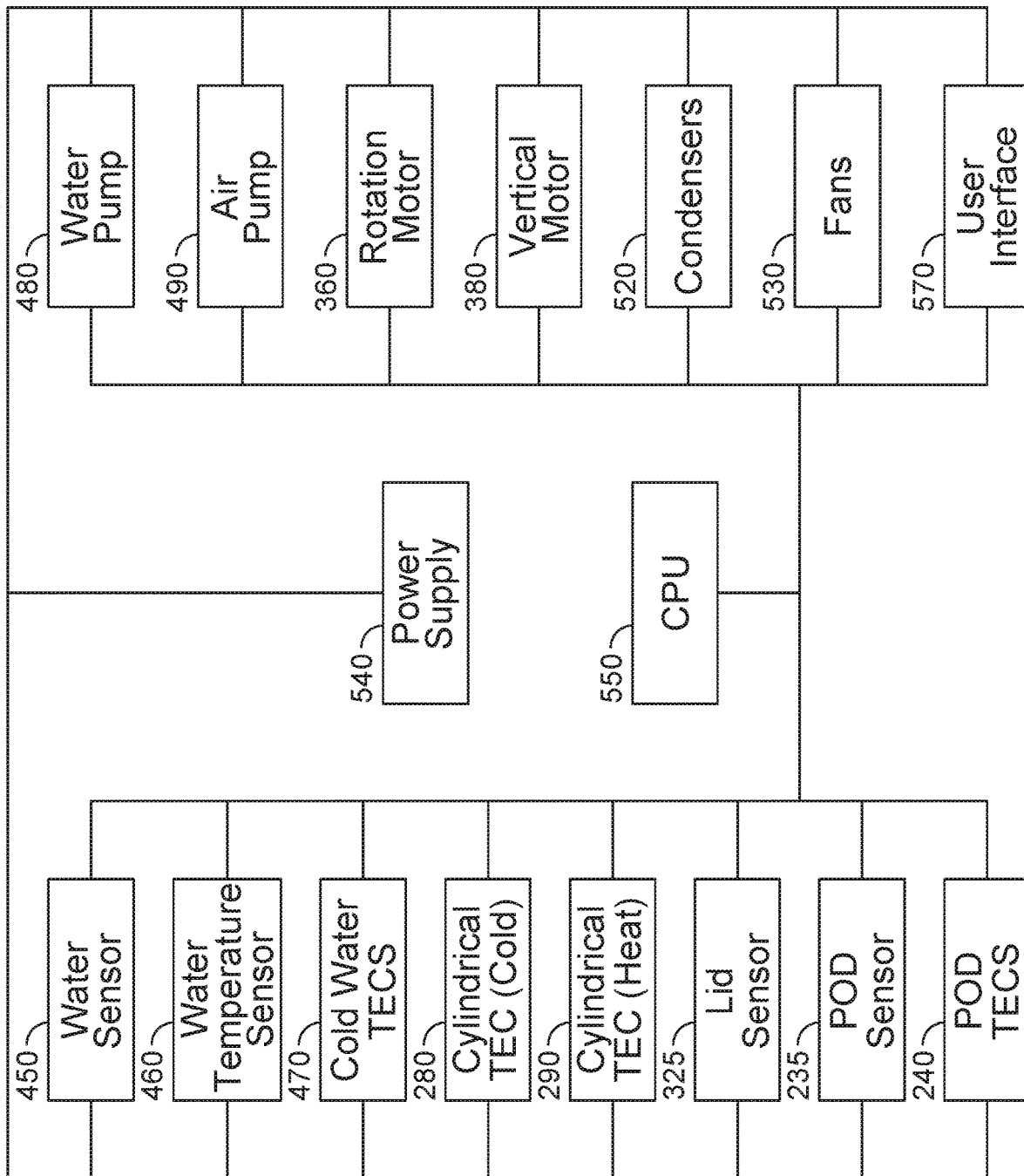
FIG. 17 is a schematic view showing further details of the control electronics of the system shown in FIGS. 1-6.

Control electronics 100 generally comprise a power supply 540 (FIG. 14), a central processing unit (CPU) 550 and a user interface 570 (FIG. 2), e.g., a display screen, operating buttons, etc. As seen in FIG. 17, power supply 540 and CPU 550 are connected to the aforementioned water sensor 450, water temperature sensor 460, TEC assemblies 470, cylindrical TEC 280, cylindrical TEC 290, lid sensor 325, pod sensor 235, TEC assemblies 240, water pump 480, air pump 490, rotation motor 360, vertical motor 380, condensers 520, fans 530 and user interface 570. CPU 550 is appropriately programmed to operate machine 20 in response to instructions received from user interface 570 as will hereinafter be discussed.

It will be appreciated that machine 20 is preferably configured to operate at a maximum load of 1800 watts, which is generally the maximum load that standard outlets in a kitchen can handle.

The Pod

Pod 30 contains a supply of ingredients for providing a single serving of a frozen confection (e.g., ice cream, frozen yogurt, a smoothie, etc.). In the preferred form of the invention, pod 30 is provided as a single-use, disposable pod, i.e., a new pod 30 is used for each serving of the frozen confection.

As noted above, and as will hereinafter be discussed, pod 30 is provided with a unique configuration and a unique construction so as to speed up cooling of pod 30 (and its contents), whereby to speed up the process of producing the frozen confection.

Figure 18:
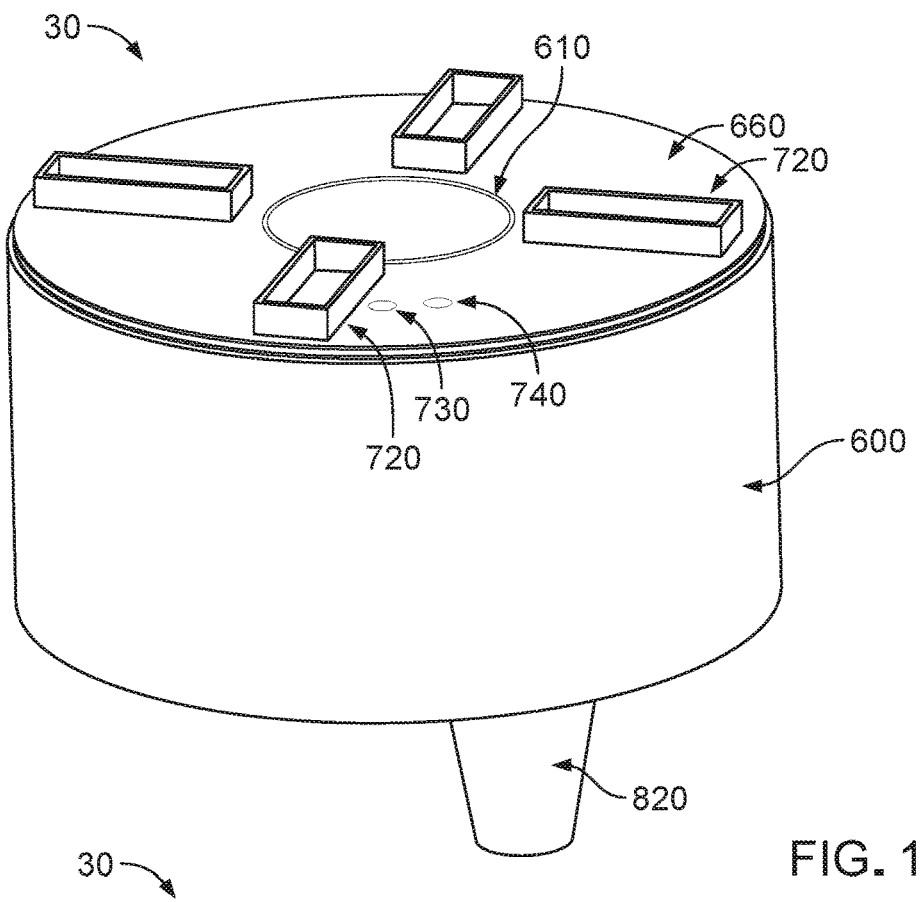
FIGS. 18-20 are schematic views showing further details of the pod of the system shown in FIGS. 1-6.
Figure 19:
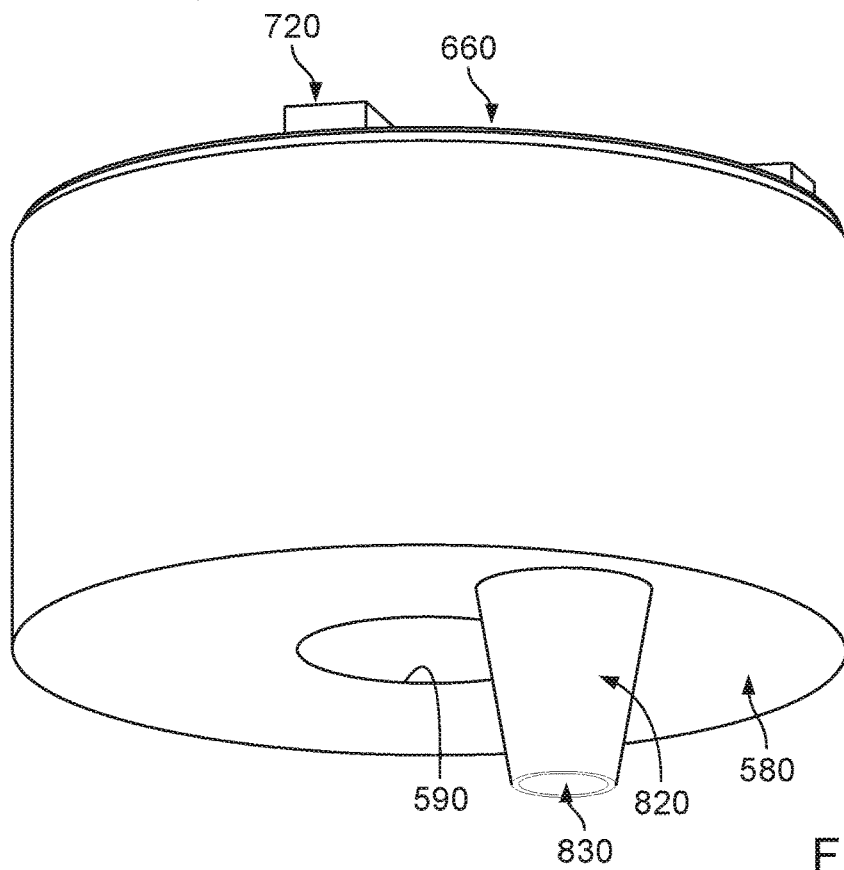
Figure 20:
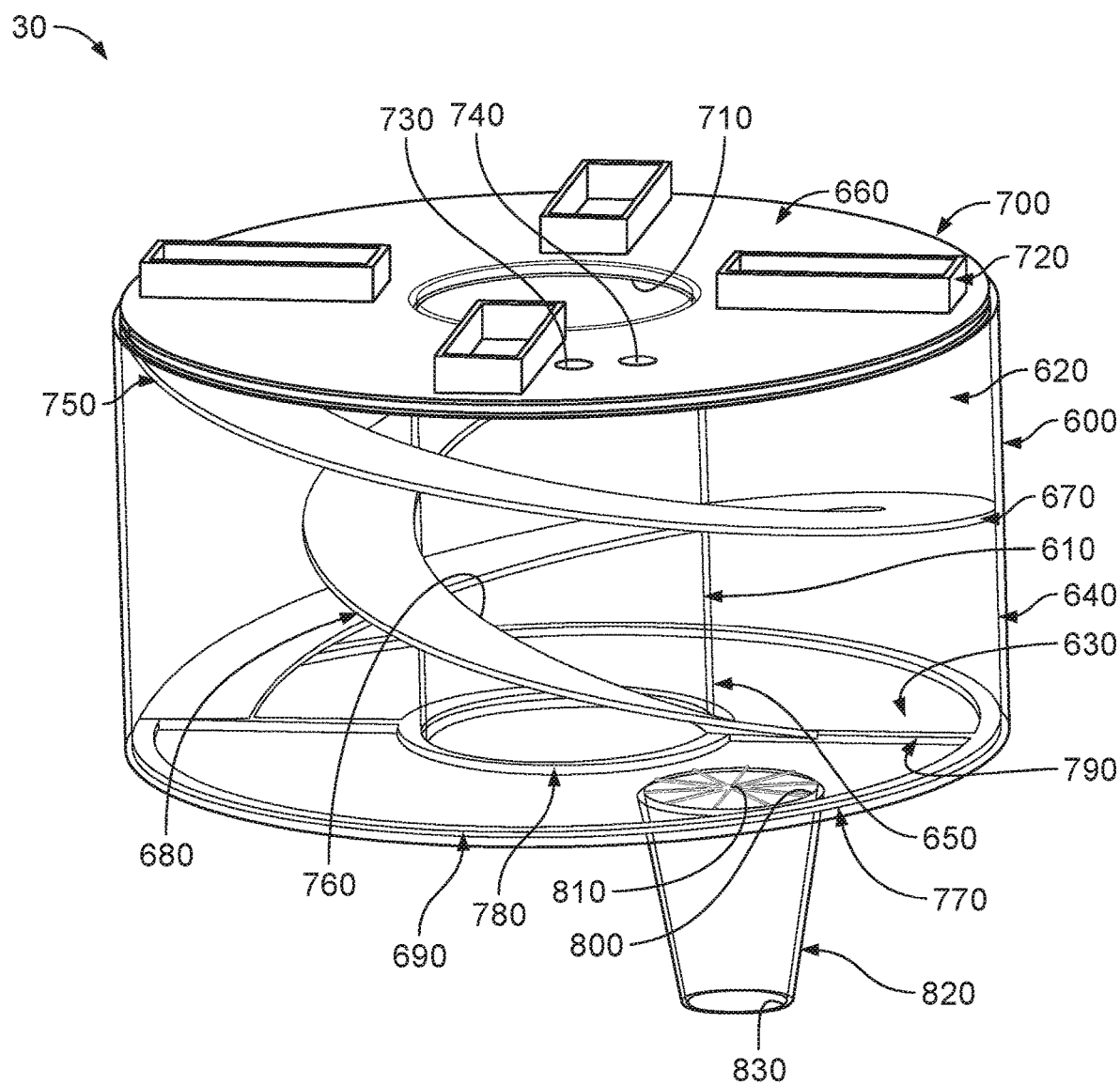

More particularly, and looking now at FIGS. 18-20, pod 30 generally comprises a base 580 having an opening 590 formed therein. An outer hollow tube 600 rises upward from the outer perimeter of base 580, and an inner hollow tube 610 is disposed in opening 590 of base 580 and rises upward from the inner perimeter of base 580. As a result of this construction, an annular recess 620 (i.e., a toroidal recess 620) is formed between base 580, outer hollow tube 600 and inner hollow tube 610, with annular recess 620 being generally characterized by a floor 630 (defined by base 580), an outer wall 640 (defined by outer hollow tube 600) and an inner wall 650 (defined by inner hollow tube 610). Note that the diameter of outer hollow tube 600 of pod 30 is slightly less than the diameter of counterbore 190 of nest 140, and the diameter of inner hollow tube 610 of pod 30 is slightly greater than the diameter of hollow cylinder 200 of nest assembly 50, such that pod 30 can be seated in annular recess 210 of nest 140, with outer hollow tube 600 of pod 30 making a close sliding fit with outer wall 220 of nest 140 and with inner hollow tube 610 of pod 30 making a close sliding fit with inner wall 230 of nest assembly 50.

Preferably base 580 of pod 30 comprises a high heat-transfer material (e.g., aluminum, a molded polymer, etc.), outer hollow tube 600 of pod 30 comprises a high heat-transfer material (e.g., aluminum, a molded polymer, etc.) and inner hollow tube 610 of pod 30 comprises a high heat-transfer material (e.g., aluminum, a molded polymer, etc.). In one preferred form of the invention, base 580, outer hollow tube 600 and inner hollow tube 610 comprise a plastic/thin metallic film composite (i.e., a body of plastic having an external covering of a thin metallic film). It should be appreciated that the plastic/thin metallic film composite allows for improved thermal transfer and helps preserve the contents of pod 30, while also providing pod 30 with a unique packaging appearance. Preferably base 580, outer hollow tube 600 and inner hollow tube 610 are substantially rigid.

Thus it will be seen that, due to the unique configurations and unique constructions of nest assembly 50 and pod 30, when a pod 30 is disposed in the annular recess 210 of nest 140, cold can be efficiently applied to outer wall 640 of pod 30 by outer wall 220 of nest 140, cold can be efficiently applied to inner wall 650 of pod 30 by inner wall 230 of nest assembly 50, and cold can be efficiently applied to base 580 of pod 30 by the floor of annular recess 210 of nest 140. As a result, machine 20 can rapidly cool pod 30 (and its contents) so as to provide a single serving of a frozen confection in a reduced period of time.

Pod 30 also comprises a cap 660, an outer helical scraper paddle 670, an inner helical scraper paddle 680, and a bottom scraper paddle 690.

Cap 660 has an outer edge 700 which is sized slightly smaller than the diameter of outer wall 640 of pod 30, and cap 660 has an inner hole 710 which has a diameter slightly larger than inner hollow tube 610 of pod 30, such that cap 660 can move longitudinally into, and then along, annular recess 620 of pod 30 (see below). Cap 660 is preferably substantially rigid.

Cap 660 also comprises fingers 720 for engaging counterpart fingers 400 of plunger 330, whereby rotational and longitudinal motion can be imparted to cap 660 of pod 30 by plunger 330, as will hereinafter be discussed. Cap 660 also comprises two weakened portions 730, 740 for penetration by hollow fangs 410, 420, respectively, of plunger 330, as will hereinafter be discussed in further detail.

Outer helical scraper paddle 670 extends between cap 660 and bottom scraper paddle 690, and comprises an outer edge 750 which makes a close sliding fit with outer wall 640 of annular recess 620. Inner helical scraper paddle 680 extends between cap 660 and bottom scraper paddle 690, and comprises an inner edge 760 which makes a close sliding fit with inner hollow tube 610 of pod 30. Bottom scraper paddle 690 comprises an outer ring 770 which contacts base 580 and makes a close sliding fit with outer wall 640 of annular recess 620, an inner ring 780 which contacts base 580 and makes a close sliding fit with inner hollow tube 610 of pod 30, and a pair of struts 790 which contact base 580 and extend between outer ring 770 and inner ring 780. As a result of this construction, fingers 720 may be used to turn cap 660 rotationally, such that outer helical scraper paddle 670 rotates, scrapping the interior surface of outer wall 640 of pod 30, inner helical scraper paddle 680 rotates, scraping the exterior surface of inner hollow tube 610, and struts 770 rotate, scraping floor 630 of base 580. It will be appreciated that the provision of outer helical scraper paddle 670, inner helical scraper paddle 680 and bottom scraper paddle 690 is highly advantageous, since outer helical scraper paddle 670, inner helical scraper paddle 680 and bottom scraper paddle 690 can simultaneously (i) agitate the contents of pod 30 so as to ensure uniform and rapid formation of the frozen confection, and (ii) prevent the build-up of frozen confection on base 580, outer hollow tube 600 and inner hollow tube 610, which could inhibit cooling of the contents of pod 30.

Outer helical scraper paddle 670 and inner helical scraper paddle 680 are configured and constructed so that they may be longitudinally compressed by applying a longitudinal force to cap 660, whereby to move cap 660 into, and along, annular recess 620 of pod 30, so as to bring cap 660 substantially into engagement with base 580 (see below). In one preferred form of the invention, outer helical scraper paddle 670 and inner helical scraper paddle 680 are made out of spring steel, with outer helical scrapper paddle 670 and inner helical scraper paddle 680 compressing to substantially flat configurations when a longitudinal force drives cap 660 against base 580 (or, more precisely, substantially against base 580, since the flattened outer helical scraper paddle 670 and the flattened inner helical scraper paddle 680 will be disposed between, and slightly separate, cap 660 from base 580). Bottom scraper paddle 690 may also be formed out of spring steel. In another preferred form of the invention, outer helical scraper paddle 670 and/or inner helical scraper paddle 680 (and/or bottom scraper paddle 690) may be made out of a plastic. If desired, outer helical scraper paddle 670 and/or inner helical scraper paddle 680 (and/or bottom scraper paddle 690) may comprise a shape memory material (e.g., Nitinol).

A bore 800 passes through base 580 and communicates with the interior of annular recess 620. A weakened portion 810 normally closes off bore 800 but may be ruptured upon the application of an appropriate force so as to pass material (e.g., frozen confection) therethrough. An exit nozzle 820 is mounted to base 580 adjacent to bore 800 so that exit port 830 of exit nozzle 820 communicates with the interior of annular recess 620 when weakened portion 810 has been ruptured.

Pod 30 generally has a surface area-to-volume ratio which is greater than 2:1, and which is preferably approximately 8:1. It will be appreciated that increasing the surface area of pod 30 increases the speed of forming the frozen confection in pod 30, since it allows heat to be drawn out of pod 30 (and its contents) more quickly. It will also be appreciated that forming pod 30 with a toroidal configuration (i.e., with both interior and exterior access surfaces) provides increased surface area and enables more rapid cooling of pod 30 and its contents, inasmuch as cold may be simultaneously applied to both the outer surfaces of pod 30 and the inner surfaces of pod 30.

By way of example but not limitation, in one preferred form of the invention, pod 30 has an outer diameter of 2.25 inches and a height of 3.75 inches (i.e., outer hollow tube 600 has an outer diameter of 2.25 inches and a height of 3.75 inches), whereby to provide a surface area of 26.49 square inches and a volume of 14.90 cubic inches; and pod 30 has an inner diameter of 1.4 inches and a height of 3.75 inches (i.e., inner hollow tube 610 has an inner diameter of 1.4 inches and a height of 3.75 inches), whereby to provide a surface area of 16.49 square inches and a volume of 5.77 cubic inches; thereby yielding a total pod surface area of 42.98 square inches (i.e., 26.49 square inches+16.49 square inches=42.98 square inches) and a total pod volume of 9.13 cubic inches (i.e., 14.90 cubic inches−5.77 cubic inches=9.13 cubic inches), and a surface area-to-volume ratio of 8.47:1.

Pod 30 contains a fresh supply of ingredients for forming the frozen confection (e.g., ice cream, frozen yogurt, smoothie, etc.). More particularly, pod 30 may contain a frozen confection mix (dry or liquid) containing, for example, sugar and powder crystals, preferably many of which are less than 50 μm in size, and preferably containing at least 0.1% stabilizers by volume. A dry frozen confection mix preferably has at least 50% of its constituents (e.g., the sugar and powder crystals) having a size of 50 μm or less.

Where pod 30 is to produce a single serving of ice cream, in a preferred form of the invention, pod 30 may hold approximately 4-6 ounces of ingredients, and the ingredients may comprise approximately 8% fat (e.g., cream, butter, anhydrous milk fat, vegetable fat, etc.), approximately 1% milk solids-non-fat (MSNF) (e.g., skim milk power (SMP), whole milk powder (WMP), evaporated milk, condensed milk, etc.), approximately 13% sucrose, approximately 0.5% emulsifier and approximately 0.5% stabilizer.

By way of further example but not limitation, if pod 30 contains 1.25 ounces of dry yogurt mix, 5 ounces of frozen yogurt will be formed in pod 30 after running machine 20.

Use of the System

Figure 21:
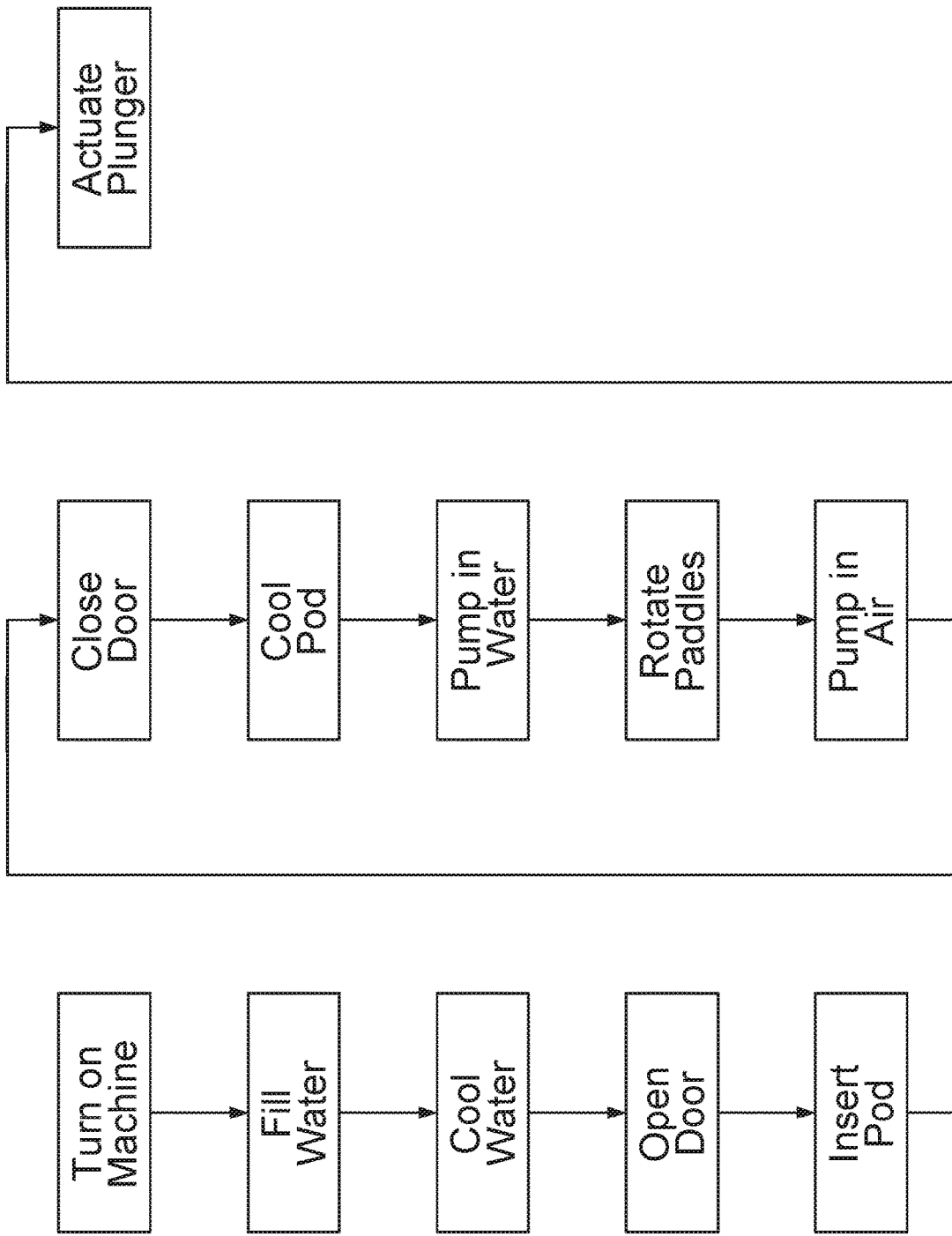
FIG. 21 is a schematic view showing exemplary operation of the system shown in FIGS. 1-6.

Looking now at FIG. 21, machine 20 is prepared for use by introducing water into ambient-temperature water tank 430 and turning on machine 20. Water sensor 450 confirms that there is water in ambient-temperature water tank 430. Machine 20 then pumps water from ambient-temperature water tank 430 into cold water tank 440 and chills the water in cold water tank 440 using TEC assemblies 470. Water temperature sensor 460 monitors the temperature of the water in cold water tank 440. Preferably the water in cold water tank 440 is cooled to between approximately 1-3 degrees C. Machine 20 then sits in this standby condition, re-cooling the water in cold water tank 440 as needed, until a single serving of a frozen confection (e.g., ice cream, frozen yogurt, smoothie, etc.) is to be prepared.

When a single serving of a frozen confection is to be prepared, lid assembly 60 of machine 20 is opened and a fresh pod 30 is positioned in annular recess 210 of nest 140. This is done so that exit nozzle 820 of pod 30 seats in exit nozzle 233 of nest 140. Then lid assembly 60 is closed so that fingers 400 of plunger 330 engage fingers 720 of pod 30, and so that hollow fangs 410, 420 of plunger 330 penetrate the two weakened portions 730, 740 of pod 30. In addition, a container (i.e., the container from which the frozen confection will be consumed) is placed on tray 130 of machine 20, with the container being centered below exit nozzle 233 of nest assembly 50 (alternatively, where the frozen confection is to be consumed from a cone, the cone is held above tray 130).

When pod sensor 235 senses the presence of a pod 30 in annular recess 210 of nest 140, machine 20 cools nest assembly 50 via TEC assemblies 240 and cylindrical TEC 280, which in turn cools the pod 30 (and its contents) which is located in annular recess 210 of nest 140. Note that TEC assemblies 240 cool the outer faces 170 of nest 140 so as to cool outer wall 220 of annular recess 210, whereby to cool hollow outer tube 600 of pod 30, and cylindrical TEC 280 cools hollow cylinder 200 so as to cool inner wall 230 of annular recess 210, whereby to cool hollow inner tube 610 of pod 30. Note that the high surface area-to-volume ratio of pod 30, provided by its toroidal configuration, allows for faster cooling of the pod 30 (and its contents). By way of example but not limitation, the contents of pod 30 can be cooled to a temperature of approximately −30 degrees C. so as to form ice cream within 2 minutes (the contents of pod 30 will turn to ice cream at a temperature of −18 degrees C., a lower temperature will produce ice cream even faster). Note also that the heat removed from pod 30 via TEC assemblies 240 and cylindrical TEC 280 is transferred to heat dissipation assembly 90 for dissipation to the environment.

When pod 30 has been appropriately cooled, water pump 480 pumps an appropriate amount of cold water (e.g., at least 1.25 ounces of cold water) from cold water tank 440 into hollow fang 410 in plunger 330, and then through weakened portion 730 in cap 660, so that the cold water is sprayed into the interior of pod 30 and mixes with the contents of pod 30. In a preferred form of the invention, 4 ounces of water at 2 degrees C. is sprayed into pod 30. At the same time, rotation motor 360 rotates plunger 330, whereby to rotate cap 660 of pod 30, which causes outer helical scraper paddle 670, inner helical scraper paddle 680 and bottom scraper paddle 690 to rotate within annular recess 620 of pod 30.

Note that only cap 660, outer helical scraper paddle 670, inner helical scraper paddle 680 and bottom scraper paddle 690 rotate, and the remainder of pod 30 remains stationary, inasmuch as exit nozzle 820 of pod 30 is disposed in exit nozzle 233 of nest assembly 50.

This rotational action agitates the contents of pod 30 so as to ensure uniform and rapid mixing of the contents of pod 30. The rotational speed of the scrapper paddles can change from approximately 5 to approximately 400 RPM depending on the viscosity of the frozen confection. In one preferred form of the invention, a torque sensor is provided which adjusts the rotational speed of the scraper paddles in response to the changing viscosity of the frozen confection in pod 30 (e.g., the rotational speed of the scraper paddles slows with the increasing viscosity of the frozen confection). In addition, this rotational action causes outer helical scraper paddle 670, inner helical scraper paddle 680 and bottom scraper paddle 690 to continuously scrape the walls of pod 30 so as to prevent the build-up of frozen confection on the walls of pod 30 (which could inhibit cooling of the contents of pod 30). Then air pump 490 pumps air into hollow fang 420 in plunger 330, and then through weakened portion 740 in cap 660, so that the air enters the interior of pod 30 and mixes with the contents of pod 30. Preferably enough air is pumped into pod 30 to provide an approximately 30%-50% overrun (i.e., air bubbles) in pod 30, whereby to give the ice cream the desired "loft". As this occurs, outer helical scraper paddle 670, inner helical scraper paddle 680 and bottom scraper paddle 690 continue to agitate the contents of pod 30 so as to ensure uniform and rapid mixing of the contents of pod 30 and so as to continuously scrape the walls of pod 30, whereby to prevent a build-up of frozen confection on the walls of pod 30 (which could inhibit cooling of the contents of pod 30).

In order to create a "smooth" frozen confection, the majority of ice crystals formed in the frozen confection should be smaller than approximately 50 μm. If many of the ice crystals are larger than 50 μm, or if there are extremely large ice crystals (i.e., over 100 μm) present, the frozen confection will be "coarse". System 10 is designed to produce a "smooth" frozen confection by providing a majority of ice crystals smaller than approximately 50 μm.

More particularly, to develop ice crystals with the proper dispersion (number, size and shape), it is necessary to control the freezing process: rates of nucleation vs. growth of crystals. System 10 does this by simultaneously scraping the inner and outer surfaces of annular recess 620 of pod 30. In addition, in order to generate numerous small ice crystals, the freezing □onditions within pod 30 must promote nuclei formation and minimize ice crystal growth. Promoting ice nucleation requires very low temperatures, e.g., ideally as low as −30 degrees C., in order to promote rapid nucleation. System 10 freezes the contents of pod 30 very quickly (e.g., under 2 minutes), thereby preventing ice crystals from having the time to "ripen" (i.e., grow). Furthermore, once ice nuclei have formed, conditions that minimize their growth are needed to keep the ice crystals as small as possible. To obtain the smallest possible ice crystals, it is necessary to have the shortest residence time possible in order to minimize "ripening" (i.e., growth) of the ice crystals. System 10 achieves this by using multiple internal scraper paddles to remove ice crystals from the walls of the pod, which helps create high-throughput rates which keeps the ice crystals small (e.g., under 50 μm).

When the frozen confection in pod 30 is ready to be dispensed into the container which has been placed on tray 130 of machine 20 (i.e., the container from which the frozen confection will be consumed), or into a cone held above tray 130, vertical motor 380 moves plunger 330 vertically, causing plunger 330 to force cap 660 of pod 30 downward, toward base 580 of pod 30, with outer helical scraper paddle 670 and inner helical scraper paddle 680 longitudinally compressing with the advance of cap 660. This action reduces the volume of annular recess 620. Vertical motor 380 continues to move plunger 330 vertically, reducing the volume of annular recess 620, until the force of the frozen confection in pod 30 ruptures weakened portion 810 of pod 30 and the frozen confection is forced out exit port 830 of pod 30, whereupon the frozen confection passes through exit port 234 of nest 140 and into the container set on tray 130 (i.e., the container from which the frozen confection will be consumed) or into the cone held above tray 130. This action continues until cap 660 has been forced against base 580, effectively ejecting all of the frozen confection out of pod 30 and into the container from which the ice cream will be consumed.

Thereafter, the used pod 30 may be removed from machine 20 and, when another single serving of a frozen confection is to be prepared, it may be replaced by a fresh pod 30 and the foregoing process repeated.

Alternative Approaches for Cooling the Inner Portion of the Nest Assembly

Figure 22:
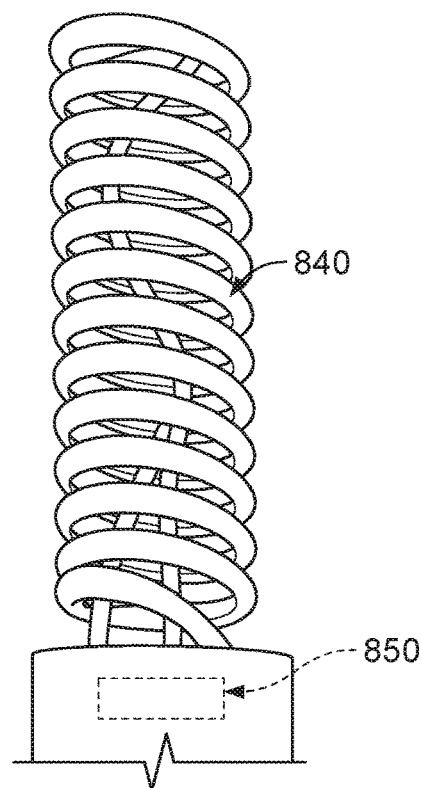
FIGS. 22 and 23 are schematic views showing alternative approaches for cooling the inner portion of the nest assembly of the system shown in FIGS. 1-6.

If desired, and looking now at FIG. 22, cylindrical TEC 280 may be replaced by a helical coil 840 which is itself cooled by a TEC element 850.

Figure 23:
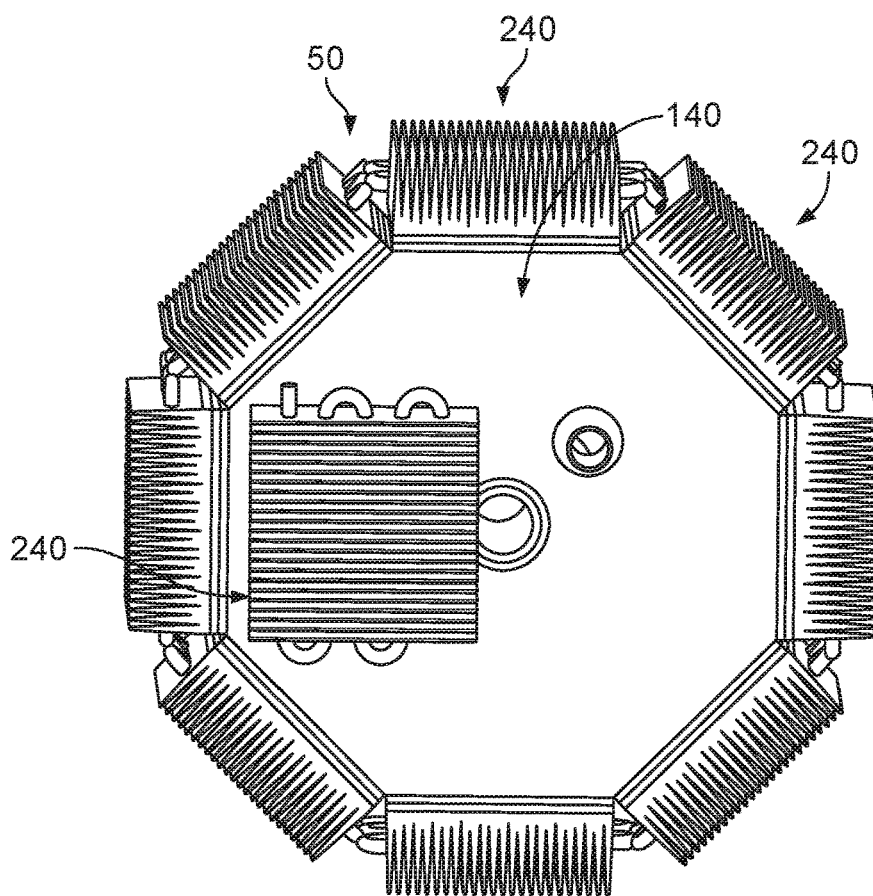
Figure 24:
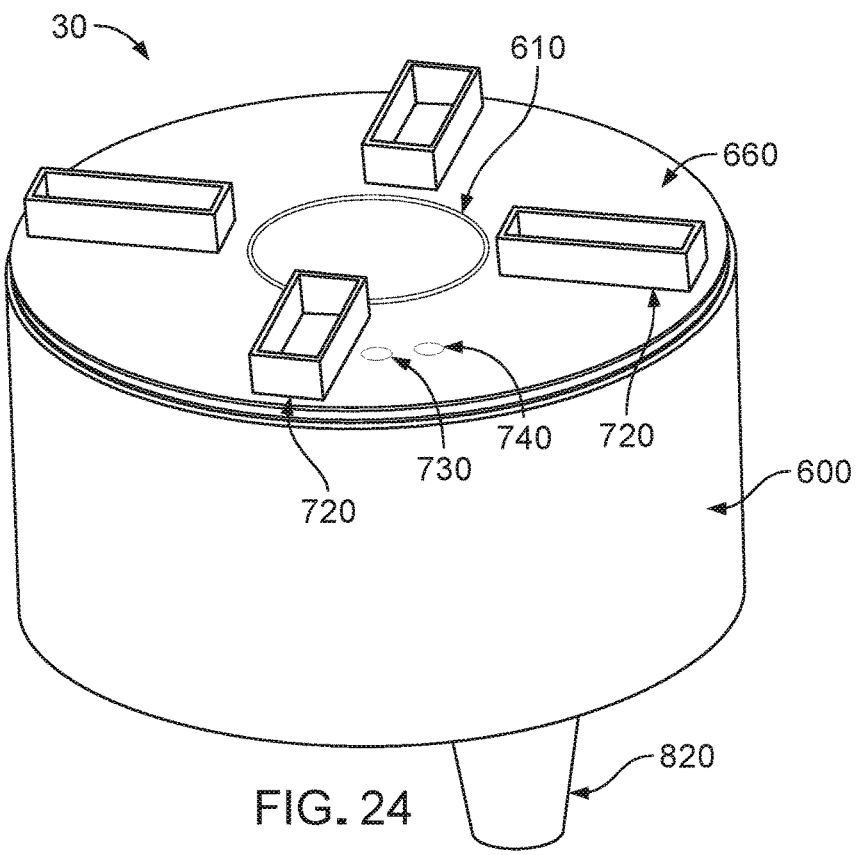
FIGS. 24-27 are schematic views showing another pod which may be used with the system shown in FIGS. 1-6.
Figure 25:
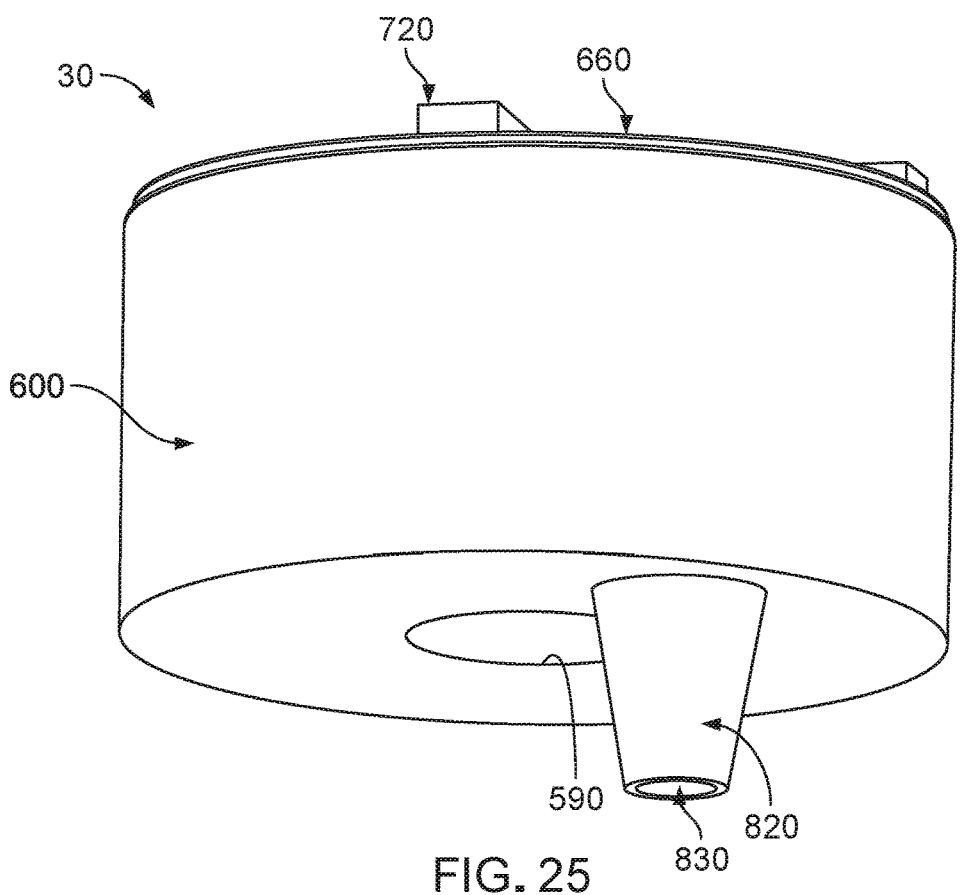
Figure 26:
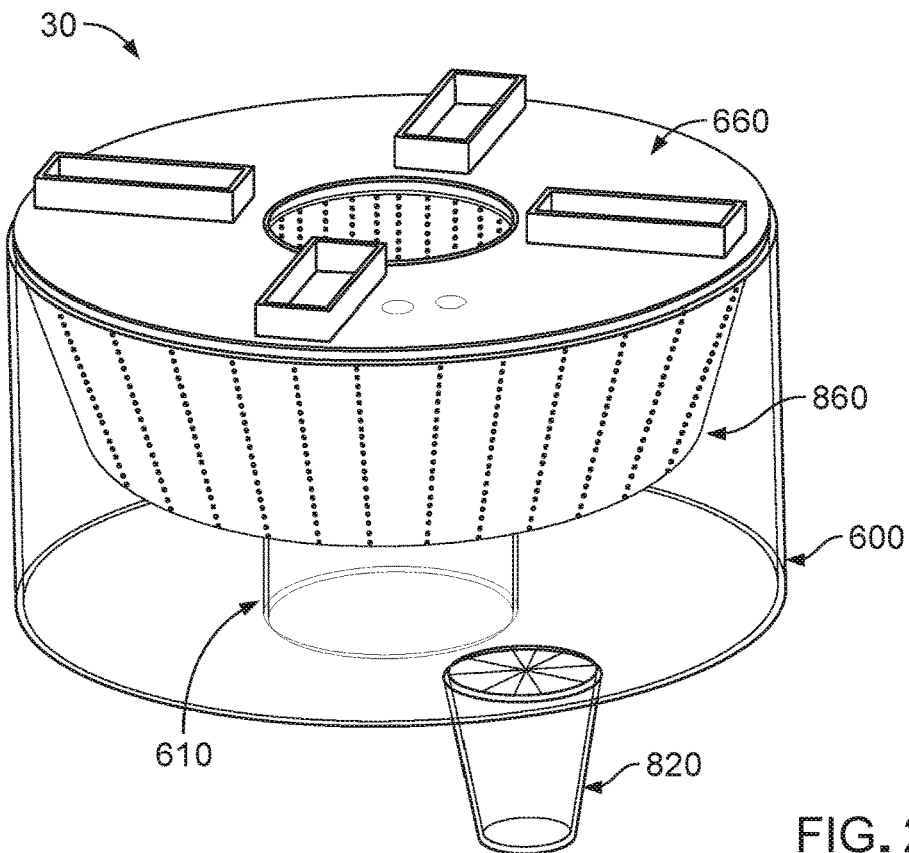
Figure 27:
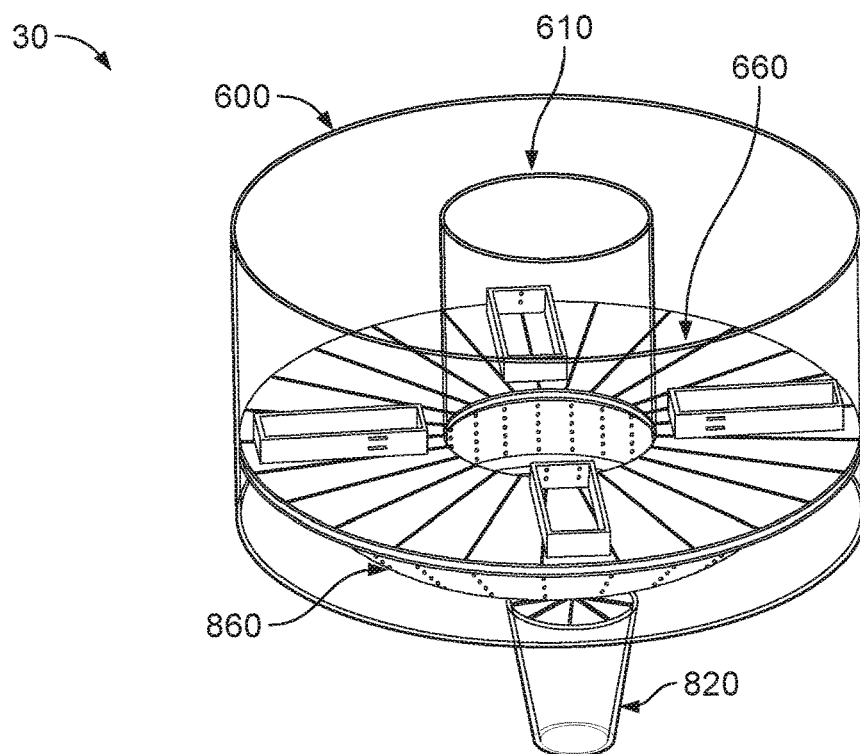

Alternatively, if desired, and looking now at FIG. 23, a TEC assembly 240 may be mounted to bottom surface 160 of nest 140 so that TEC assembly 240 can cool hollow cylinder 200 of nest 140 (as well as the bottom surface of nest 140).

Using the System to Provide a Cold Beverage

System 10 can also be used to provide a single serving of a cold beverage. By way of example but not limitation, pod 30 may contain a supply of ingredients for forming cold tea (also sometimes referred to as "iced tea"), cold coffee (also sometimes referred to as "iced coffee"), cold soda, cold beer, etc. In this circumstance, pod 30 may contain a dry or liquid cold tea mix, a dry or liquid cold coffee mix, a dry or liquid soda mix or a dry or liquid beer mix, etc.

Where system 10 is to be used to provide a single serving of a cold beverage, a pod 30, containing a supply of the ingredients used to form the cold beverage, is inserted into nest assembly 50. Nest assembly 50 is then used to cool pod 30, and cold water is pumped from cold water tank 440 into pod 30, where it is combined with the ingredients contained within pod 30, and mixed by outer helical scraper paddle 670, inner helical scraper paddle 680 and bottom scraper paddle 690. When mixing is completed, vertical motor 380 is activated to eject the cold beverage into a waiting container.

It will be appreciated that where a cold beverage is to be produced, air may or may not be pumped into pod 30 (e.g., air may not be pumped into pod 30 when cold tea or cold coffee is being produced, and air may be pumped into pod 30 when cold soda or cold beer is being produced).

It will also be appreciated that where a cold beverage is to be produced, outer helical scraper paddle 670, inner helical scraper paddle 680 and bottom scraper paddle 690 may be omitted from pod 30 if desired.

Using the System to Provide a Hot Beverage

System 10 can also be used to provide a single serving of a hot beverage. By way of example but not limitation, pod 30 may contain a supply of ingredients for forming a hot beverage, e.g., hot chocolate, hot coffee, etc. In this situation, pod 30 may contain a dry mix formed from ingredients which, when mixed with hot water, provide the desired beverage, e.g., a hot chocolate powder, an instant coffee mix, etc.

Where system 10 is to be used to provide a single serving of a hot beverage, a pod 30, containing a supply of the ingredients used to form the hot beverage, is inserted into nest assembly 50. Nest assembly 50 is then used to heat pod 30, and ambient-temperature water is pumped from ambient-temperature water tank 430 into pod 30, where it is combined with the ingredients contained within pod 30, and mixed by outer helical scraper paddle 670, inner helical scraper paddle 680 and bottom scraper paddle 690. Note that TEC assemblies 240 may be used to supply heat to the outer surfaces of nest 140 by simply reversing the direction of the electric current flow supplied to TEC elements 250, and cylindrical TEC 290 may be used to supply heat to the inner column of nest 140, whereby to heat the contents of pod 30. In addition, if desired, the ambient-temperature water in ambient-temperature water tank 430 may be heated before injection into pod 30, e.g., via resistance heaters positioned in the line between ambient-temperature water tank 430 and hollow fang 410 of plunger 330. It will be appreciated that where a hot beverage is to be produced, air is generally not pumped into pod 30.

In many cases, it may be desirable to "brew" a hot beverage by passing water through a supply of granulated ingredients, e.g., such as in the case of coffee or tea. To that end, and looking now at FIGS. 24-27, pod 30 can be provided with a filter 860 which contains a supply of the granulated ingredients (e.g., ground coffee beans, tea leaves, etc.) which is to be brewed. In one preferred form of the invention, and as shown in FIGS. 24-27, filter 860 is disposed adjacent to cap 660, e.g., filter 860 is secured to cap 660, and outer helical scraper paddle 670, inner helical scraper paddle 680 and bottom scraper paddle 690 are omitted from pod 30. Note also that when plunger 330 collapses cap 660 towards base 580, filter 860 will preferably also collapse, whereby to allow compression of the granulated ingredients contained within filter 860, so as to press the fluid out of filter 860, e.g., in the manner of a so-called "French Press" coffee maker. It should also be appreciated that filter 860 is constructed so that it will maintain its structural integrity during collapse so that the granulated contents of filter 860 do not pass out of pod 30.

Cabinet Configuration

Figure 28:
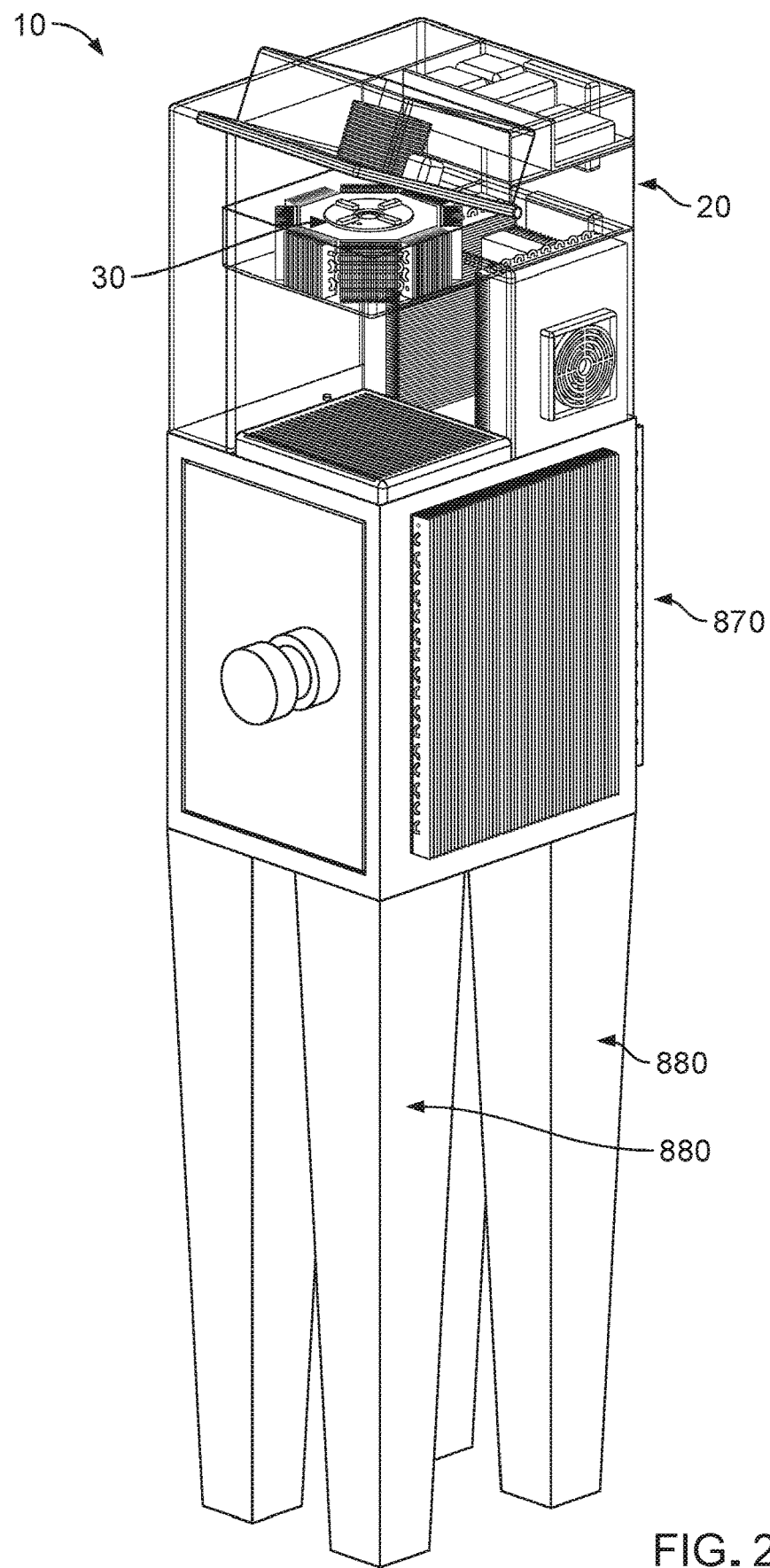
FIG. 28 is a schematic view showing another novel system for providing a single serving of a frozen confection.

If desired, and looking now at FIG. 28, machine 20 can be mounted to a cabinet 870, where cabinet 870 sits on legs 880. In this construction, cabinet 870 can include additional cooling apparatus for removing heat from heat dissipation assembly 90 (e.g., additional heat pipes, condensers and fans, or a conventional refrigeration unit, etc.). Cabinet 870 may also be configured so as to house fresh pods 30 and/or containers for receiving the frozen confections (e.g., bowls and cones), cold beverages (e.g., cups) and hot beverages (e.g., cups).

Chilling the Pod with a Refrigeration Coil

Figure 30:
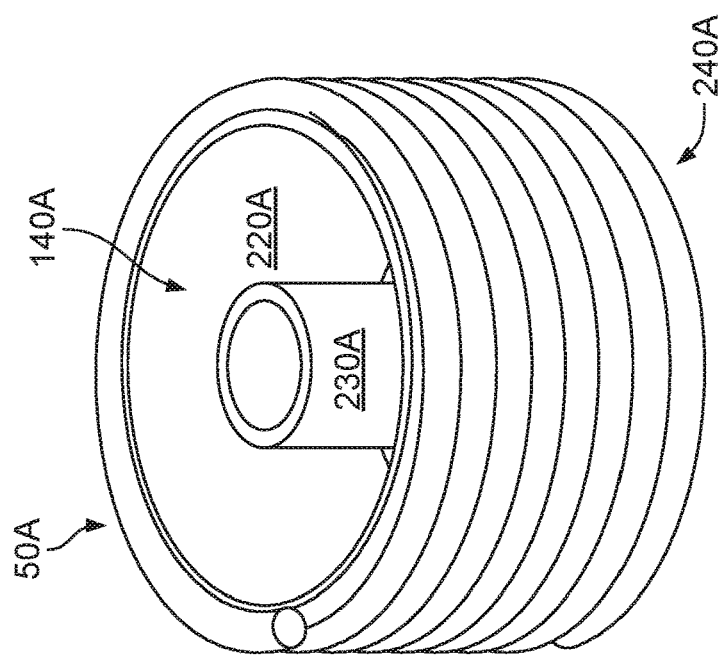
FIGS. 29-31 are schematic views showing another novel system for providing a single serving of a frozen confection.
Figure 29:
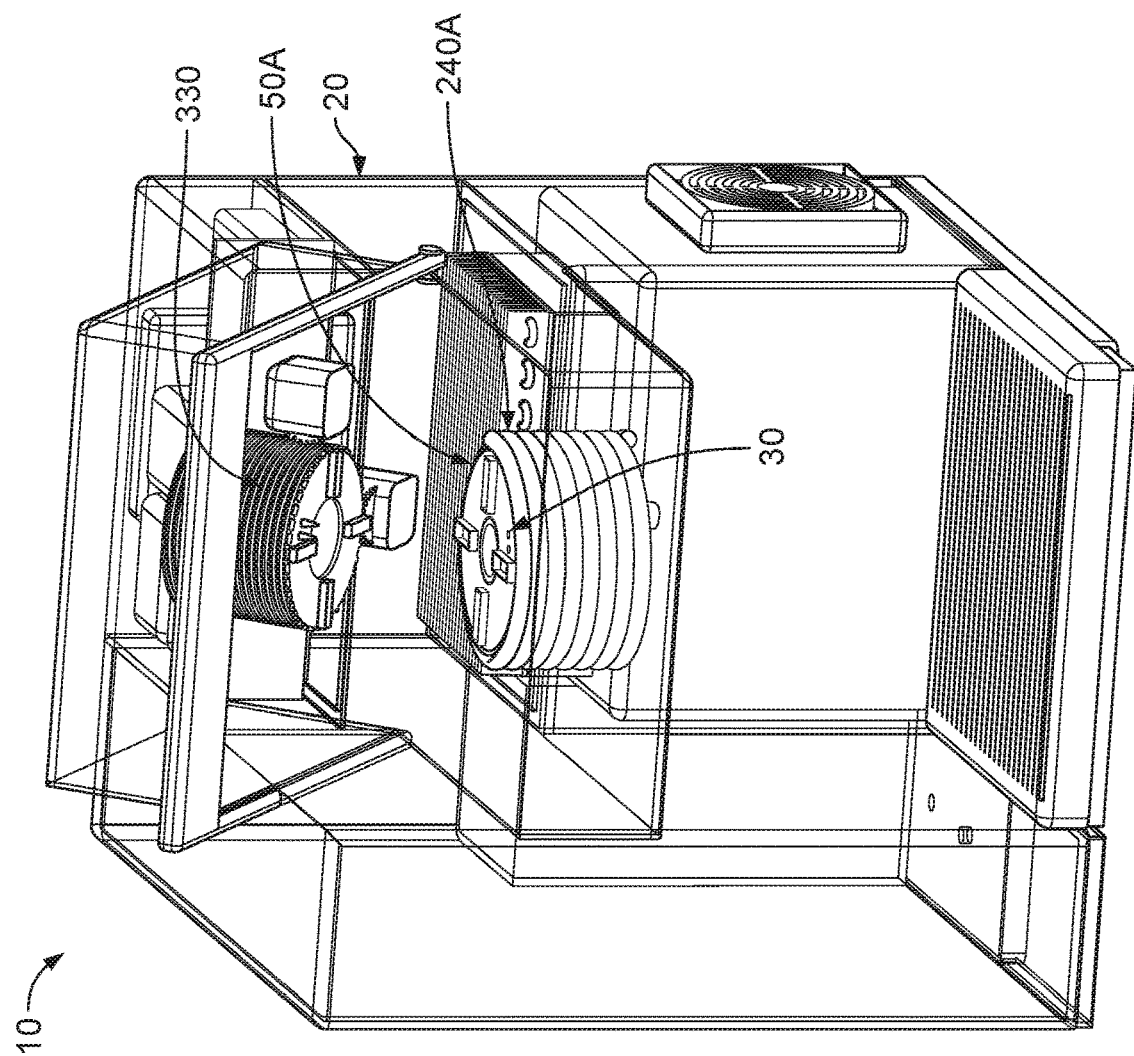
Figure 31:
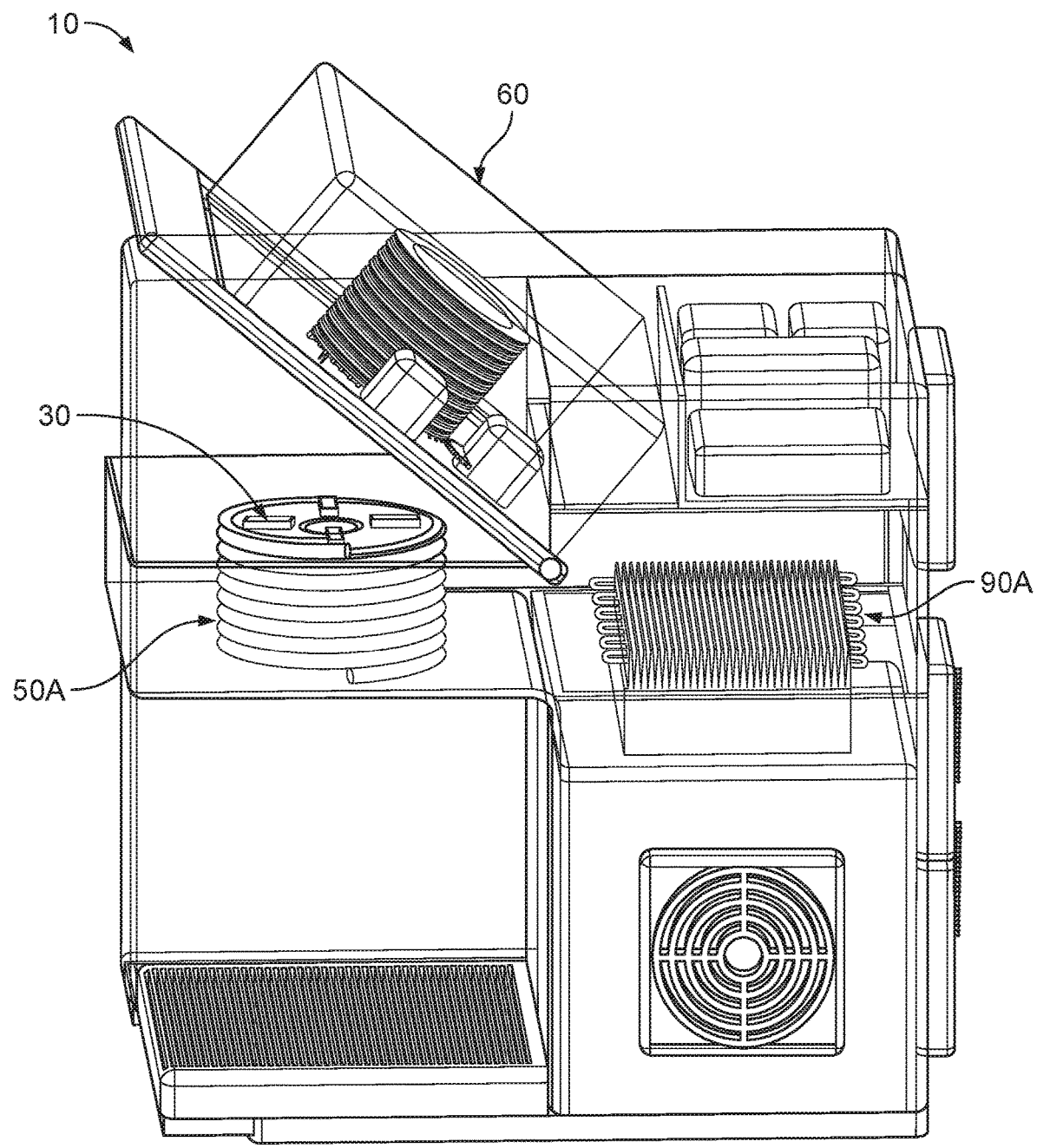
Figure 32:
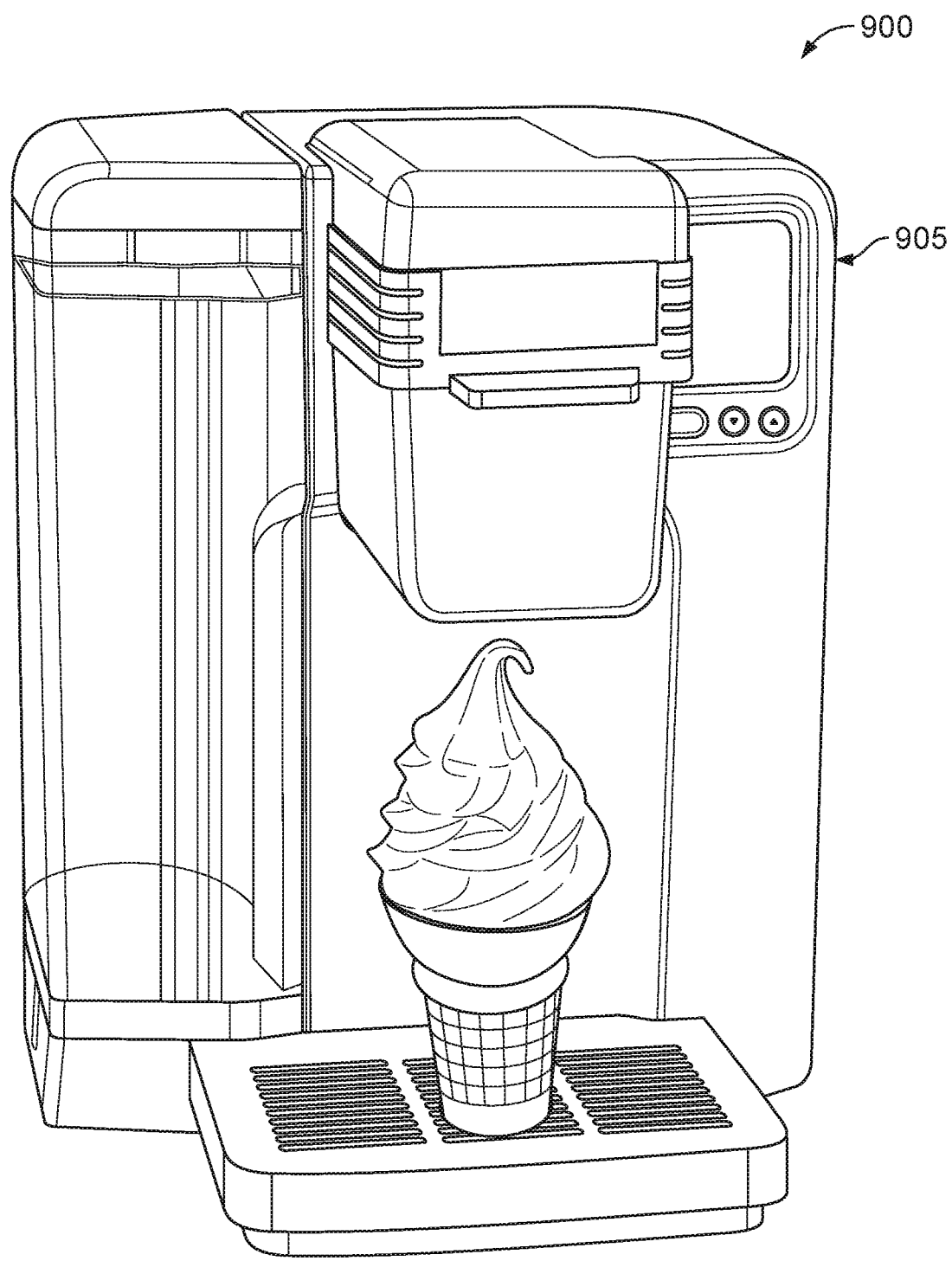
FIGS. 32-35 are schematic views showing another novel system formed in accordance with the present invention, wherein the novel system comprises a compressor-cooled machine with a fixed-cap pod.
Figure 33:
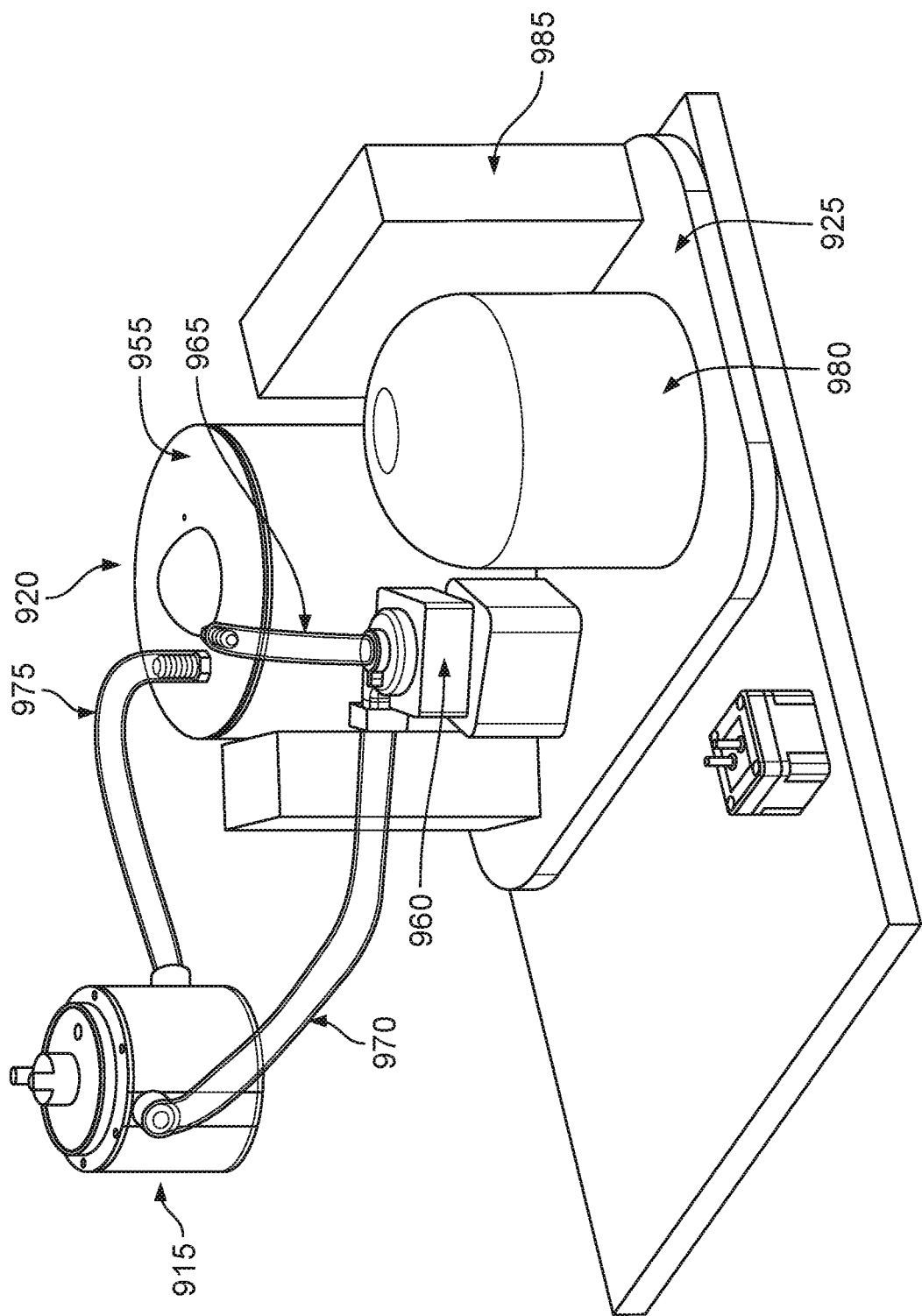
Figure 34:
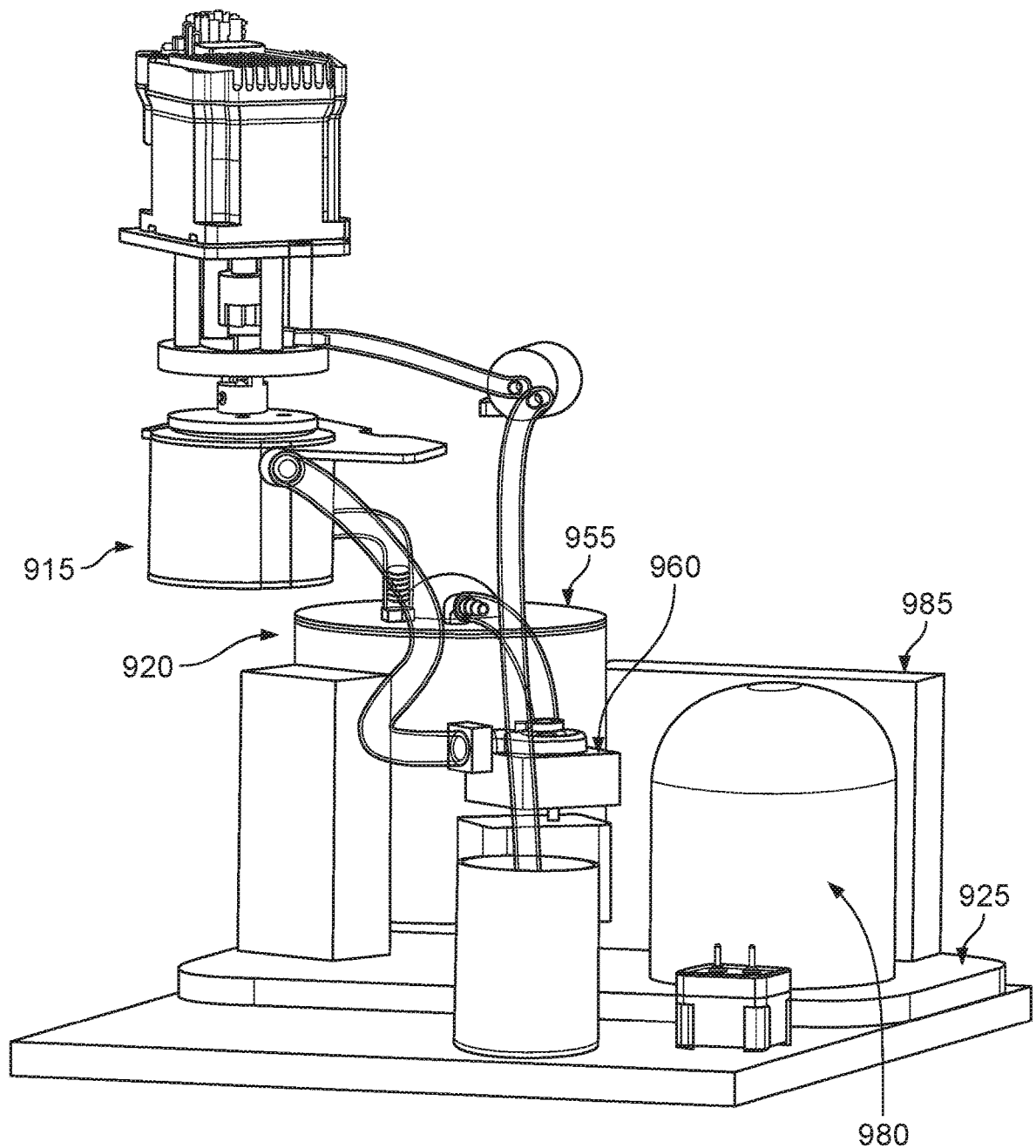
Figure 35:
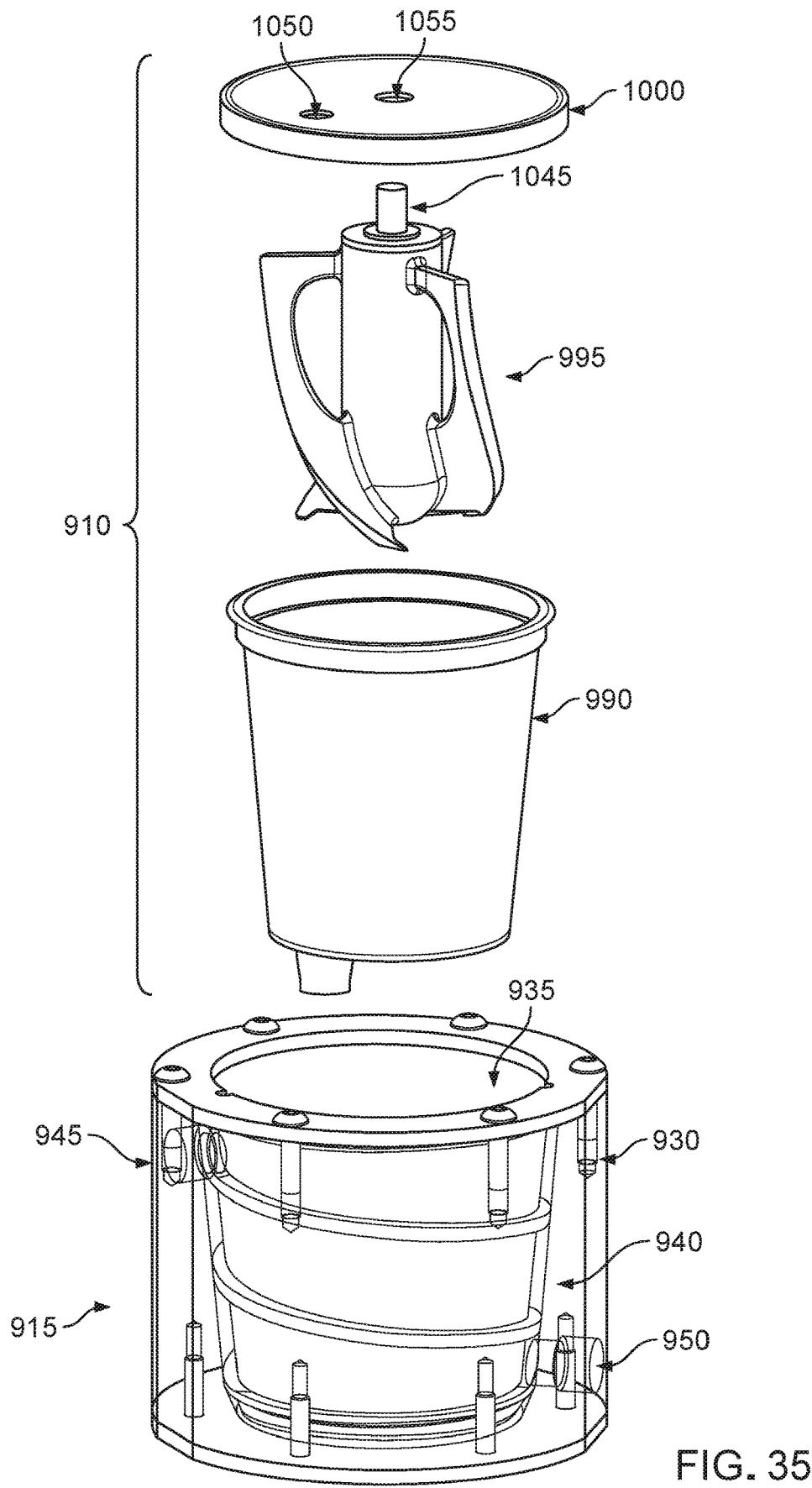
Figure 35A:
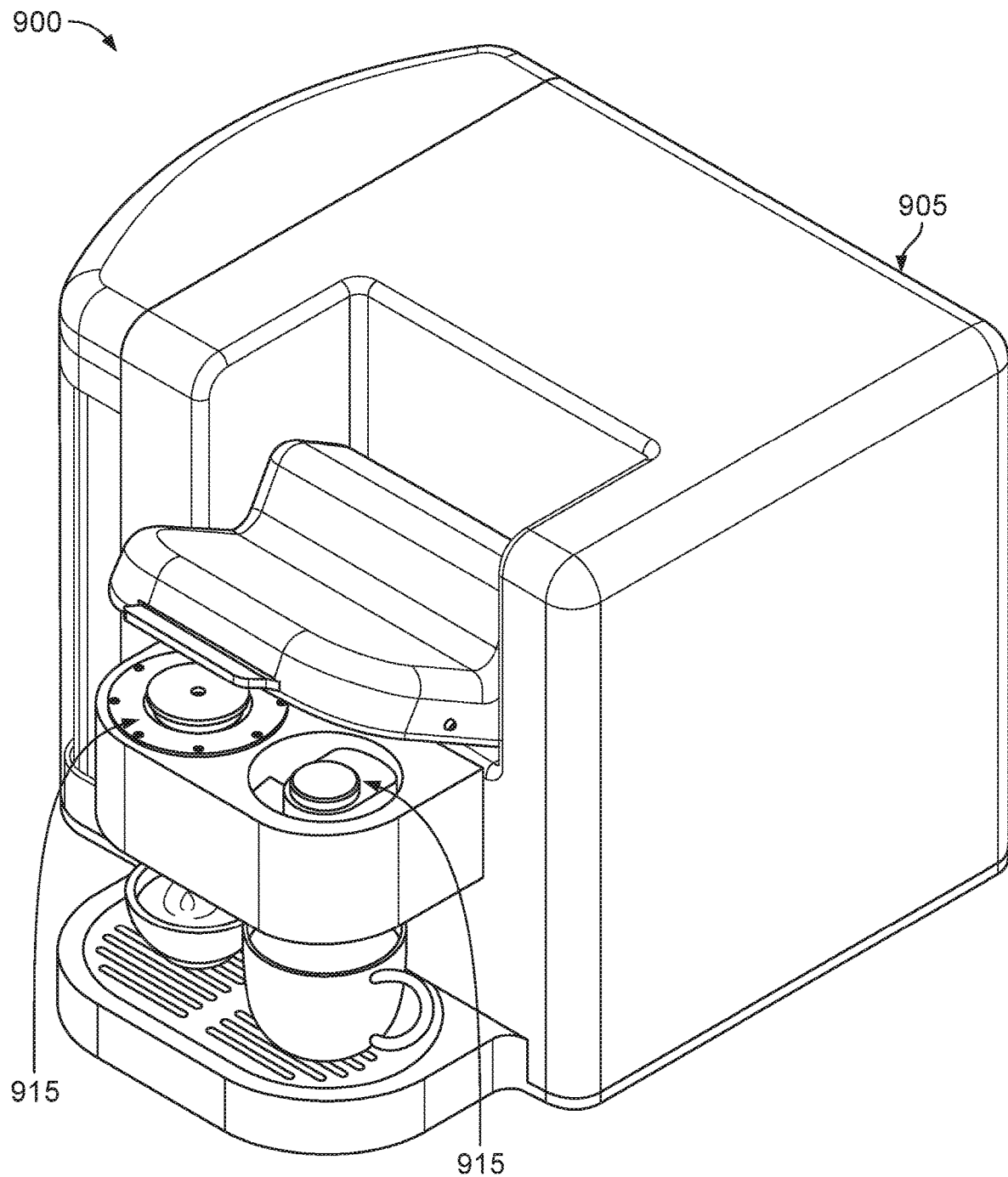
FIG. 35A is a schematic view showing another novel system formed in accordance with the present invention, wherein the novel system comprises a pair of nests for producing a desired cold confection or a desired hot or cold beverage.
Figure 35B:
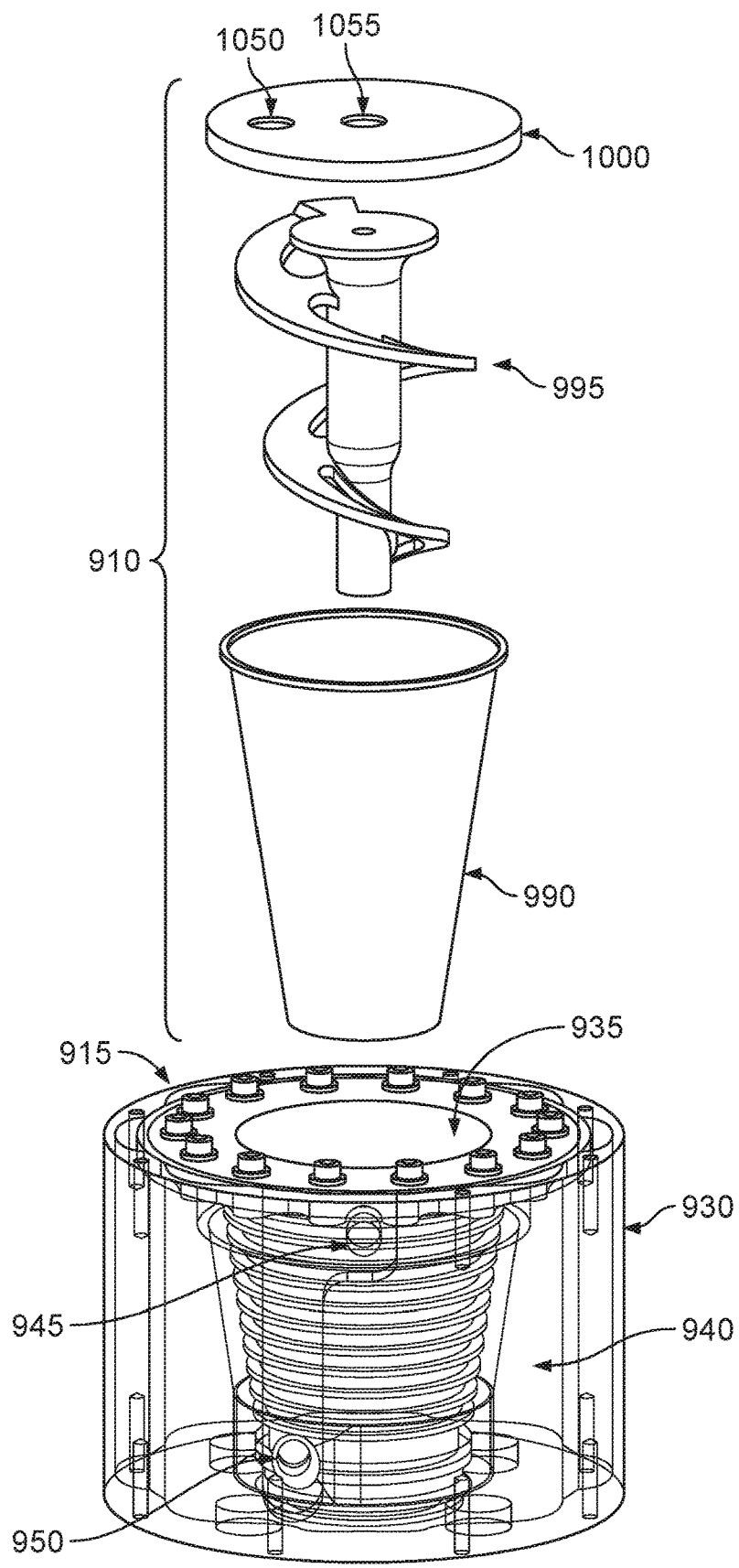
FIGS. 35B and 35C are schematic views showing additional nest and pod configurations formed in accordance with the present invention.
Figure 35C:
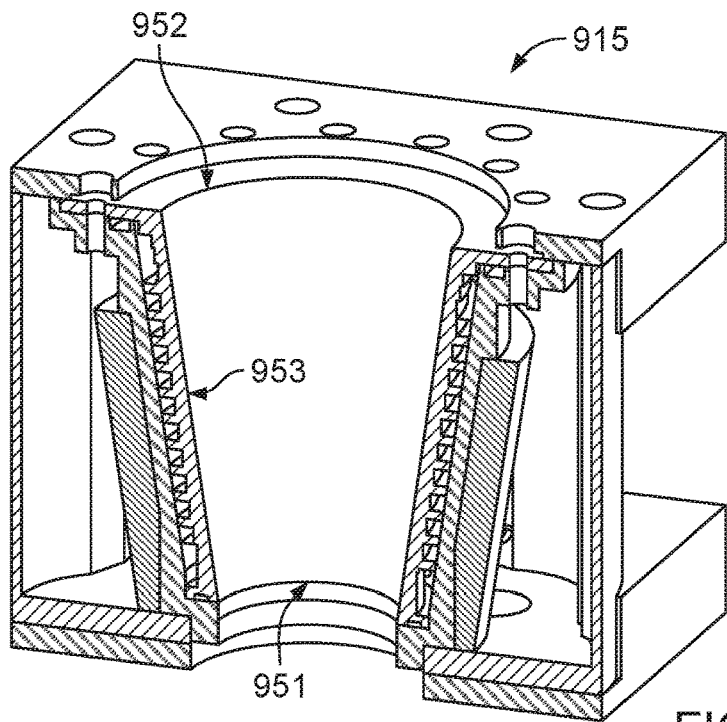

In another form of the invention, and looking now at FIGS. 29-31, nest assembly 50 may be replaced by an alternative nest assembly 50A comprising a nest 140A in the form of a torus characterized by an outer wall 220A and an inner wall 230A, wherein the torus is formed out of a high heat-transfer material (e.g., aluminum), and further wherein TEC assemblies 240 are replaced by a refrigeration coil 240A which is connected to heat dissipation assembly 90A, wherein heat dissipation assembly 90A comprises a compressor for driving refrigeration coil 240A.

It will be appreciated that, as a result of this construction, nest assembly 50A (and hence a pod 30 disposed in nest assembly 50A) can be cooled via a conventional refrigeration system. This construction can be advantageous since it can quickly cool a pod 30 to −40 degrees C., which is beyond the thermal performance of TEC elements 250.

Alternative Nest and Pod Constructions

In the foregoing disclosure, nest assembly 50 and nest assembly 50A comprise an internal cooling element (e.g., hollow cylinder 200 containing TEC 280) as well as external cooling elements (e.g., TEC assemblies 240), and pod 30 comprises an inner opening (i.e., the lumen of inner hollow tube 610) for receiving the internal cooling element of nest assemblies 50 and 50A. However, if desired, the internal cooling element may be omitted from nest assemblies 50 and 50A, in which case the inner opening of pod 30 may also be omitted.

Compressor-Cooled Machine with Fixed-Cap Pod

Looking next at FIGS. 32-35, 35A, 35B and 35C, there is shown another novel system 900 for providing a single serving of a frozen confection, e.g., ice cream (soft serve or hard), frozen yogurt, a frozen protein shake, a smoothie, etc. For the purposes of the present invention, a single serving of a frozen confection may be considered to be approximately 2 fluid ounces to approximately 8 fluid ounces.

System 900 is also capable of providing a single serving of a cold beverage, and/or a single serving of a hot beverage.

System 900 may comprise two nests 915, where one nest 915 is configured to receive a frozen confection pod at 5-8 ounces and another adjacent nest 915, which may be smaller in size, is configured to receive a coffee pod (e.g., a K-Cup pod) or a cold beverage pod (e.g., an iced tea pod). In this form of the invention, water (hot or cold) is directed to the proper nest 915 to form the desired cold confection or the desired hot or cold beverage. See, for example, FIG. 35A, which shows two nests 915 for producing a desired cold confection or a desired hot or cold beverage (note that the configuration of system 900 may differ slightly depending on whether a single nest or double nest is to be provided). Preferably, a pod detector (not shown) is provided in each nest 915 to identify which nest has received which type of pod (e.g., frozen confection, hot coffee, iced tea, etc.) so that the machine sends the appropriate cold or hot water to the appropriate nest.

In a preferred form of the invention, system 900 generally comprises a machine 905 and a pod 910, wherein machine 905 is configured to, among other things, receive pod 910 containing a supply of ingredients for forming a single serving of the frozen confection, cool pod 910 (and its contents), introduce cold water and air into pod 910 (where appropriate, see below), agitate the contents of pod 910 so as to form the frozen confection, and then eject 3 to 8 ounces of the frozen confection from pod 910 directly into the container (e.g., a pre-chilled bowl, an ambient bowl, a cone, etc.) from which it will be consumed.

In one form of the invention, system 900 is able to form a frozen confection without introducing water and/or air into pod 910 (see below).

Machine 905

Machine 905 is generally similar to machine 20 described above, except that machine 905 uses a compressor to cool pod 910 and water supply 70 may be omitted in some circumstances (see below). More particularly, machine 905 comprises a nest 915 for receiving pod 910, a coolant unit 920 for cooling nest 915, and a refrigeration unit 925 for cooling coolant unit 920. Machine 905 weighs less than 50 lbs and is configured to produce and dispense single servings of frozen confections or hot or cold beverages in quantities of approximately 1 quart or less within 5 minutes or less. The frozen confection will have between 10-60% overrun (i.e., air content) per single serving batch. It should be appreciated that the amount of overrun varies according to the particular product being made in pod 910.

More particularly, nest 915 comprises a body 930 defining a tapered (preferably frustoconical) recess 935 for receiving a correspondingly tapered (preferably frustoconical) pod 910 and an interior chamber 940 for cooling recess 935 of nest 915. Nest 915 further comprises an inlet 945 leading to interior chamber 940 and an outlet 950 leading from interior chamber 940.

In one form of the invention, tapered recess 935 of nest 915 comprises a smaller first end 951, a larger second end 952 and a tapered side wall 953 extending between the smaller first end 951 and the larger second end 952. In one preferred form of the invention, tapered recess 935 is frustoconical. In one form of the invention, tapered side wall 953 of recess 935 has a taper of approximately 5 degrees or greater. In one form of the invention, smaller first end 951 may be closed off. In another form of the invention, smaller first end 951 may be partially open. In another form of the invention, smaller first end 951 may be completely open. See, for example, FIG. 35B and FIG. 35C, which show additional configurations for nest 915 (and which also show additional configurations for pod 910).

It should be appreciated that where smaller first end 951 of nest 915 is either partially open or completely open, it may be possible to create a better fit of pod 910 in nest 915. More particularly, with the bottom of nest 915 partially or fully open, pod 910 fits in nest 915 without "bottoming out" so a better fit is created between the walls of the nest and the walls of the pod, thereby allowing for much more efficient cooling of the pod.

Coolant unit 920 comprises a reservoir 955 for containing a supply of coolant, a circulation motor 960, a line 965 connecting reservoir 955 to circulation motor 960, a line 970 connecting circulation motor 960 with inlet 945 of nest 915, and a line 975 connecting outlet 950 of nest 915 with reservoir 955. As a result of this construction, coolant contained in reservoir 955 can be circulated through interior chamber 940 of nest 915 so as to cool a pod 910 contained in recess 935 of nest 915.

Refrigeration unit 925 comprises a refrigeration cycle comprising a compressor 980, a condenser 985, an expansion valve (not shown) located downstream of the condenser, and an evaporator (not shown, but could be an immersion coil in a coolant tank) located at reservoir 955 of coolant unit 920, such that compressor 980 can drive a refrigerant through the refrigeration cycle to cool the coolant disposed within reservoir 955 of coolant unit 920.

As a result of this construction, refrigeration unit 925 can be used to cool coolant unit 920, and coolant unit 920 can be used to cool a pod 910 disposed in nest 915. Note that by selecting an appropriate coolant for coolant unit 920, and by providing a reservoir 955 of appropriate size, sufficient "cold" can be accumulated within coolant unit 920 so that multiple batches of frozen confection can be sequentially produced with substantially no lag time.

Eutectic Solution

In one preferred form of the invention, at least one container holding a eutectic solution is disposed adjacent to the pod seat of nest 915. This eutectic solution is used to store "cold" at the nest. More particularly, coolant unit 920 is used to cool the eutectic solution to the point of freezing, and then the eutectic solution absorbs heat from pod 910, whereby to produce the frozen confection.

More particularly, while system 900 is parked idle (i.e., prior to producing servings of a frozen confection), compressor 980 of refrigeration unit 925 is turned on. Compressor 980 circulates its refrigerant (e.g., Freon, Norflurane referred to as R-134A, R-407C, R-404A, R-410A, etc.) through its refrigeration cycle so as to cool the coolant in reservoir 955 of coolant unit 920, and then the coolant in reservoir 955 cools the eutectic solution contained within at least one container in nest 915 to 0° C. to −114° C. Once the eutectic solution surrounding nest 915 is cooled to 0° C. to −114° C., system 900 automatically turns off compressor 980 of refrigeration unit 925. Note that compressor 980 of refrigeration unit 925 does not need to run while system 900 is making the frozen confection, since the already-cooled coolant in coolant unit 920, and/or the eutectic solution in at least one container in the nest, is actually used to cool a pod 910 in nest 915. Of course, compressor 980 of refrigeration unit 925 may be run while system 900 is making the frozen confection if desired.

It will be appreciated that the cold lost from the eutectic solution by removing heat from pod 910 is replaced by a heat exchange as the cooled eutectic solution slowly warms. This maintains the temperature of nest 915 between −40° C. and 0° C. while making multiple pods of a frozen confection in quick succession. As the eutectic solution warms, circulation motor 960 of coolant unit 920 keeps pumping coolant to the nest to help carry the cooling load of the eutectic container. Additionally, compressor 980 of refrigeration unit 925 automatically turns back on, pumping refrigerant to coolant unit 920 (which is re-cooling the eutectic solution).

Between cooling of a pod and/or between uses of machine 905, frost may accumulate on the inside of nest 915. Flashing heat to the surface of nest 915 defrosts the surface of nest 915. This flash heat may be in the form of warm air, induction coil heat, resistance heat, etc.

It should be appreciated that the eutectic solution comprises a phase change material. In this respect, it should also be appreciated that phase change materials (PCMs) are compositions that store and release thermal energy during the processes of warming and cooling. Phase change materials typically release (in the form of latent heat) large amounts of energy upon cooling, but absorb equal amounts of energy from the immediate environment upon warming.

In this way, phase change materials enable thermal energy storage: heat or cold being stored at one period of time and used at a later point in time.

Figure 36:
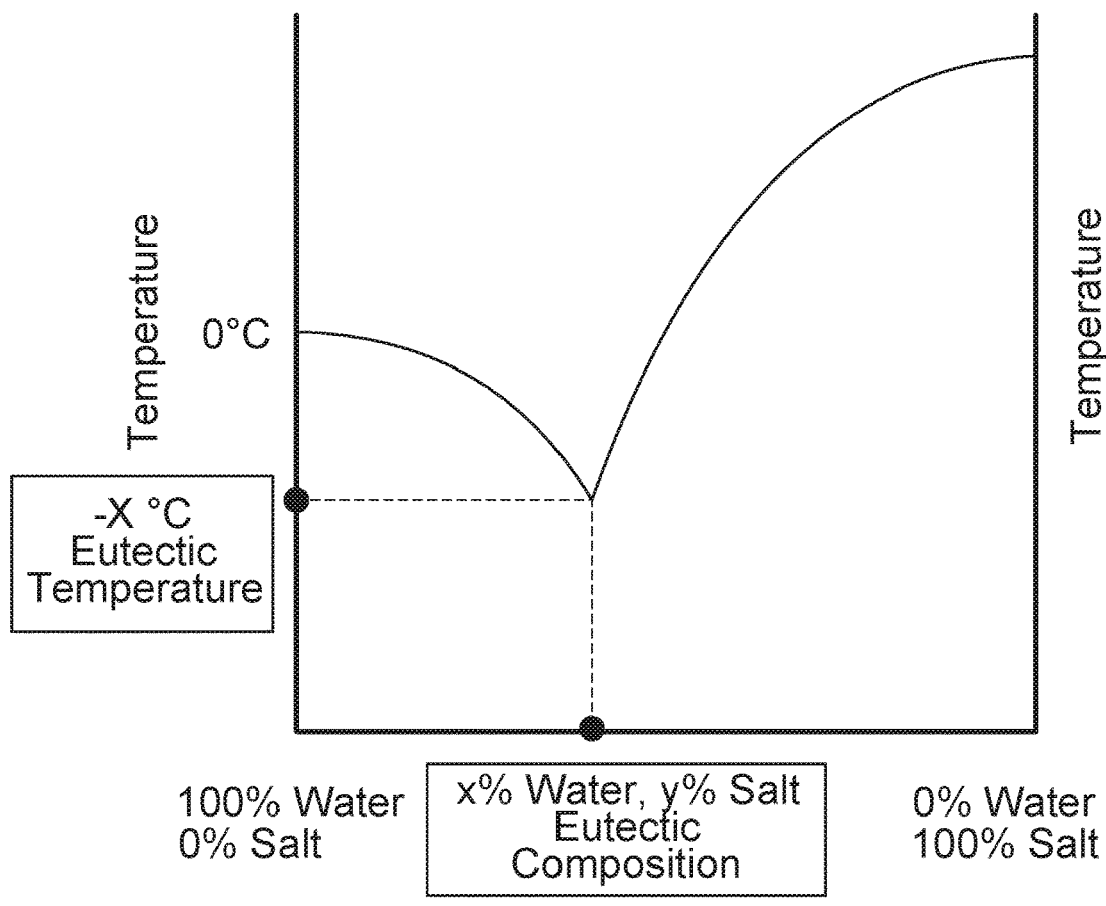
FIG. 36 is a graph showing the eutectic point of a eutectic solution.

It should be appreciated that a simple, cheap and effective phase change material is water/ice. Unfortunately, water/ice has a freezing point of 0° C. (+32° F.), which precludes water/ice from the majority of energy storage applications. However, a number of alternative phase change materials have been identified and developed that cool and warm like water/ice, but at temperatures from the cryogenic range to several hundred degrees centigrade. When salts are added to water, they depress the freezing point of the water. Adding more salt generally depresses the freezing temperature further, but these solutions do not freeze cleanly and at a precise temperature, instead they tend to form a slush. However, if a particular salt at a particular concentration is added to water, the resulting solution freezes and melts cleanly at a constant temperature, releasing and storing large amounts of energy as it does so. This temperature is called the eutectic point and the composition is called a eutectic solution. This is represented in the simplified graph shown in FIG. 36. The curved line on the graph of FIG. 36 represents the freezing curve. Starting from the left of the curve, the composition is 100% water and the freezing point is 0° C. (32° F.). As salt is added, the freezing point of the salt/water mixture decreases. When freezing occurs in this section of the graph, only pure water freezes out of solution and the salt remains in solution. If more salt is added, the freezing point depresses further until the eutectic point is reached at the lowest freezing point on the curve. Some PCMs are a gel. PCMs can be made of sodium polyacrylate, salt hydrates, or paraffins which are high molecular mass hydrocarbons with a waxy consistency at room temperature. Paraffins are made up of straight chain hydrocarbons and vegetable based PCMs. Below is a list of sub-zero eutectic PCM solutions with phase changes ranging from 0 to −114° C.

| PCM Type | Phase Change Temperature | | Density | | Latent Heat Capacity | |
|---|---|---|---|---|---|---|
| | (° C.) | (° F.) | (kg/m3) | (lb/ft3) | (kJ/kg) | Btu/lb |
| E0 | 0 | 32 | 1,000 | 62.4 | 332 | 143 |
| E-2 | −2.0 | 28 | 1,070 | 66.8 | 306 | 132 |
| E-3 | −3.7 | 25 | 1,060 | 66.2 | 312 | 134 |
| E-6 | −6.0 | 21 | 1,110 | 69.3 | 275 | 118 |
| E-10 | −10.0 | 14 | 1,140 | 71.2 | 286 | 123 |
| E-11 | −11.6 | 11 | 1,090 | 68.0 | 301 | 129 |
| E-12 | −12.3 | 10 | 1,110 | 69.3 | 250 | 108 |
| E-14 | −14.8 | 5 | 1,220 | 76.2 | 243 | 105 |
| E-15 | −15.0 | 5 | 1,060 | 66.2 | 303 | 130 |
| E-19 | −18.7 | −2 | 1,125 | 70.2 | 282 | 121 |
| E-21 | −20.6 | −5 | 1,240 | 77.4 | 263 | 113 |
| E-22 | −22.0 | −8 | 1,180 | 73.7 | 234 | 101 |
| E-26 | −26.0 | −15 | 1,250 | 78.0 | 280 | 112 |
| E-29 | −29.0 | −20 | 1,420 | 88.6 | 222 | 95 |
| E-32 | −32.0 | −26 | 1,290 | 80.5 | 243 | 105 |
| E-34 | −33.6 | −28 | 1,205 | 75.2 | 240 | 103 |
| E-37 | −36.5 | −34 | 1,500 | 93.6 | 213 | 92 |
| E-50 | −49.8 | −58 | 1,325 | 82.7 | 218 | 94 |
| E-75 | −75.0 | −103 | 902 | 56.3 | 102 | 44 |
| E-78 | −78.0 | −108 | 880 | 54.9 | 115 | 49 |
| E-90 | −90.0 | −130 | 786 | 49.1 | 90 | 39 |
| E-114 | −114.0 | −173 | 782 | 48.8 | 107 | 46 |

-continued

| PCM Type | Volumetric Heat Capacity | | Specific Heat Capacity (kJ/kg K) | (Btu/lb° F.) | Thermal Conductivity (W/m K) | (Btu/ft2 h ° F.) |
|---|---|---|---|---|---|---|
| | (MJ/m3) | (Btu/ft3) | | | | |
| E0 | 332 | 8,911 | 4.186 | 0.992 | 0.580 | 0.335 |
| E-2 | 327 | 8,777 | 3.80 | 0.900 | 0.580 | 0.335 |
| E-3 | 331 | 8,884 | 3.84 | 0.910 | 0.600 | 0.347 |
| E-6 | 305 | 8,186 | 3.83 | 0.907 | 0.560 | 0.324 |
| E-10 | 326 | 8,750 | 3.33 | 0.789 | 0.560 | 0.324 |
| E-11 | 328 | 8,804 | 3.55 | 0.841 | 0.570 | 0.329 |
| E-12 | 278 | 7,462 | 3.47 | 0.822 | 0.560 | 0.324 |
| E-14 | 296 | 7,945 | 3.51 | 0.832 | 0.530 | 0.306 |
| E-15 | 321 | 8,616 | 3.87 | 0.917 | 0.530 | 0.306 |
| E-19 | 344 | 9,233 | 3.29 | 0.779 | 0.580 | 0.335 |
| E-21 | 326 | 8,750 | 3.13 | 0.741 | 0.510 | 0.295 |
| E-22 | 276 | 7,408 | 3.34 | 0.791 | 0.570 | 0.329 |
| E-26 | 325 | 8,723 | 3.67 | 0.869 | 0.580 | 0.335 |
| E-29 | 264 | 7,086 | 3.69 | 0.874 | 0.640 | 0.370 |
| E-32 | 313 | 8,401 | 2.95 | 0.699 | 0.560 | 0.324 |
| E-34 | 286 | 7,676 | 3.05 | 0.723 | 0.540 | 0.312 |
| E-37 | 302 | 8,106 | 3.15 | 0.746 | 0.540 | 0.312 |
| E-50 | 283 | 7,596 | 3.28 | 0.777 | 0.560 | 0.324 |
| E-75 | 92 | 2,469 | 2.43 | 0.576 | 0.170 | 0.098 |
| E-78 | 101 | 2,716 | 1.96 | 0.464 | 0.140 | 0.081 |
| E-90 | 71 | 1,906 | 2.56 | 0.606 | 0.140 | 0.081 |
| E-114 | 84 | 2,255 | 2.39 | 0.566 | 0.170 | 0.098 |

Compressor 980

If desired, a conventional reciprocating compressor (e.g., the Tecumseh TC1413U-DS7C compressor) may be used for compressor 980 of refrigeration unit 925. Alternatively, rotary compressors (e.g., such as those made by Aspen Systems, Samsung and Rigid) may be used for compressor 980 of refrigeration unit 925. Alternatively, a Direct Current Compressor R290-12-24 V by Danfoss with evaporating temperatures ranging from −40° C. to 10° C. may be used.

Tubing for the Refrigeration Cycle

Figure 37A:
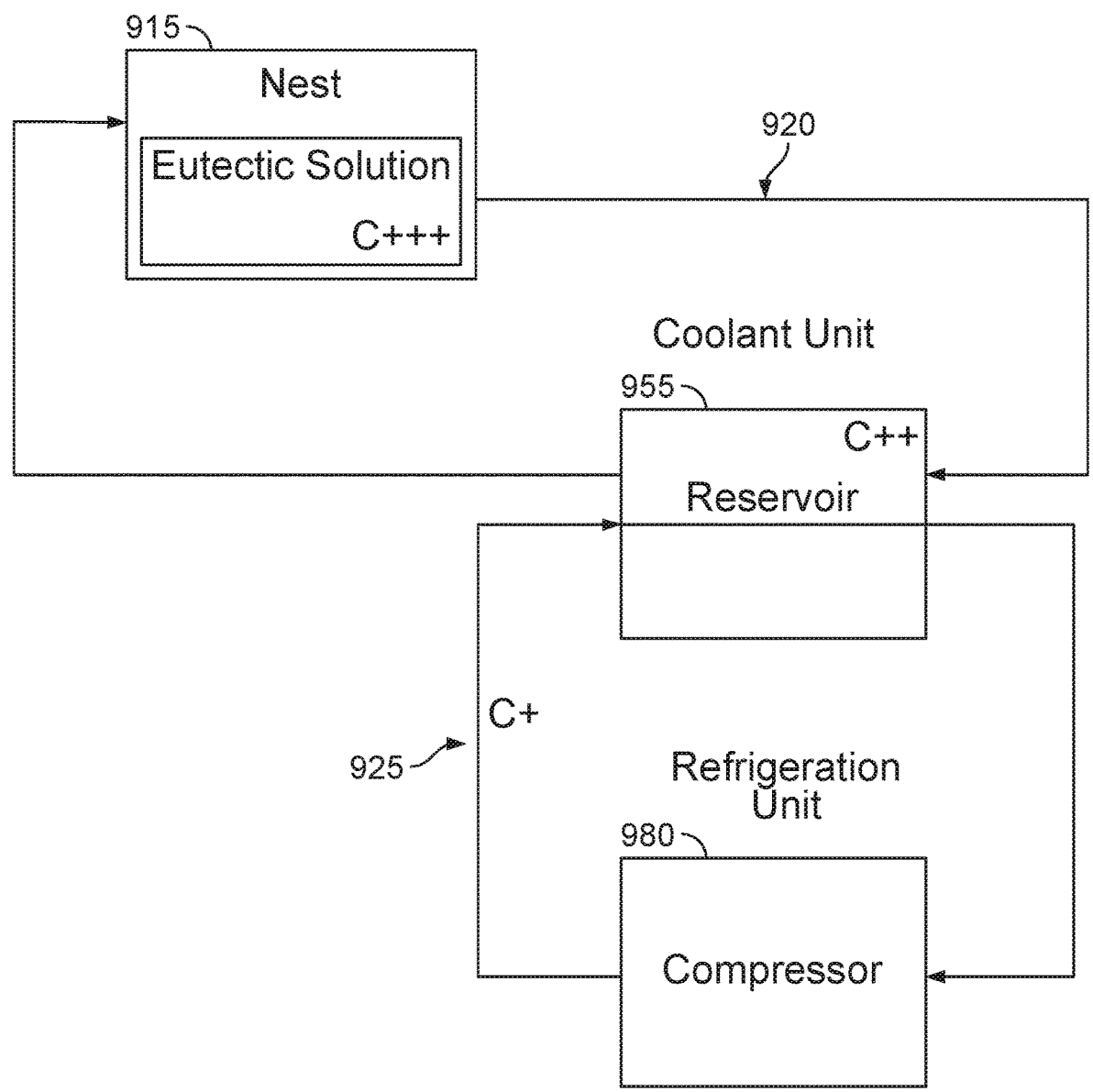
FIG. 37A is a schematic view showing one preferred arrangement for cooling a pod disposed in the nest.

As noted above, refrigeration unit 925 circulates refrigerant from compressor 980, through condenser 985, through an expansion valve (not shown) located downstream of the condenser, and through an evaporator (not shown) located at reservoir 955 of coolant unit 920. In one form of the invention, conventional refrigeration tubing is used to transfer the refrigerant between the various components of refrigeration unit 925. In another form of the invention, and looking now at FIG. 37, a coaxial refrigeration tube may be used to transfer the refrigerant between the various components of refrigeration unit 925, whereby to gain enhanced refrigeration efficiency.

One Preferred Arrangement for Cooling a Pod Disposed in the Nest

In one preferred form of the invention, where nest 915 is cooled using a eutectic solution contained in one or more containers at nest 915, both coolant unit 920 and the eutectic solution container(s) are able to store "cold" so as to increase the efficiency of system 900. More particularly, compressor 980 drives refrigerant through reservoir 955 of coolant unit 920 so as to cool the coolant in reservoir 955, whereby to store "cold" in reservoir 955. The coolant in reservoir 955 is then driven to the eutectic solution container(s) in nest 915 by circulation motor 960 of coolant unit 920 so as to cool the eutectic solution, whereby to store additional "cold" in the nest. See FIG. 37A. In this way, multiple batches of frozen confection may be made in succession inasmuch as there is sufficient "cold" stored in the system to allow for cooling of multiple pods without having to wait for refrigeration unit 925 to cool multiple batches of frozen confection. Additionally, compressor 980 does not need to be constantly running in order for multiple batches of frozen confection to be made.

Direct Expansion Refrigeration of Nest 915

Figure 38A:
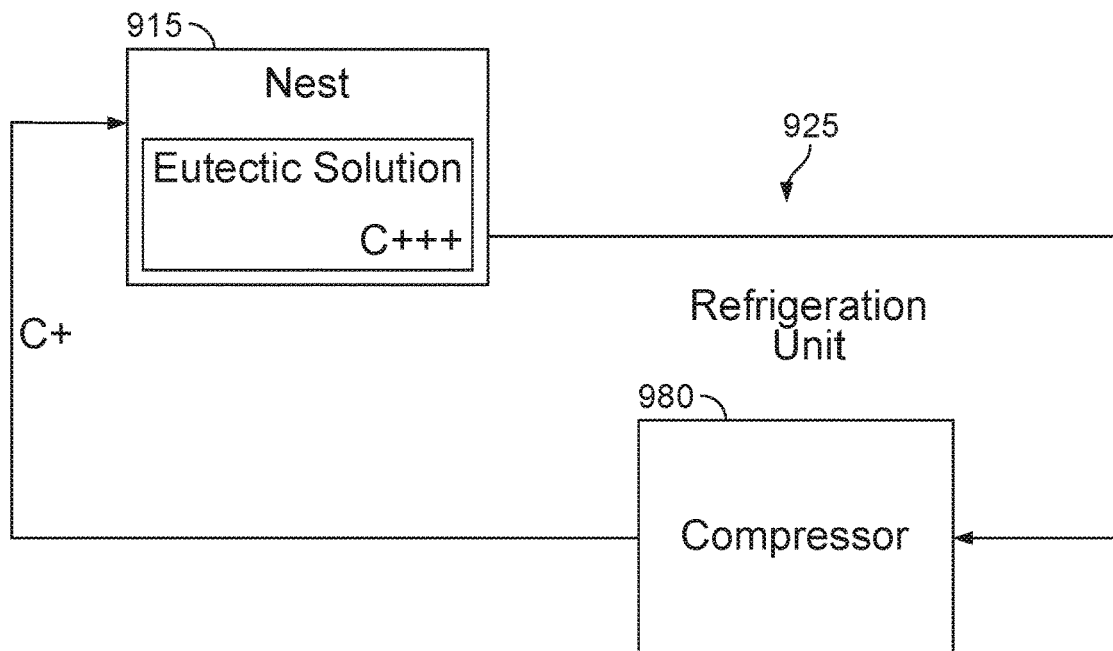
FIG. 38A is a schematic view showing another preferred arrangement for cooling a pod disposed in the nest.
Figure 39:
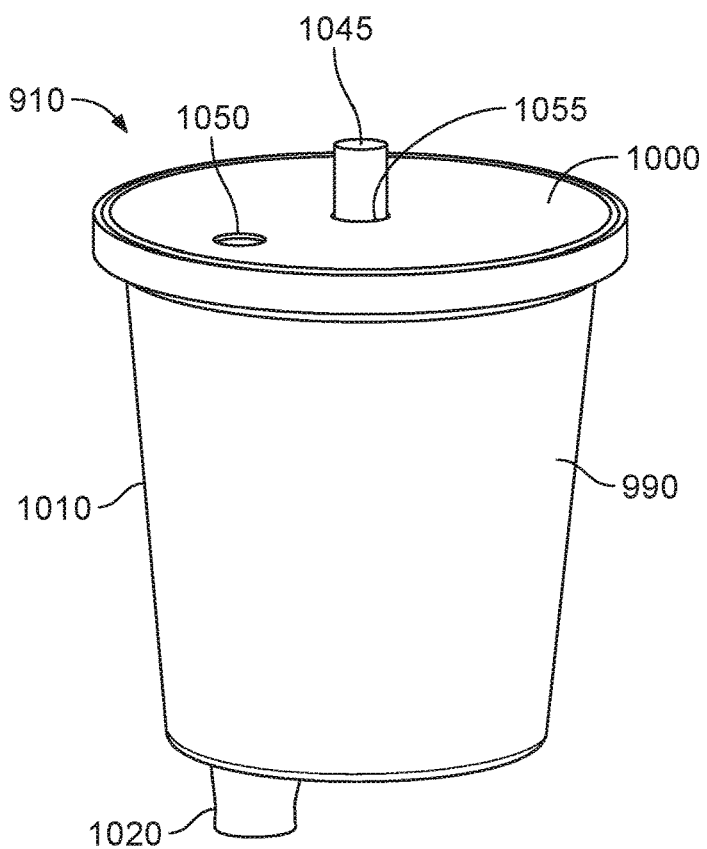
FIGS. 39-42 are schematic views showing another form of pod which may be used with the present invention.
Figure 40:
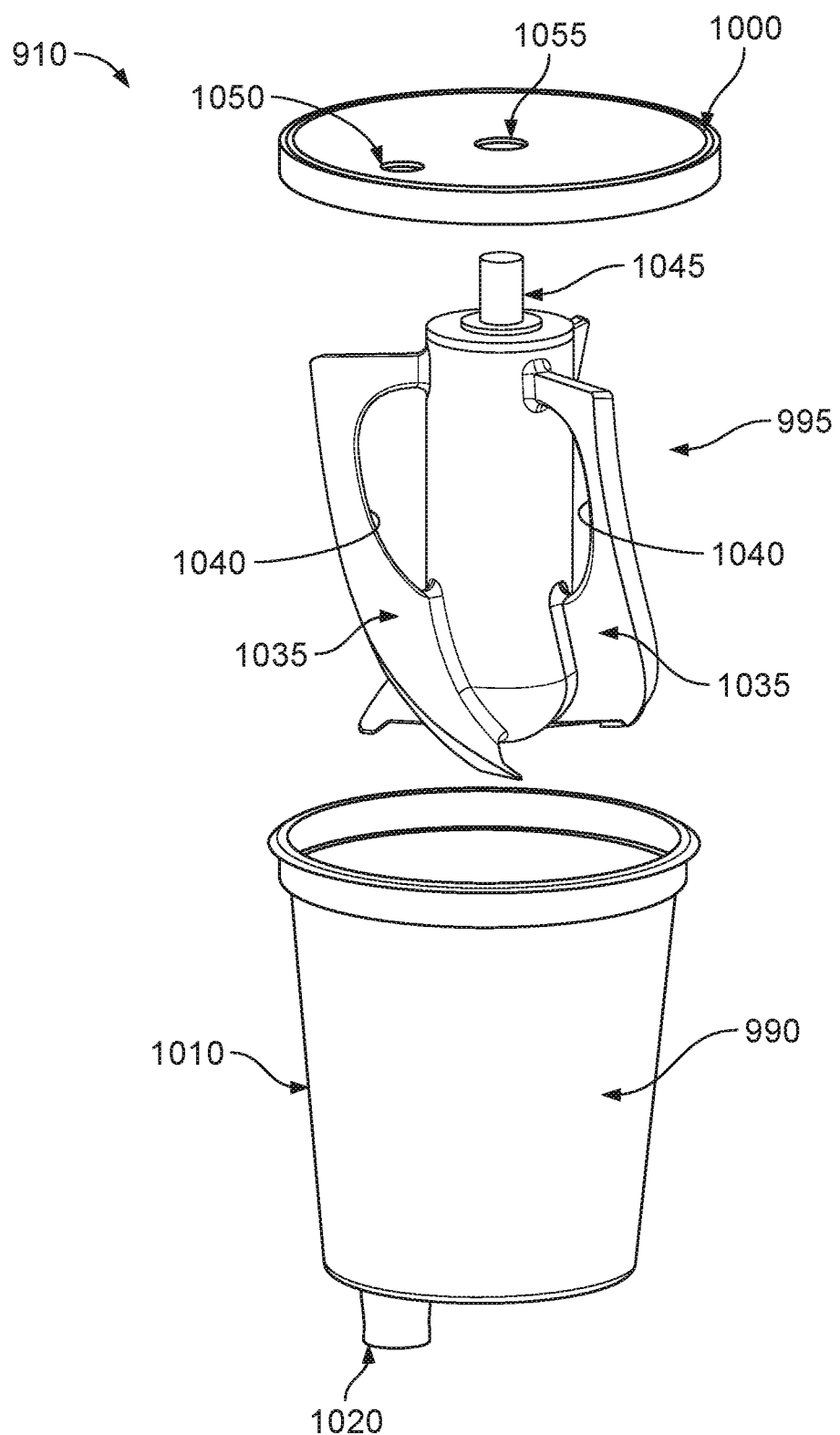
Figure 41:
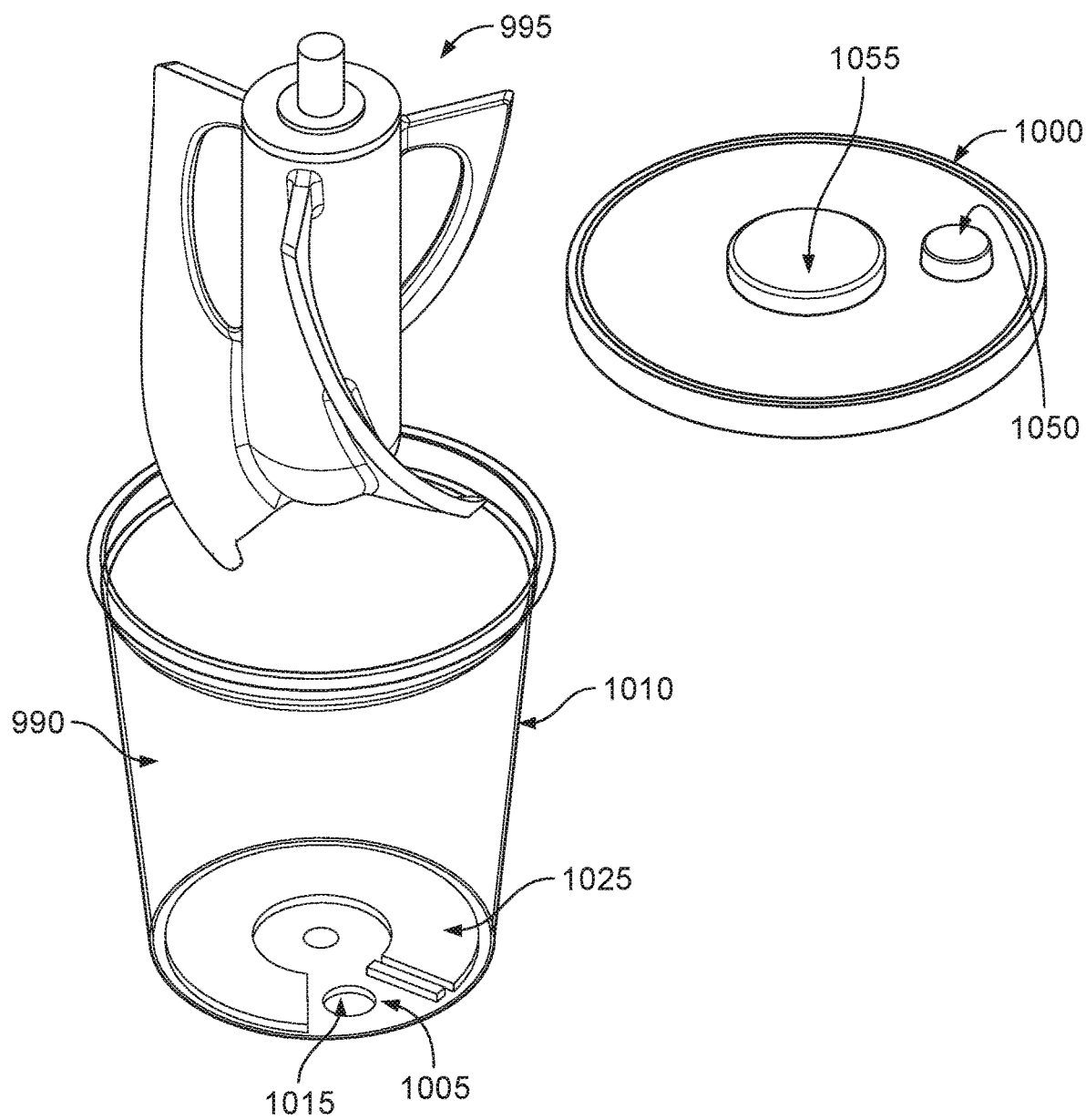

In a preferred form of the invention, refrigeration unit 925 is used to cool the coolant in reservoir 955 of coolant unit 920, and coolant unit 920 is used to cool nest 915 (or the eutectic solution contained in one or more containers at nest 915), whereby to cool a pod 910 disposed in nest 915. However, if desired, a direct expansion system may be used to cool nest 915. A direct expansion system eliminates the use of a secondary coolant loop (i.e., the coolant loop of coolant unit 920) and uses the refrigerant of refrigeration unit 925 to directly cool nest 915 via a cold plate. The cold plate can be customized to generate a very high heat flux, operating at temperatures well below ambient. In the cold plate of a direct expansion system, the refrigerant from refrigeration unit 925 undergoes an isothermal phase change, offering tight temperature control across the cold plate. As seen in FIG. 38, a direct expansion system consists of the basic 4 components of a vapor compression refrigeration system: a compressor, a condenser, an expansion valve, and an evaporator. In a direct expansion system, the evaporator absorbs heat directly from nest 915. Inasmuch as no secondary coolant loop is required (i.e., coolant unit 920 is eliminated), minimal parts are needed in the direct expansion system. No fans are required to circulate cool air and no pump is required to circulate the coolant, which simplifies system construction and improves system efficiency.

Another Preferred Arrangement for Cooling a Pod Disposed in the Nest

In another preferred form of the invention, at least one container holding a eutectic solution is disposed adjacent to the pod seat of nest 915. Refrigeration unit 925 is used to directly cool the eutectic solution to the point of freezing. In this form of the invention, coolant unit 920 is eliminated. Compressor 980 drives refrigerant directly through nest 915 so as to cool the eutectic solution in the container(s) adjacent to the pod seat in nest 915, whereby to store "cold" in the nest. See FIG. 38A. In this way, multiple batches of frozen confection may be made in succession as there is sufficient "cold" stored in the nest to allow for cooling of multiple pods without having to wait for refrigeration unit 925 to cool multiple batches of frozen confection. Additionally, compressor 980 does not need to be constantly running in order for multiple batches of frozen confection to be made.

Pod 910

Pod 910 is generally similar to pod 30 described above, except that pod 910 has its cap permanently fixed in place and is sealed shut. In the preferred form of the invention, pod 910 is provided as a single use, disposable pod, i.e., a new pod is used for each serving of the frozen confection (or hot or cold beverage). However, it should be appreciated that, if desired, pod 910 may be provided as a multi-use, reusable pod, i.e., a pod may be reused (after filling with fresh ingredients) to provide additional servings of the frozen confection (or hot or cold beverage). Where pod 910 is reusable, the cap of the pod is selectively removable from the remainder of the pod.

Pod 910 is provided with an inner scraper paddle made of plastic which is configured to eject the frozen confection out the bottom of the pod by reversing the direction of the inner scraper paddle. The inner scraper paddle can be made by injection molding or 3D printing.

More particularly, and looking now at FIGS. 35, 35B, 39-42, 42A and 42B, pod 910 generally comprises a canister 990, an internal scraper paddle assembly 995 and a cap 1000.

Canister 990 is tapered (preferably frustoconical) and comprises a floor 1005 and a side wall 1010 upstanding therefrom. In one form of the invention, tapered canister 990 comprises a smaller floor 1005, a larger cap 1000 and a tapered side wall 1010 extending between the smaller floor 1005 and the larger cap 1000. In one preferred form of the invention, tapered canister 990 is frustoconical. Note that the taper of canister 990 matches the taper of nest 915, so that pod 910 can make a close fit within nest 915, whereby to facilitate excellent heat transfer between the pod and the nest.

In another form of the invention, tapered side wall 1010 has a taper of approximately 5 degrees or greater.

Canister 990 has an opening 1015 in its base. A nozzle 1020 is formed adjacent to opening 1015. A sliding gate 1025 selectively opens or closes opening 1015 as will hereinafter be discussed. A stop 1030 is formed on floor 1005 to limit movement of sliding gate 1025.

In one form of the invention, tapered side wall 1010 has a uniform thickness along its length.

In another form of the invention, tapered side wall 1010 has a thickness which varies along its length. More particularly, tapered side wall 1010 may be thinner adjacent to the smaller floor 1005 and may be thicker adjacent to the larger cap 1000, such that the pod ingredients will freeze faster adjacent to smaller floor 1005 than the pod ingredients will freeze adjacent to larger cap 1000.

It should be appreciated that providing canister 990 with a tapered side wall 1010 is important for creating good surface contact between pod 910 and nest 915 (i.e., between tapered side wall 1010 of pod 910 and tapered side wall 953 of nest 915). Providing a close fit between pod 910 and nest 915 is critical for adequate heat transfer from nest 915 to pod 910 in order to efficiently freeze the contents of pod 910. It should also be appreciated that providing canister 990 with a tapered side wall 1010 focuses the contents of the pod so that the contents move toward opening 1015 in canister 990 of pod 910. Specifically, when pod 910 is used to make a frozen confection, tapered side wall 1010 focuses the frozen confection as it freezes toward opening 1015 and out nozzle 1020.

Canister 990 preferably comprises a thin side wall formed out of a material which has high heat transfer capability, e.g., a thin metal, a thin plastic, etc. Canister 990 is preferably 50-500 microns thick so as to provide a high heat transfer rate between nest 915 and pod 910. Canister 990 is also preferably somewhat deformable so that canister 990 has some ability to expand against nest 915, whereby to ensure high heat transfer between the pod and the nest.

Internal scraper paddle assembly 995 comprises a plurality of scraper blades 1035 which have a generally helical configuration. In one form of the invention, the scrapper blades 1035 can have a rubber squeegee on the ends of the blades so as to better conform to and scrape the inner wall of pod 910. Preferably openings 1040 are formed in scraper blades 1035. Internal scraper blade assembly 995 also comprises an upwardly-projecting stem 1045 which can rotate at speeds from 10 to 400 RPM.

Cap 1000 is secured to (i.e., permanently fixed to) canister 990. Cap 1000 comprises an opening 1050 for admitting fluids (e.g., liquid or air) into the interior of canister 990 and an opening 1055 for permitting upwardly-projecting stem 1045 to project out of the interior of canister 990.

Cap 1000 and floor 1005 can be made of insulating materials or coated with insulating materials, e.g., aerogels.

Prior to use, opening 1015 in floor 1005, and opening 1050 in cap 1000, are closed off with rupturable membranes.

As a result of the foregoing construction, when upwardly-projecting stem 1045 is turned in a first (counterclockwise) direction, sliding gate 1025 is urged into its closed configuration and the contents of pod 910 are forced upward toward cap 1000. When upwardly-projecting stem 1045 is turned in the opposite (clockwise) direction and rotated at speeds ranging from 10 to 400 RPM, sliding gate 1025 is urged into its open configuration and the contents of pod 910 are forced downward, against floor 1005 of canister 990, whereupon the rupturable membrane covering opening 1015 in floor 1005 fails, allowing the contents of pod 910 to exit through opening 1015 and thus nozzle 1020.

Figure 42:
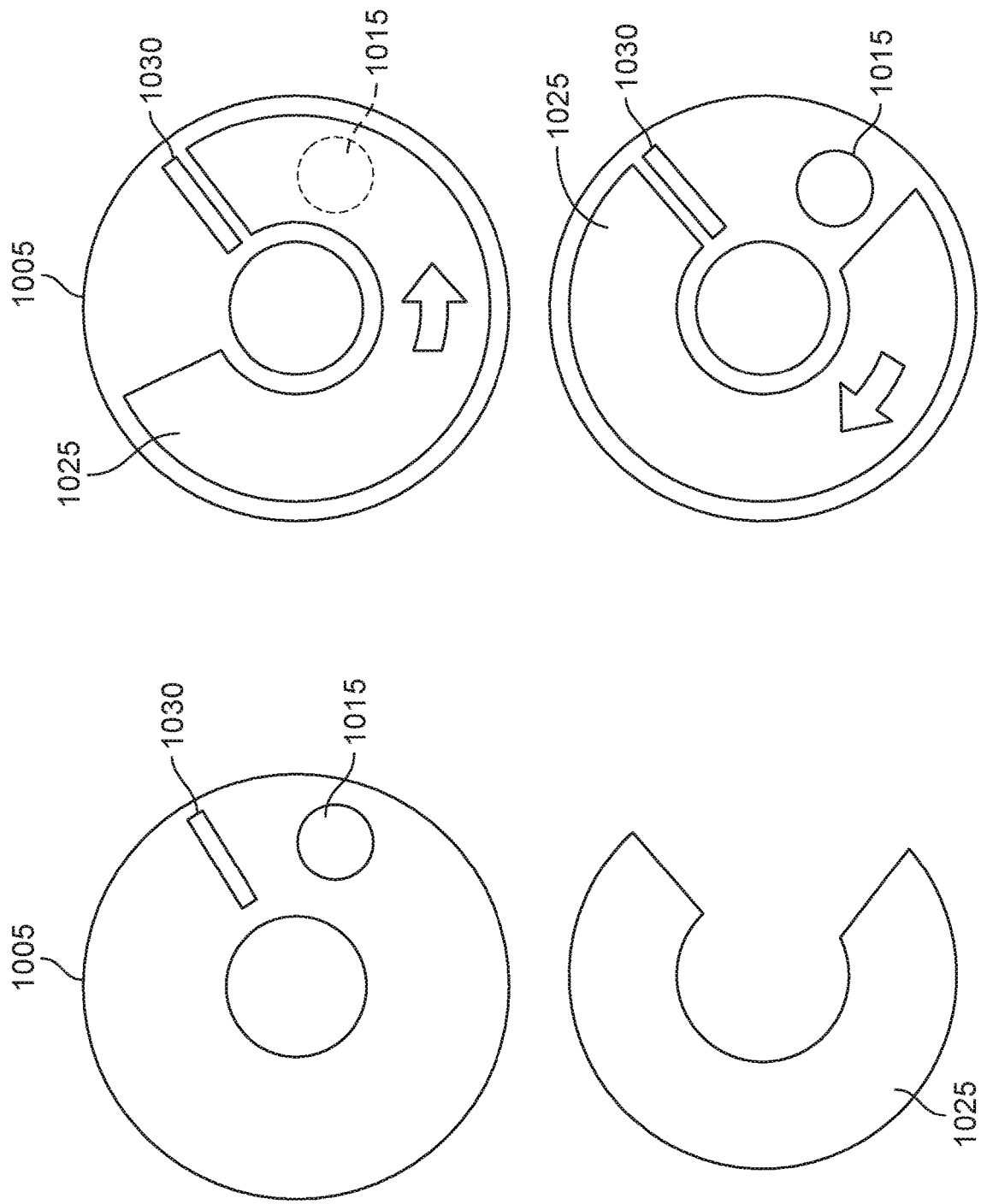
Figure 42A:
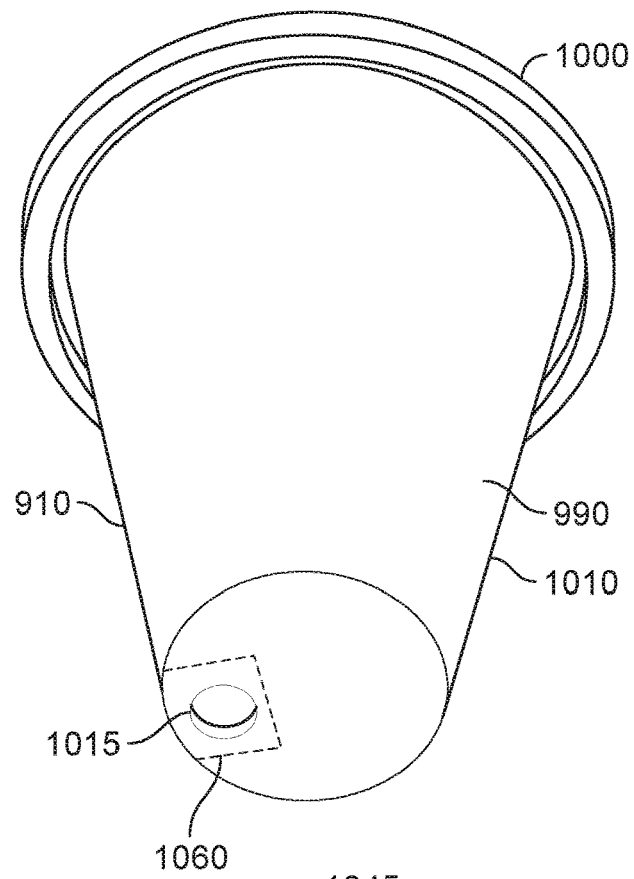
FIG. 42A is a schematic view showing another form of pod which may be used with the present invention.
Figure 42B:
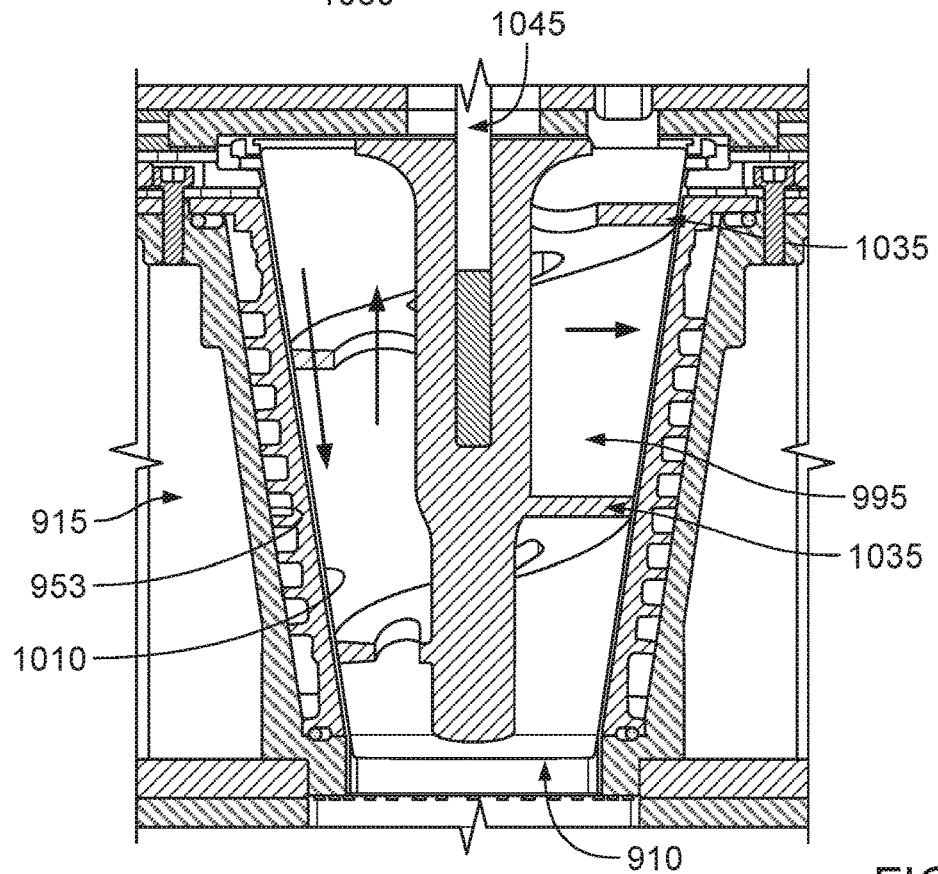
FIG. 42B is a schematic view showing movement of the contents of the pod during mixing.

In another form of the invention, nozzle 1020, sliding gate 1025 and stop 1030 may be omitted, and opening 1015 may be closed off with a removable seal 1060 (see FIG. 42A). In this form of the invention, as internal scraper paddle assembly 995 is turned in one direction, the contents of the pod are forced downward (via plurality of scraper blades 1035) until the churning contents hit floor 1005, and then the contents move upward within the pod (see FIG. 42B), with openings 1040 of plurality of scraper blades 1035 facilitating the upward rise of the contents of the pod. Note that the contents of the pod are also forced in a radially-outward direction during mixing, which helps apply a radially-outward force to tapered side wall 953 of nest 915, which helps seating of the tapered side wall 1010 of pod 910 against the tapered side wall 953 of nest 915, which enhances heat transfer between the pod and the nest. When the contents of the pod are to be released, removable seal 1060 is removed, and the contents of the pod exit through opening 1015. Note that in this form of the invention, the direction of turning scraper blades 1035 does not need to be reversed when discharging the frozen confection from the pod.

In one preferred form of the invention, pod 910 may comprise multiple compartments or zones that house different contents, i.e., powder ice cream in one zone and a cream or milk or water in a second zone. When the lid of machine 905 closes, the separating membrane between zones can puncture or rupture allowing the various contents to mix.

Close Fit Between Pod 910 and Nest 915

In practice, it has been found that providing a close fit between pod 910 and nest 915 facilitates rapid heat transfer between pod 910 and nest 915, and hence enables faster production of a single serving of a frozen confection. Such a close fit may be provided in a variety of ways.

By way of example but not limitation, pod 910 could include screw threads (not shown) on the outside surface of canister 990 and nest 915 could include counterpart screw threads (not shown) on the surfaces of recess 935 of nest 915, such that pod 910 can be screwed into close contact with nest 915.

By way of further example but not limitation, frustoconical canister 990 of pod 910 could have an incline, and frustoconical recess 935 of nest 915 could have a corresponding incline, such that when the lid assembly of machine 905 is closed, pod 910 is driven downward into a close fit with nest 915.

By way of still further example but not limitation, pod 910 may be configured so that when a force is applied to the upper end of pod 910, pod 910 expands slightly so as to bring itself into closer proximity with recess 935 of nest 915.

Or a pressurized fluid (e.g., air, $CO_2$ or Nitrogen) may be injected into the interior of pod 910 so as to swell the side wall of canister 990 of pod 910 into closer proximity to recess 935 of nest 915.

Figure 43:
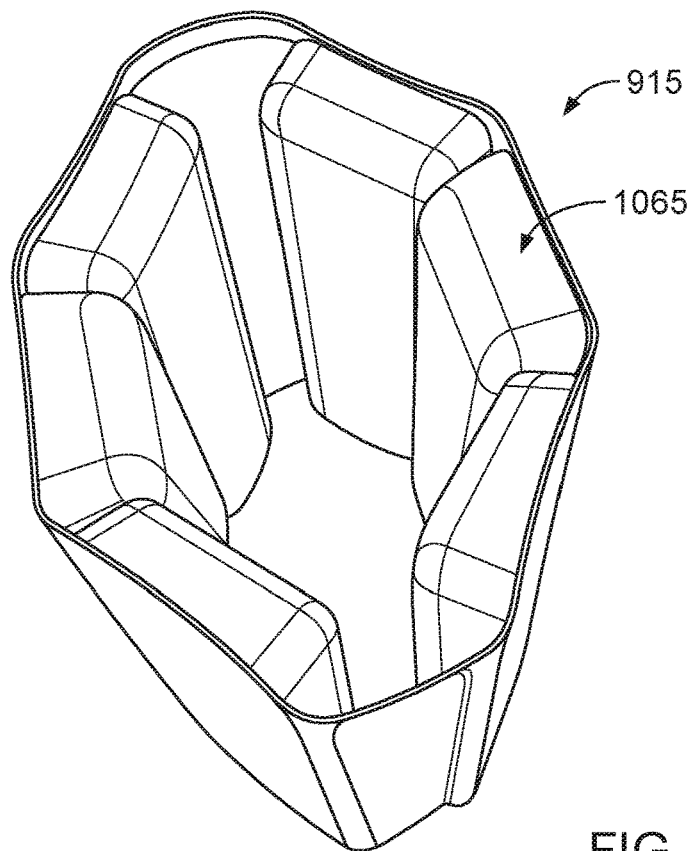
FIG. 43 is a schematic view showing how the nest assembly may comprise a flexible bladder for receiving a pod, such that the flexible bladder makes a close fit with a pod disposed in the nest assembly.

By way of further example but not limitation, recess 935 of nest 915 could comprise a flexible bladder 1065 (FIG. 43) for receiving canister 990 of pod 910, such that the flexible bladder makes a close fit with a pod 910 disposed in nest 915.

By way of further example but not limitation, recess 935 of nest 915 could comprise a magnetic material for receiving a ferrous alloy (i.e., steel) canister 990 of pod 910, such that pod 910 is magnetically pulled into nest 915 so as to make a close fit with a pod 910 disposed in nest 915.

Contents of Pod 910

The contents of pod 910 may be the same as the contents of pod 30 discussed above.

It should also be appreciated that, if desired, pod 910 may have a conventional yogurt product (e.g., yogurt in a gel-like form) sealed therein, such that novel system 900 thereafter forms frozen yogurt for dispensing into a container (e.g., a bowl, a cone, etc.).

Furthermore, if desired, pod 910 may contain liquid ingredients which, when cooled and agitated, form the desired frozen confection. In this form of the invention it may not be necessary to pump any further ingredients into the pod in order to create the desired frozen confection.

Figure 44:
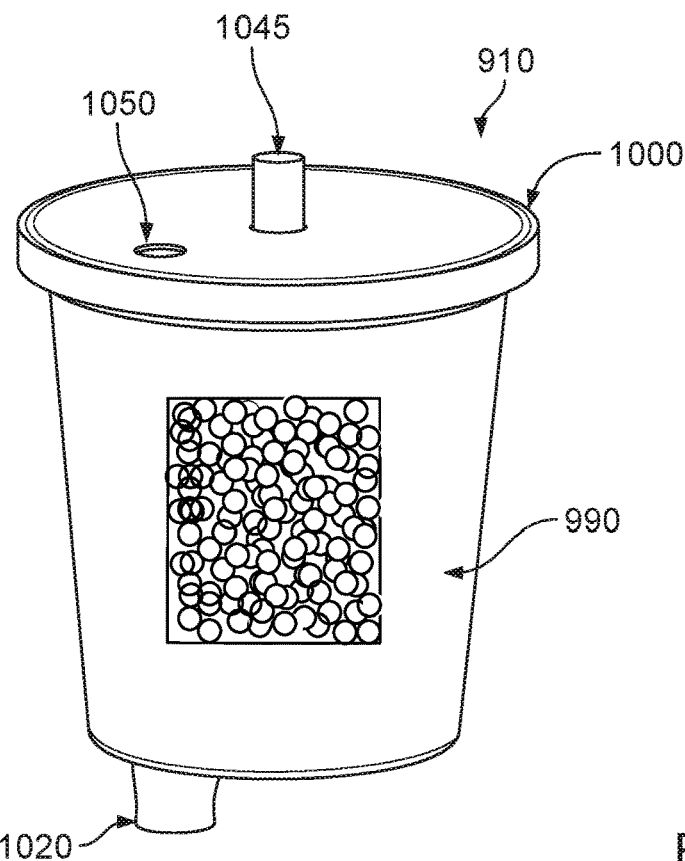
FIG. 44 is a schematic view showing "bubble beads" contained in the ingredients disposed within a pod, wherein the encapsulant is selected so that when water is added to the interior of the pod, the encapsulant dissolves, releasing the $CO_2$ or $N_2$ and creating a "fizz" in the frozen confection.

In addition to the foregoing, if desired, and looking now at FIG. 44, "bubble beads" (e.g., an encapsulant surrounding $CO_2$ or $N_2$) may be contained in the ingredients disposed within pod 910. This encapsulant is selected so that when water is added to the interior of pod 910, the encapsulant dissolves, releasing the $CO_2$ or $N_2$ and creating a "fizz" in the frozen confection.

It is also anticipated that pod 910 may comprise the contents necessary to make a frozen protein shake, e.g., a whey protein powder, a casein protein powder, a pea protein powder, a soy protein powder, etc., essentially any powder which, when mixed with water and chilled, will make a frozen protein shake.

In one preferred form of the invention, where a frozen protein shake is to be produced, the contents of pod 910 may be:

3-10% milk fat such as cream, plastic cream, butter, anhydrous milk fat/butter oil, nondairy fat such as palm oil, palm kernel oil, coconut oil and other safe and suitable vegetable oils;

9-15% milk solids non-fat (MSNF) such as concentrated (condensed/evaporated) milk, sweetened condensed milk, milk powder, skim or whole sweet cream buttermilk, concentrated or dried whey, concentrated or dried, milk protein concentrates whey protein concentrates or isolates hydrolyzed or modified milk proteins, sodium caseinate;

4-14% sugar and corn syrup sweetener ingredients; up to 0.5% stabilizers or thickeners such as sodium carboxymethyl cellulose (cellulose gun), guar gum, locust bean gum, sodium alginate, propylene glycol alginate, xanthan, carrageenan, modified starches, microcrystalline cellulose (cellulose gel), gelatin, calcium sulfate, propylene glycol monostearate or other monoesters, and others;

up to 0.5% emulsifiers such as mono- and diglycerides, distilled monoglycerides (saturated or unsaturated), polyoxyethylene sorbitan monostearate (60) or monooleate (80), and others; and have 5 to 60 grams of protein in the form of whey, casein, pea, soy and or a combination of said proteins.

In each 3-8 ounce serving of frozen protein shake, there ideally would be greater than 10 grams of protein and less than 200 calories.

Further examples of the pod ingredients can include the following soft serve ice cream powder, powder yogurt, powder shake mix, liquid slush mix, powder coffee base mix, powder smoothie mix, powder or liquid low sweet neutral base and premium neutral base ingredients are listed below:

| | Item# | Type | Manufacturer |
|---|---|---|---|
| SOFT SERVE | | | |
| Dole Vanilla Soft Serve | D500 | Powder | Precision Foods |
| Dole Chocolate soft Serve | D510 | Powder | Precision Foods |
| Frostline Vanilla Soft Serve | D400 | Powder | Precision Foods |
| Frostline Chocolate Soft Serve | D410 | Powder | Precision Foods |
| Frostline Vanilla Soft Serve (RTU) | DL28 | Liquid | Precision Foods |
| Frostline Chocolate Soft Serve (RTU) | DL27 | Liquid | Precision Foods |
| FROZEN YOGURT | | | |
| Frostline Vanilla Yogurt | Y800 | Powder | Precision Foods |
| Frostline Chocolate Yogurt | Y810 | Powder | Precision Foods |
| SHAKES | | | |
| Frostline Vanilla Shake Mix | D425 | Powder | Precision Foods |
| SLUSH | | | |
| Flavor Burst Premium Neutral Base 6 half-gallon jugs per case - 1:5 mixing ration | FLA NB-3 | Liquid | Flavor Burst Company |
| FROZEN COFFEES | | | |
| JavaLatte Coffee Base requires soft service mix - see available soft serve mixes above | FLA-JL-2 | Powder | Flavor Burst Company |
| SMOOTHIES | | | |
| Frostline Smoothie Base Mix | D595 | Powder | Precision Foods |
| FROZEN CARBONATED BEVERAGE (FCB) | | | |
| National Fruits Flavors | | Liquid | National Fruit Flavor |
| Chilly Willee National, Inc | | Liquid | Chilly Willee |
| FRUIT COCKTAILS - See receipt below! | | | |
| Low Sweet Neutral Base | | Powder | United Citrus |
| Flavor Burst Premium Neutral Base | FLA-NB-3 | Liquid | Flavor Burst Company |

Soft Serve Ice Cream Mix Construction

In another form of the invention, when forming a single serving of soft serve ice cream, water supply 70 may be replaced by a cooler (not shown). The cooler may accept a container (e.g., a plastic bottle or a plastic bag) which holds approximately 1.0 liter to approximately 3.0 liters of liquid soft serve ice cream mix. In this form of the invention, pod 910 is used to form the single serving of soft serve ice cream, by receiving the liquid soft serve ice cream mix and agitating the single serving of soft serve ice cream mix while it is cooling.

It should be appreciated that by injecting a liquid soft serve ice cream mix into pod 910, fluid (i.e., air or liquid) does not need to be subsequently injected into the pod in order to create the frozen confection (i.e., the soft serve ice cream). When pod 910 has been appropriately cooled, rotation of internal paddle assembly 995 forms a single serving of soft serve ice cream in pod 910.

Additionally, in this form of the invention, a separate water reservoir tank (not shown) may be provided which is able to pump approximately 0.5 ounce to approximately 1.0 ounce of water through the tube connecting the container (e.g., the plastic bottle or the plastic bag) to the pod so as to flush residual liquid soft serve ice cream mix from the tube before the next single serving of soft serve ice cream is prepared using novel system 900.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A method for reducing a temperature of liquid ingredients in an interior of a pod disposed in an evaporator of a machine; the method comprising:
    inserting the pod into a receptacle defined by the evaporator, the pod comprising a first end wall, a second end wall, and a sidewall extending from the first end wall to the second end wall;
    engaging a mixing paddle with a driveshaft extending through an opening in the first end wall of the pod, the mixing paddle located inside the pod;
    rotating the mixing paddle of the pod to force ingredients of the pod downward until contact with the second end wall of the pod churns the ingredients upwards within the pod through openings defined in blades of the mixing paddle by operating a motor mechanically coupled to the driveshaft;
    cooling the pod with a refrigeration system of the machine; and
    increasing overrun volume of the ingredients in the pod by mixing air flowing through the opening in the first end wall of the pod with the ingredients of the pod.

2. The method of claim 1, wherein the pod has a wall thickness between 50 and 500 microns.

3. The method of claim 1, wherein increasing the overrun volume comprises increasing the overrun volume by between 10% to 60%.

4. The method of claim 1, wherein cooling the pod comprises cooling the pod to a temperature between −40° C. to 0° C.

5. The method of claim 1, wherein cooling the pod comprises using a two-phase refrigerant.

6. The method of claim 1, wherein cooling the pod comprises cooling at least a portion of the ingredients to below zero degrees Celsius in less two minutes.

7. The method of claim 1, wherein rotating the mixing paddle forces the ingredients of the pod radially outward and downward.

8. The method of claim 1, wherein the refrigeration system comprises a compressor.

9. The method of claim 8, wherein the compressor is a rotary compressor.

10. The method of claim 8, wherein the compressor is a reciprocating compressor.

11. The method of claim 1, wherein the refrigeration system comprises at least one of R290, Freon, R134A, R407C, R404A or R410A.

12. The method of claim 1, further comprising deforming the pod to provide for close contact with the evaporator.

13. The method of claim 12, wherein deforming the pod comprises expanding the pod against the evaporator.

14. The method of claim 13, wherein the pod has a wall thickness between 50 and 500 microns.

15. The method of claim 1, wherein operating the machine uses a power of less than 1,800 watts.

16. The method of claim 1, wherein the evaporator comprises aluminum.

17. The method of claim 1, further comprising dispensing the ingredients from the pod by rotating the mixing paddle.

18. The method of claim 17, wherein dispensing the ingredients from the pod comprises flowing air through the opening in the first end wall of the pod to the interior of the pod.

19. A method for providing cooled food or drink, the method comprising:
    inserting a pod containing one or more ingredients and a paddle into a recess of an evaporator of a machine for providing the cooled food or drink, the pod comprising a floor, a sidewall extending from the floor to define an open end opposite the floor, and a lid attached to the sidewall extending across the open end defined by the sidewall;
    connecting a motor of the machine to the paddle by a shaft extending through an opening defined in the lid of the pod;
    rotating the paddle inside the pod to mix air flowing into the pod through the opening in the lid with the ingredients to increase a volume of the ingredients of the pod by forcing the ingredients of the pod downward until contact with floor of the pod churns the ingredients upward within the pod through openings defined in the paddle; and
    dispensing the ingredients from the pod through an opening in the floor as air flows into the pod though the opening in the lid.

20. The method of claim 19, wherein rotating the paddle inside the pod to mix air flowing into the pod through the opening in the lid with the ingredients increases the volume by between 10% to 60%.

21. The method of claim 19, wherein cooling the pod comprises cooling the pod to a temperature between −40° C. to 0° C.

22. The method of claim 19, wherein cooling the pod comprises using a two-phase refrigerant.

23. The method of claim 19, wherein cooling the pod comprises cooling at least a portion of the ingredients of the pod to below zero degrees Celsius in less two minutes.

24. The method of claim 19, wherein rotating the paddle forces the ingredients of the pod radially outward and downward.

25. The method of claim 19, further comprising deforming the pod to provide for close contact with the evaporator.

26. The method of claim 25, wherein deforming the pod comprises expanding the pod against the evaporator.

27. The method of claim 26, wherein the pod has a wall thickness between 50 and 500 microns.

28. The method of claim 19, wherein operating the machine uses a power of less than 1,800 watts.

29. The method of claim 19, wherein a refrigeration system comprises a rotary compressor.

30. The method of claim 19, wherein a refrigeration system comprises at least one of R290, Freon, R134A, R407C, R404A or R410A.

31. A method for providing cooled food or drink, the method comprising:
- inserting a pod containing one or more ingredients into a recess of an evaporator of a machine for providing the cooled food or drink, the pod comprising a floor, a sidewall extending from the floor to define an open end opposite the floor, and a cap attached to the sidewall extending across the open end defined by the sidewall;
- cooling the pod with a refrigeration system of the machine;
- rotating a paddle in the pod using a shaft extending through an opening in the cap; and dispensing the cooled food or drink through an opening in the floor of the pod;
- wherein rotating the paddle forces the ingredients of the pod radially outward and downward helping seat the sidewall of the pod against the evaporator; and
- wherein rotating the paddle inside the pod mixes air flowing into the pod through the opening of a hole in the cap with the ingredients to increase a volume of the ingredients of the pod.

\* \* \* \* \*

UNITED STATES PATENT AND TRADEMARK OFFICE
CERTIFICATE OF CORRECTION

PATENT NO. : 10,667,542 B2
APPLICATION NO. : 16/588086
DATED : June 2, 2020
INVENTOR(S) : Matthew Fonte Page 1 of 1

It is certified that error appears in the above-identified patent and that said Letters Patent is hereby corrected as shown below:

On the Title Page

Column 2, OTHER PUBLICATIONS, Line 2, delete "hhtp://fortune." and insert -- http://fortune. --.

In the Specification

Column 1, Line 14, delete "2018n" and insert -- 2018 --.

Signed and Sealed this
Fourth Day of August, 2020

Andrei Iancu
*Director of the United States Patent and Trademark Office*